United States Patent [19]
Aronson et al.

[11] 3,898,003
[45] Aug. 5, 1975

[54] VIEWER PRINTER MACHINE

[75] Inventors: Aaron B. Aronson, Glenview; Thomas V. DeRyke, Libertyville, both of Ill.; Joseph Goebel, Hague, Netherlands

[73] Assignee: Addressograph-Multigraph Corporation, Cleveland, Ohio

[22] Filed: Aug. 16, 1973

[21] Appl. No.: 388,838

[52] U.S. Cl. .................. 355/43; 355/14; 355/45; 355/53
[51] Int. Cl. ................ G03b 27/46; G03b 27/62; G03b 27/70
[58] Field of Search ............ 355/14, 43, 44, 50, 51, 355/53, 54, 45

[56] References Cited
UNITED STATES PATENTS

| | | | |
|---|---|---|---|
| 3,499,710 | 3/1970 | Sahley | 355/50 X |
| 3,687,540 | 8/1972 | Hashimoto | 355/14 |
| 3,740,136 | 6/1973 | Maloney et al. | 355/43 |

*Primary Examiner*—Richard A. Wintercorn
*Attorney, Agent, or Firm*—Mason, Kolehmainen, Rathburn & Wyss

[57] ABSTRACT

A viewer printer machine for selectively displaying or reproducing micro-images stored on a microfiche includes a viewing screen for observing projected micro-images from a microfiche and a printing or reproduction assembly for automatically, rapidly reproducing copies of the micro-images. The machine includes a novel transport assembly for transporting the micro-images sequentially into position for viewing or reproduction. The transport assembly includes a movable column slide for sequentially transporting images stored along a column of the microfiche into the illumination path of the machine and a row slide for sequentially transporting images stored along a row of the microfiche into the illumination path of the machine. The machine includes a novel control circuit for enabling the machine to selectively display or rapidly reproduce micro-images stored on microfiches of varying sizes and formats. The control circuit also enables the machine to automatically, rapidly reproduce a first, variable, preselectable number of collated sets of a second, variable, preselectable number of consecutively disposed micro-images.

58 Claims, 43 Drawing Figures

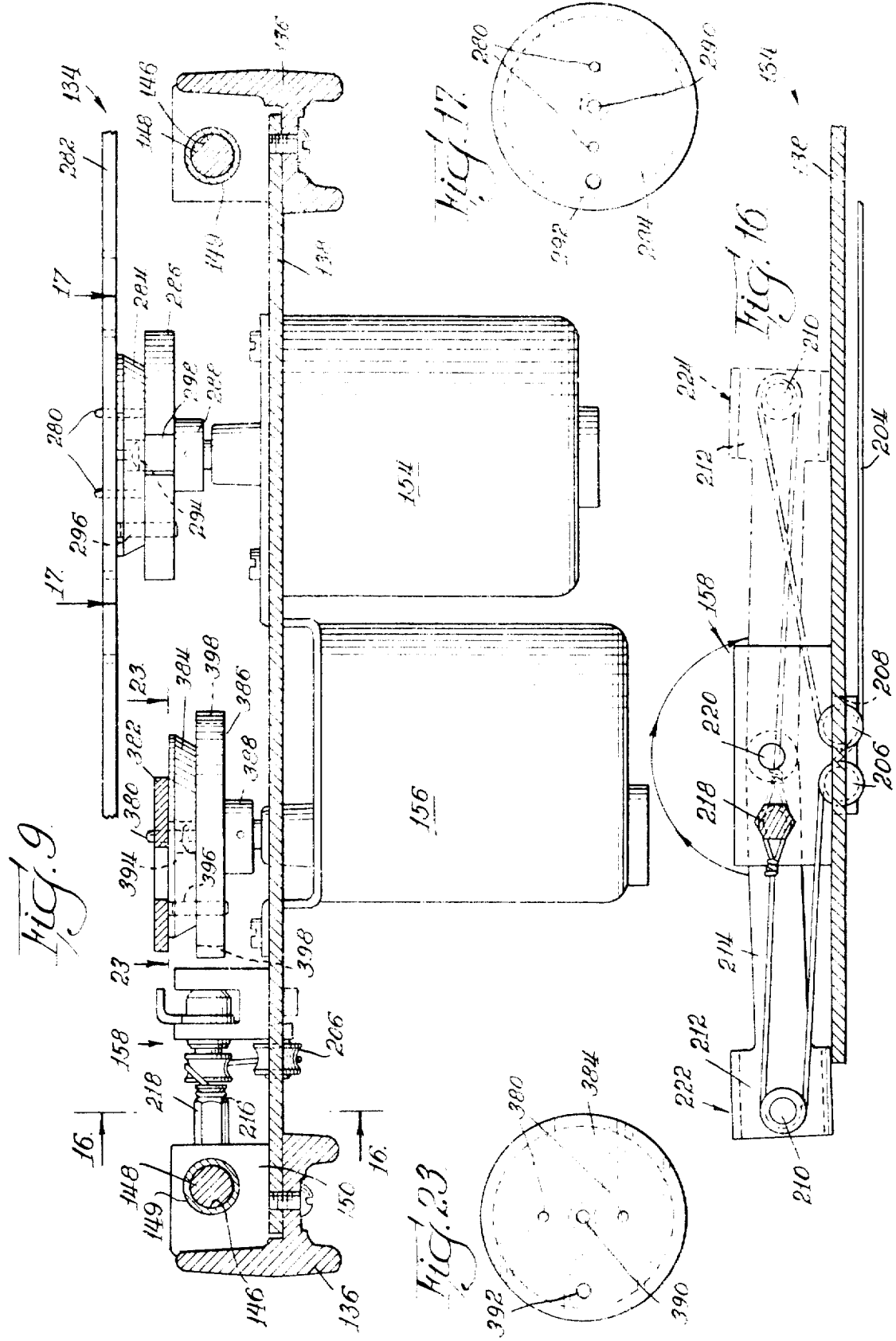

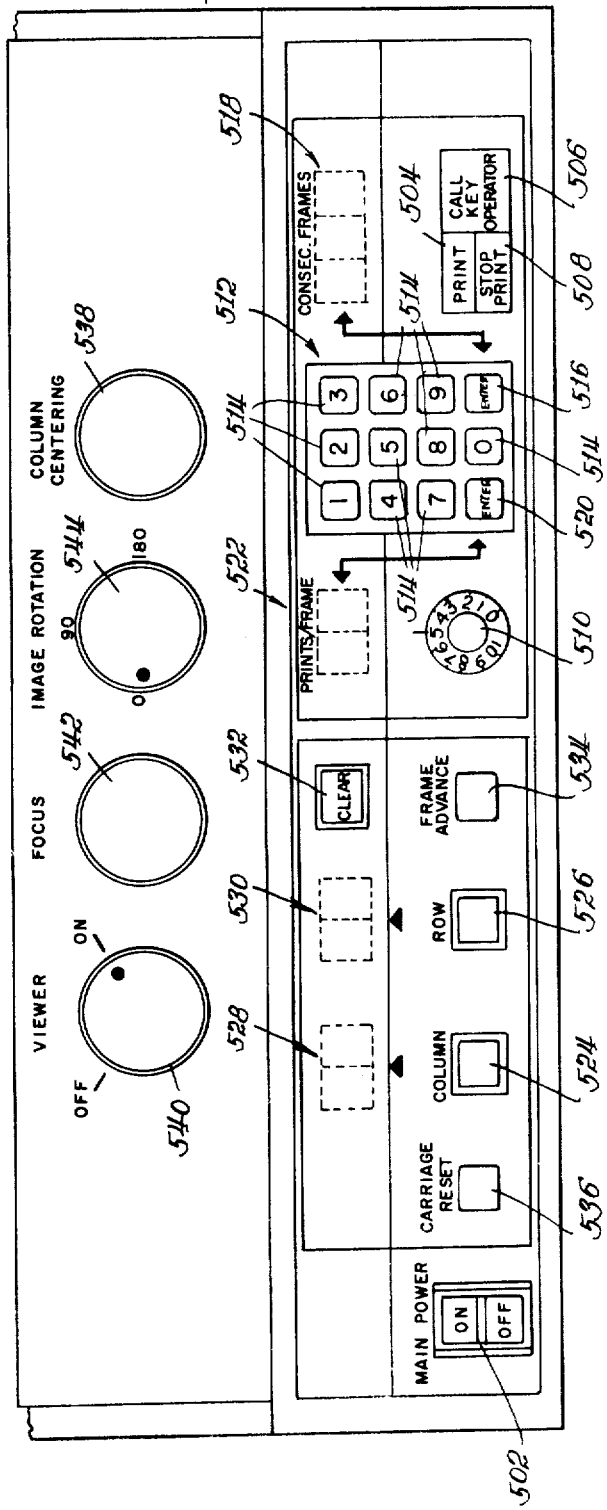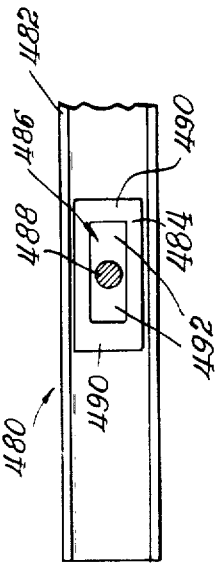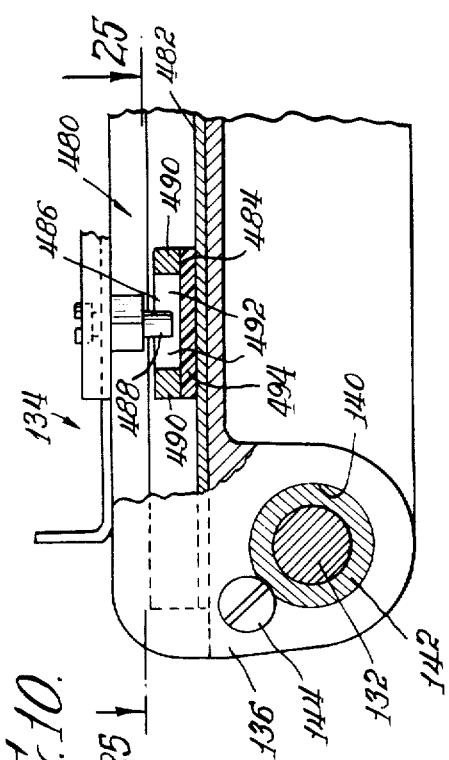

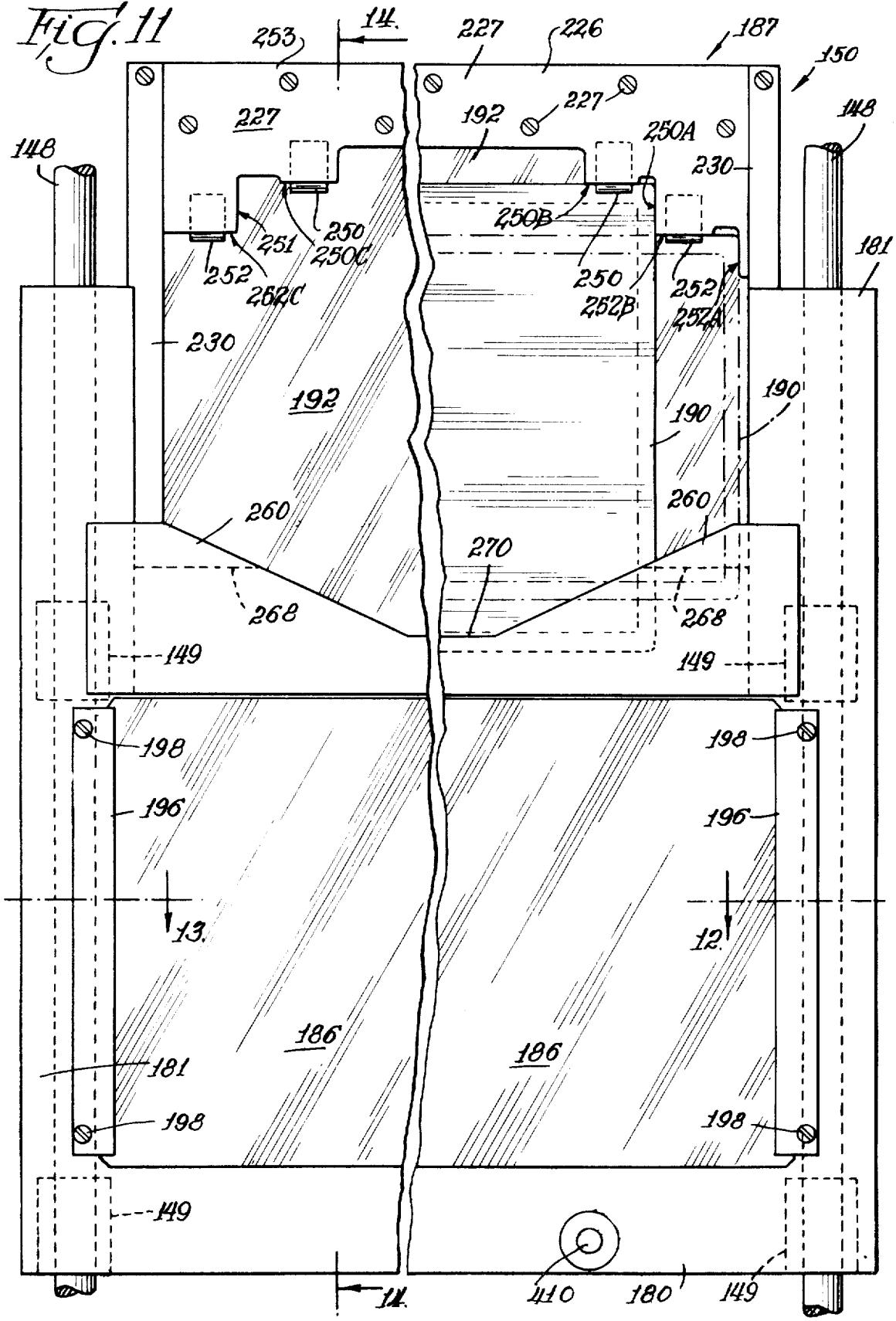

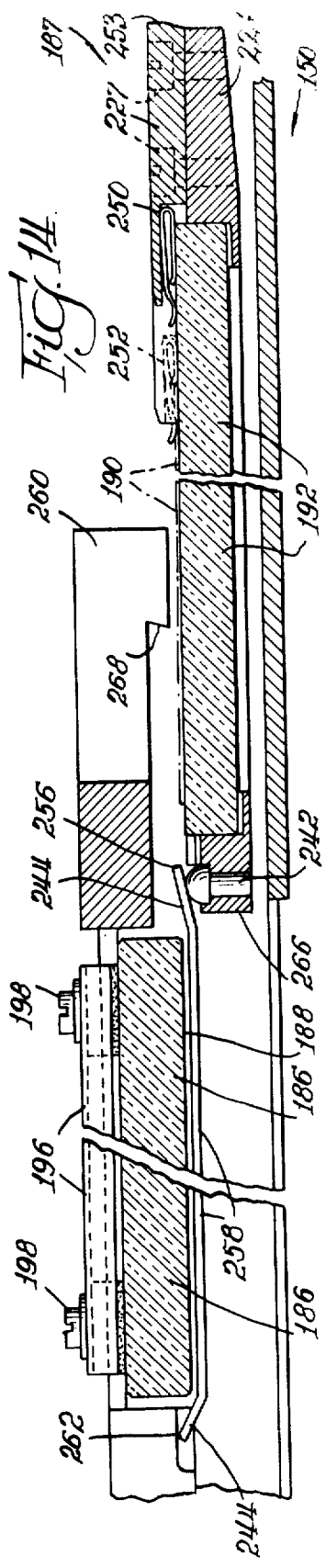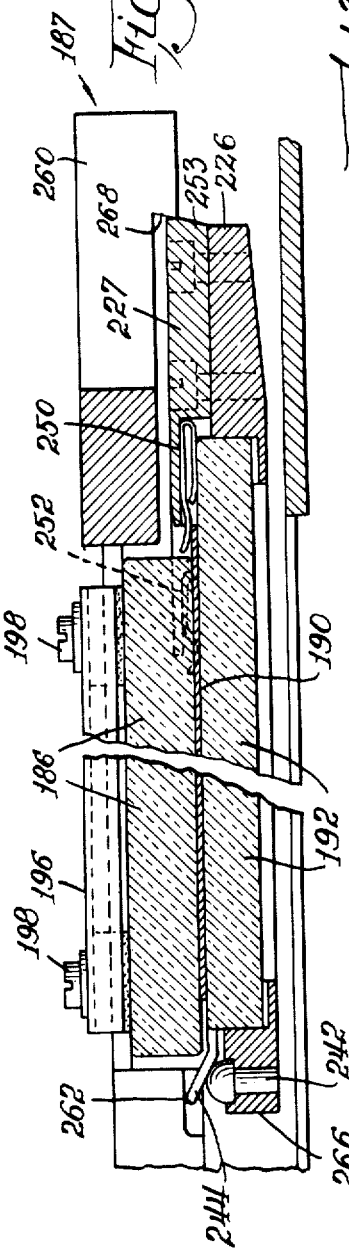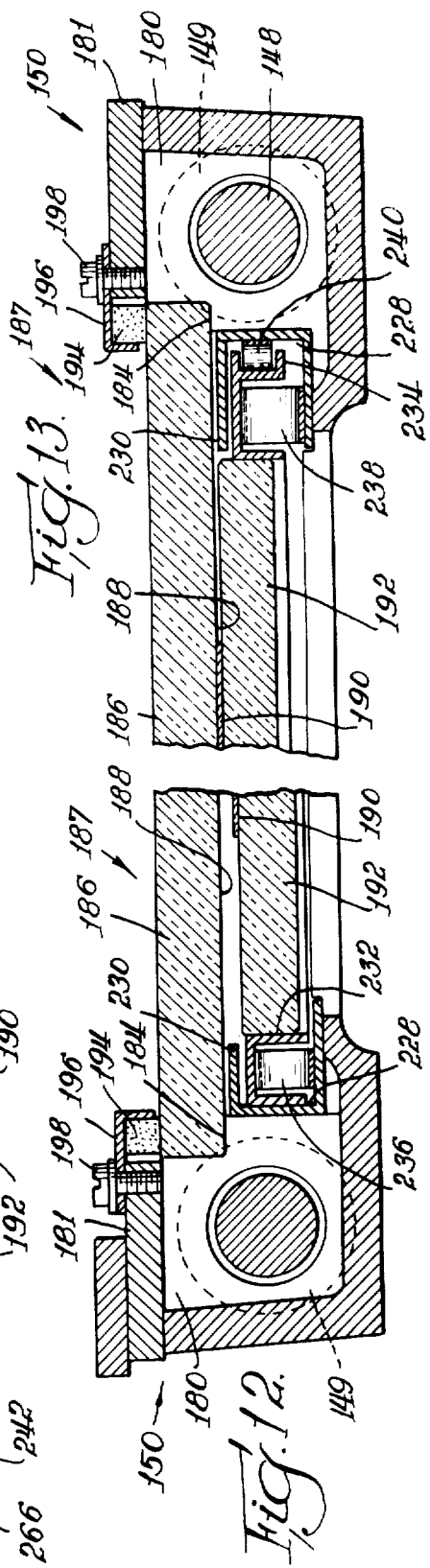

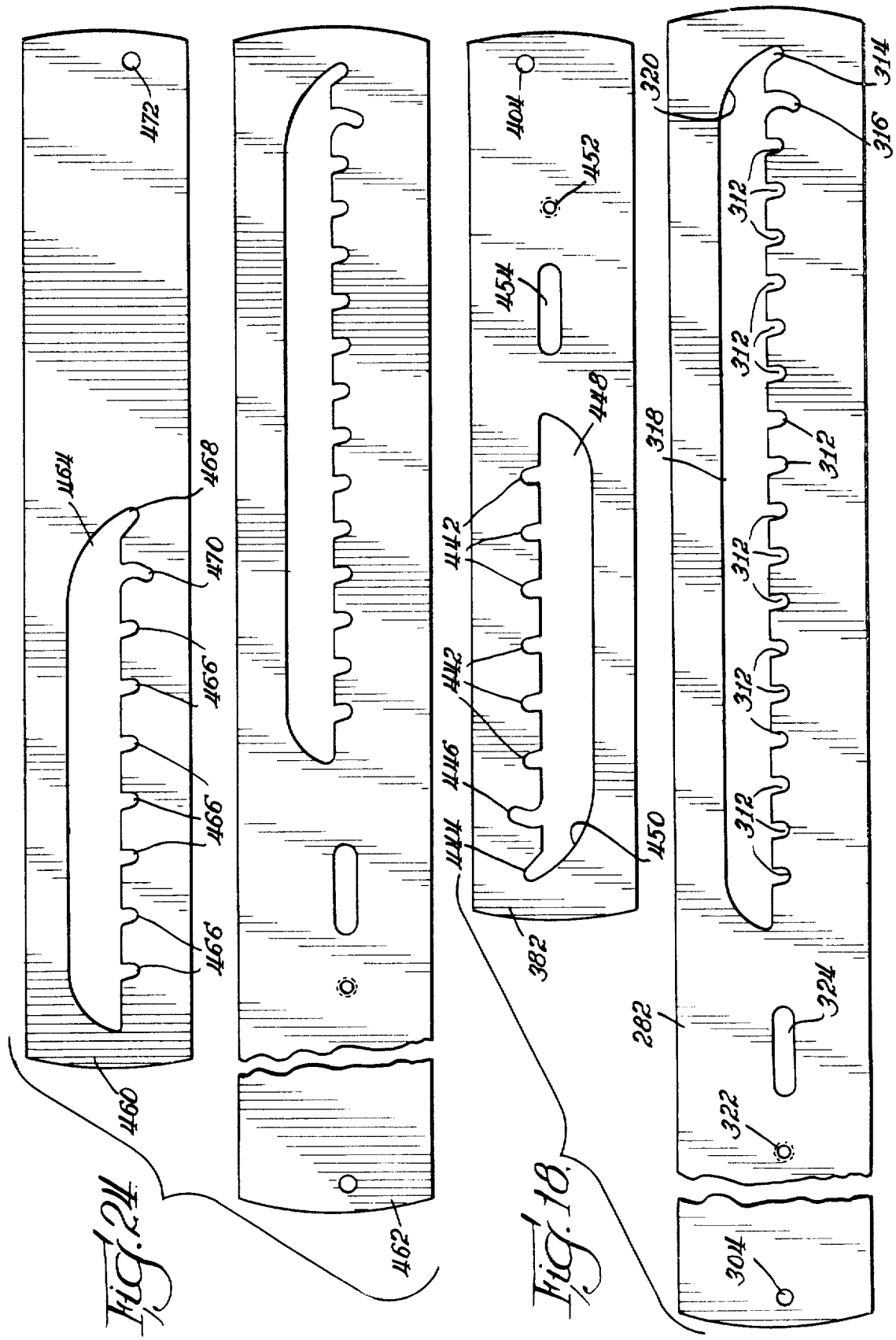

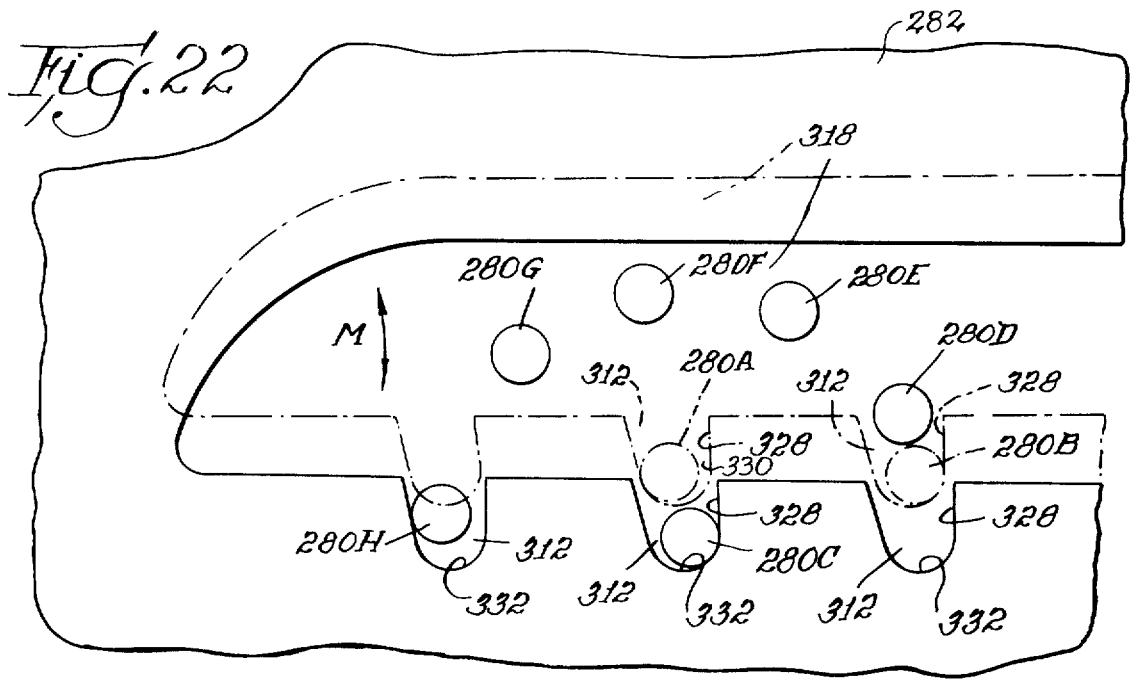
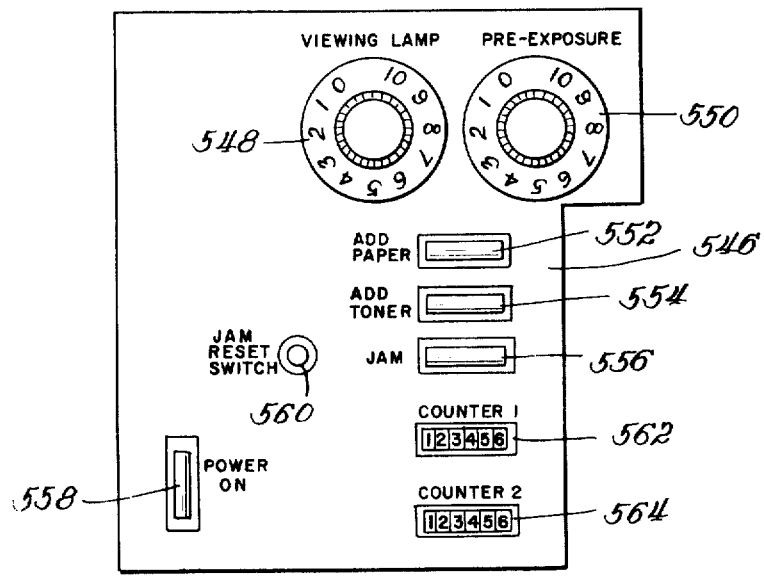

VIEWER PRINTER MACHINE

BACKGROUND OF THE INVENTION

A. Field of the Invention

The invention generally relates to a device for selectively displaying or reproducing micro-images and, more specifically, to an improved device for selectively displaying or rapidly reproducing micro-images stored in microfiche form.

B. Description of the Prior Art

Information storage in the form of micro-images disposed on a microfiche has become quite commonplace. Filing space is drastically reduced with the storage of information in this manner. However, the storage of information in this manner is only acceptable if the information stored is quickly and easily retrievable. The information storage must be capable of being retrieved by the projection of the microimages onto a viewing screen for viewing and study and, in many cases, by the rapid reproduction of enlarged paper copies of the micro-images.

It has been known to combine both the capability for viewing micro-images and the capability for reproducing paper copies of the micro-images into a single machine. However, the prior art machines, for the most part, are unacceptably complex and slow in reproducing paper copies of micro-images, especially micro-images stored on a microfiche.

SUMMARY OF THE INVENTION

An object of the present invention is to provide a new and improved device for reproducing copies of an original document.

Another object of the present invention is to provide a new and improved device for displaying information stored in micro-image form on a viewing or display screen.

Another object of the present invention is to provide a new and improved device for rapidly reproducing information stored in micro-image form.

Another object of the present invention is to provide a new and improved device for selectively displaying information stored in micro-image form on a viewing screen or for rapidly reproducing tangible copies of information stored in micro-image form.

Another object of the present invention is to provide a new and improved device for selectively displaying on a viewing screen information stored in micro-image form on a microfiche or for rapidly reproducing tangible copies of information stored in micro-image form on a microfiche.

Another object of the present invention is to provide a new and improved device for selectively displaying or reproducing information stored in micro-image form on a microfiche and including a transport assembly for moving consecutively disposed micro-images sequentially into and through an illumination path of the device for either viewing or reproduction by the device.

Another object of the present invention is to provide a new and improved device for selectively displaying or reproducing information stored in micro-image form on a microfiche and including a transport assembly for moving the microfiche along two, orthogonally-disposed, longitudinal axes to enable the positioning of a preselected micro-image stored on the microfiche in the illumination path of the machine.

Another object of the present invention is to provide a new and improved device for selectively displaying information stored in micro-image form on a microfiche or for rapidly reproducing a first, variable, preselectable number of collated sets of a second, variable, preselectable number of a sequentially disposed micro-images on the microfiche.

Another object of the present invention is to provide a new and improved device for selectively displaying or reproducing information stored in micro-image form on a microfiche including transport means for automatically moving the microfiche through the machine and control means for enabling the transport assembly to automatically position a preselected micro-image stored on the microfiche in the illumination path of the machine for either display or reproduction by the machine.

Briefly, the device of the present invention comprises a micro-image viewer printer machine for selectively displaying or rapidly reproducing micro-images, particularly those stored on a microfiche, without the deficiencies exhibited by the prior art devices referred to above. The machine includes an optical assembly having two independent radiation sources, the first source providing the illumination to project the micro-images to a viewing screen and the second source providing the illumination to project the microimages to an exposure station for reproducing copies of the micro-images.

The machine further includes a transport assembly for moving sequentially disposed micro-images stored in varying formats on microfiches into and through an illumination path. The transport assembly includes a movable column slide for moving micro-images sequentially disposed along a column of a microfiche into and through the illumination path and a movable row slide for moving images sequentially disposed along a row of the microfiche into and through the illumination path.

The device of the present invention further includes a control circuit for selectively displaying or rapidly reproducing micro-images stored on a microfiche. The control circuit includes novel means for stepping sequentially stored micro-images disposed in various formats on a microfiche through the illumination path of the device. The control circuit enables the device of the present invention to rapidly reproduce a first, preselectable, variable number of sequentially stored micro-images. The control circuit further causes the machine to automatically position a preselected micro-image from a plurality of micro-images in the illumination path of the machine for display or reproduction.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 9 is an enlarged, fragmentary, partially-elevational and partially-cross-sectional view of a portion of the device of the present invention taken along line 9—9 of FIG. 8;

FIG. 10 is an enlarged, fragmentary, partially-cross-sectional view of a portion of the device of the present invention taken along line 10—10 of FIG. 8;

FIG. 11 is an enlarged, fragmentary, partially-cut-away plan view of a portion of the device of the present invention taken along line 11—11 of FIG. 6;

FIG. 12 & 13 are enlarged, cut-away, fragmentary, cross-sectional views of a portion of the device in the present invention in two different operating conditions taken along line 12-13 of FIG. 11;

FIGS. 14 & 15 are enlarged, cut-away, fragmentary, cross-sectional views of a portion of the device of the present invention in two different operating conditions taken along line 14—14 of FIG. 11;

FIG. 16 is an enlarged, fragmentary, cross-sectional view of a portion of the device of the present invention taken along line 16—16 of FIG. 8;

FIG. 17 is an enlarged, detailed, plan view of a portion of the device of the present invention taken along line 17—17 of FIG. 9;

FIG. 18 is an enlarged, partially-cut-away, plan view of a pair of control components of the device of the present invention;

FIGS. 19 through 22 are enlarged, fragmentary, detailed views of the interaction between various control components of the device of the present invention;

FIG. 23 is an enlarged, detailed, plan view of a portion of the device of the present invention taken along line 23—23 of FIG. 9;

FIG. 24 is an enlarged, partially-cut-away, plan view of a pair of control components of the device of the present invention;

FIG. 25 is an enlarged, fragmentary, plan view of a portion of the device of the present invention taken from line 25—25 of FIG. 10;

FIG. 26 is an enlarged, detailed, plan view of a portion of the device of the present invention taken from lines 26—26 of FIG. 1;

FIG. 27 is a diagramatic view of a plurality of auxiliary control components of the device of the present invention.

DESCRIPTION OF THE PREFERRED EMBODIMENTS General

Figure 1:
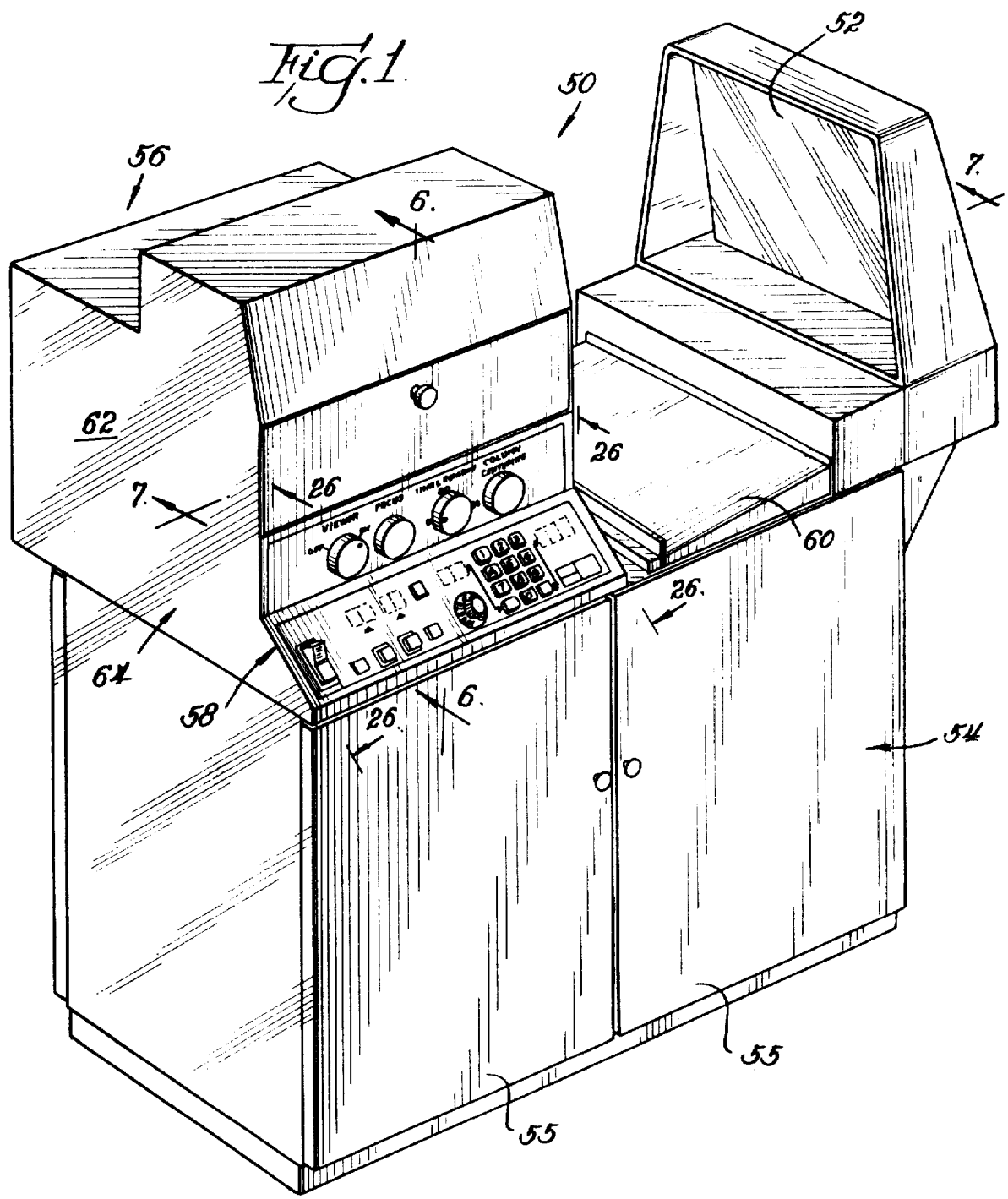
FIG. 1 is a front, perspective view of a preferred embodiment of a microfiche viewer printer machine constructed in accordance with the principles of the present invention.

Referring to the drawings and initially to FIG. 1, there is illustrated a preferred embodiment of a new and improved micro-image or microfiche viewer printer machine 50, constructed in accordance with the principles of the present invention. The machine 50 enables the selective viewing or rapid reproduction of micro-images stored on a microfiche. The machine 50 enables the rapid reproduction of a first, variable, preselectable number of collated sets of a second, variable, preselectable number of consecutively stored micro-images disposed on a microfiche.

In accordance with an important advantage of the present invention, the machine 50 includes a viewing or display screen 52 for receiving projected images of the micro-images stored on a microfiche for viewing and study by an operator. The machine 50 further includes a printing or reproduction assembly 54, generally disposed behind a pair of access doors 55; an optics and transport section 56; a control panel 58; and a tray 60 for receiving paper copies of the micro-images stored on a microfiche.

The optics and transport section 56 further includes an optics assembly 62 for alternately providing projected images of the micro-images stored on a microfiche to the viewing screen 52 or to the printing or reproduction assembly 54. The optics and transport section 56 further includes a novel transport assembly 64 for moving consecutively stored micro-images on a microfiche into and through an illumination path of the optics assembly 62.

Figure 2:
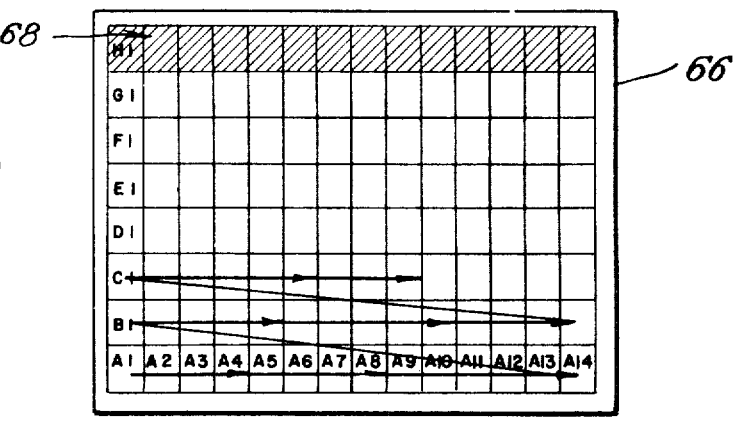
FIGS. 2 through 5 depict microfiches of varying sizes and formats that are suitable for being displayed or reproduced by the device of the present invention.
Figure 3:
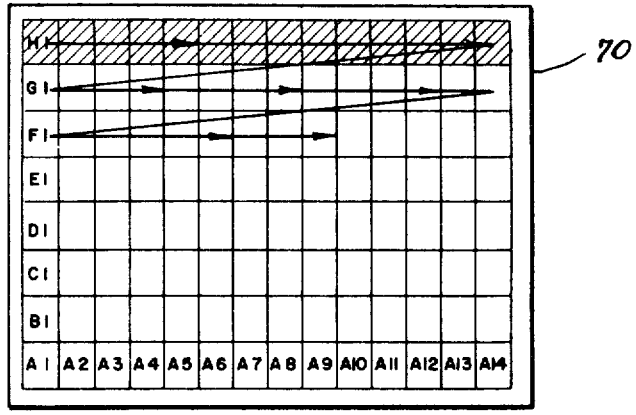

In accordance with an important feature of the present invention, the machine 50 is capable of selectively displaying or automatically, rapidly reproducing micro-images stored on microfiches of varying sizing and formats. In general, there are two common modes or two common "paginations" for consecutively storing or disposing micro-images on a microfiche. The first pagination is known as the COSATI pagination (FIGS. 2 and 3). In general, micro-images stored on a microfiche in accordance with the COSATI pagination are consecutively disposed across a column of the microfiche.

There are also two general ways in which micro-images may be stored on a microfiche in accordance with the COSATI pagination. The first general type of COSATI pagination is the COSATI PREFERRED (COSATI PREF.) pagination (FIG. 2). In accordance with this pagination, a first micro-image A1 is stored in the lower left-hand corner of a microfiche 66. When the micro-image A1 is positioned in the illumination path of the machine 50, the transport assembly 64 is said to be in its "home position".

In accordance with the COSATI PREF. pagination, the next consecutive micro-image A2 disposed on the microfiche 66 is positioned immediately to the right of the micro-image A1 along the lower most or "A" column of the microfiche 66. The next consecutively stored micro-image appears at A3 and in like manner through A14. The next consecutive micro-image after A14 stored in accordance with the COSATI PREF. pagination appears at B1. The next consecutively stored micro-image after micro-image B1 appears at B2 and so on throughout the remaining portion of the microfiche 66.

The transport assembly 64 in positioning consecutively stored micro-images in the proper order in the illumination path of the machine 50 first positions the micro-image A1 in the illumination path and then consecutively positions the micro-images A2 through A14 in the illumination path in that order. After positioning the micro-image A14 in the illumination path for display on the viewing screen 52 or for reproduction by the printing or reproduction assembly 54, the transport assembly 64 next positions the micro-image B1 in the illumination path for display or reproduction by the machine 50. In like manner, transport assembly 64 sequentially positions the micro-images B2 through B14 in that order in the illumination path of the machine 50. Normally, the last micro-image stored on the microfiche 66 to be positioned in the illumination path is micro-image G14. If, however, the microfiche 66 is of the type that includes a trailer portion, that is, a plurality of micro-images stored across a column 68 that is normally reserved as a title space for the microfiche 66, the transport assembly 64 positions the micro-image HL in the illumination path after the micro-image G14 and continues in this manner to position the micro-images H2 through H14, in that order, in the illumination path. After positioning the micro-image H14 in the illumination path, the transport assembly 64 is normally returned to its home position in which the micro-image A1 is positioned in the illumination path of the machine 50.

The second general type of COSATI pagination is the COSATI ALTERNATE (COSATI ALT.) pagination (FIG. 3). If a microfiche 70 includes a trailer portion, as discussed above, the first micro-image stored on the microfiche 70 is the micro-image H1. The next consecutively disposed micro-image stored on the microfiche 70 is the micro-image H2. In like manner, the next consecutively disposed micro-images are the micro-images H3 through H14. After H14, the next consecutively stored micro-images are the micro-image G1 and then the micro-images G2 through G14, in that order. The last consecutively stored micro-image on the microfiche 70 is the micro-image A14. Thus, the home position of the transport assembly 64 of the machine 50 or, in other words, the first micro-image positioned in the illumination path of the machine 50 by the transport assembly 64 is the micro-image H1, if the microfiche 70 includes a trailer portion. If the microfiche 70 does not include a trailer portion, then the first micro-image stored on the microfiche 70 is the micro-image G1. Thus, the transport assembly 64 is in its home position when the micro-image G1 is positioned in the illumination path of the machine 50.

A microfiche 72 illustrates the storage of micro-images in accordance with the Computer Output Microfilm (COM) pagination. If the microfiche 72 includes a trailer portion, then the first micro-image stored on the microfiche 72 is the micro-image H1. Thus, the positioning of the micro-image H1 in the illumination path of the machine 50 establishes the home position of the transport assembly 64. The micro-images stored subsequently to the micro-image H1 are sequentially stored on the microfiche 72 in the following order: G1, F1, E1, D1, C1, B1, A1, H2, G2, F2, E2, and so forth through A14. Thus, the transport assembly 64 sequentially positions the micro-images stored on the microfiche 72 in that order in the illumination path of the machine 50. If the microfiche 72 does not include a trailer portion, the first micro-image stored on the microfiche 72 is the micro-image G1.

In accordance with an important feature of the present invention, a two-position, manually operable mode switch is provided to enable an operator to preset or reset the machine 50 for the display or reproduction of microfiches having a COSATI pagination in one position (column) of the mode switch or for the display or reproduction of microfiches having the COM pagination in the other position (row) of the mode switch. In addition, a two-position, manually operable force inverter assembly is provided to enable the operator to preset or reset the machine 50 for the display or reproduction of microfiches having the COSATI ALT. pagination in one position of the force inverter assembly or for the display or reproduction of microfiches having the COSATI PREF. pagination in the other position of the force inverter assembly.

The microfiches 66, 70, and 72 illustrate a specific size of a microfiche having fourteen rows and either seven or eight columns depending upon whether a trailer portion is provided. Since many different sizes of microfiches are commonly used, an important feature of the present invention is the capability of the machine 50 to selectively display or rapidly reproduce micro-images stored on the microfiches of many different sizes with a minimum amount of required adjustment steps. An example of a microfiche of a different size than the microfiches 66, 70, and 72, is a microfiche 74 which includes eighteen rows and either six or seven columns, depending upon whether a trailer portion is provided.

Many commonly used microfiches of different sizes each having micro-images disposed thereof in accordance with a COSATI pagination are specifically described in a document entitled "American National Standard Specifications For Microfiches-ANST PH5.9-1970", published by the American National Standard Institute, Incorporated, and distributed by the American Library Association. Similarly, the commonly used microfiches of different sizes having micro-images disposed thereon in accordance with the COM pagination are specifically described in a document entitled "NMA Standard - Format & Coding Standards For Computer Output Microfilm - NMA MS2-1971", published and distributed by the National Microfilm Association.

OPTICS ASSEMBLY

In accordance with an important feature of the present invention, the optics assembly 62 of the machine 50 includes plural radiant energy sources for emitting radiation or illumination along a common illumination path for selectively displaying or reproducing micro-images stored on a microfiche. The plural radiant energy sources are positioned such that their emitted radiation is focused at the same focal point to thereby simulate a single point source of radiation. The plural radiation sources of the optics assembly 62 includes a viewing lamp 76 (FIGS. 6 and 7), having an associated reflector 78, mounted above and in line with a xenon arc exposure lamp 80 and a condenser lens assembly 82. The reflector 78 focuses the illumination from the viewing lamp 76 at the focal point of the exposure lamp 80. The viewing lamp 76 and the exposure lamp 80 are positioned sufficiently close the condenser lens assembly 82 to fill the condensers of the assembly 82 with sufficient illumination to fully and equally illuminate an entire image field.

The viewing lamp 76 is fully energized during the viewing or display portion of the operation of the machine 50. During the printing portion of the operation of the machine 50, the viewing lamp 76 is de-energized. Alternately, the voltage applied to the viewing lamp 76 during the printing portion of the operation of the machine 50 may be maintained at a reduced level in order to increase the life of the filament of the viewing lamp 76.

In accordance with an important feature of the present invention, the energization or de-energization of the viewing lamp 76 is controlled by the position of a mirror assembly 84. The mirror assembly 84 is illustrated in solid line form in a position to enable the viewing or displaying of the micro-image on the viewing screen 52. In this position, a reflective surface 86 is positioned in the first of its two at-rest positions to intercept the illumination from a projection lens assembly 88 and a pechan prism 90 to thereby deflect the illumination for display on the viewing screen 52. In its second at-rest position, as illustrated by the dotted-line portions of FIGS. 6 and 7, the reflective surface 86 is moved out of the path of the illumination from the lens assembly 88 and the prism 90 to thereby enable the illumination to pass to the printing or reproduction assembly 54.

The projection lens assembly 88 is used to provide the proper magnification of a micro-image for display or reproduction by the machine 50 and to enable the proper focusing of an optical image produced by the machine 50 as viewed by an operator on the viewing screen 52. The pechan prism 90 is rotatable about an optical axis or central illumination path 92 in order to enable the rotation of the optical image of a micro-image by the operator of the machine 50 through an angle from 0 to 180 degrees as viewed on the viewing screen 52. The operator of the machine 50 is normally required to change the lens assembly 88 when different image size microfiches are inserted into the machine 50 in order to maintain or achieve a desired constant magnification of micro-images disposed on microfiches of different sizes.

Figure 41:
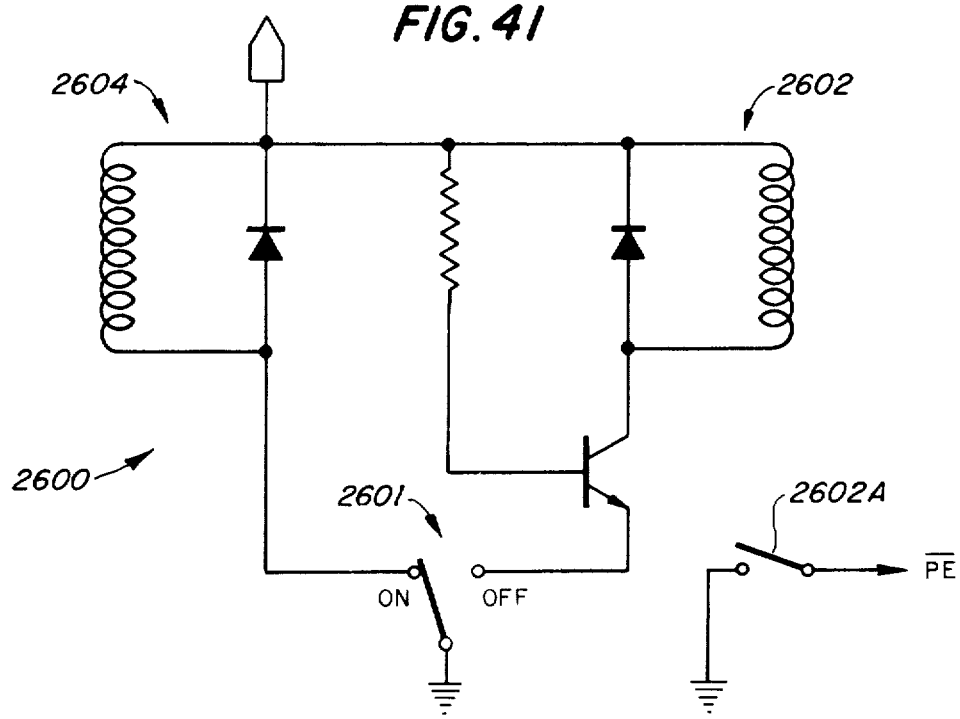

A mirror assembly mounting mechanism 94 is utilized to maintain the mirror assembly 84 in a proper postion with respect to the optical axis or illumination path 92. Preferably, a two-position viewing lamp switch (FIG. 41) is located on the mounting mechanism 94 and is controlled by a movable cam positioned on a rotatable shaft 96 for controlling the position of the reflective surface 86.

The viewing lamp switch is used to complete a viewing lamp electrical circuit when the reflective surface 86 is in its viewing or display position. The viewing lamp switch is used to open and thereby de-energize the viewing lamp electrical circuit when the reflective surface 86 is in its printing position to prevent the pre-exposure or over exposure of a sheet of copy material. Alternately, as indicated above, the viewing lamp switch could be used to complete a second viewing lamp electrical circuit when the reflective surface 86 is in its printing position to energize the viewing lamp 76 with a lesser voltage to prevent the filament of the viewing lamp 76 from cooling completely and to reduce the tendency of voltage transients to destroy the filamnet of the viewing lamp 76.

The same viewing lamp switch, in a preferred embodiment, is used to disable the printing assembly 54 of the machine 50 when the reflective surface 86 is in its viewing or display position. If the reflective surface 86 is moved from its printing position to its viewing or display postion while a copy is in process of being reproduced by the printing assembly 54, that copy is completed before the printing assembly 54 is inhibited.

In order to prevent the temperature within the optics and transport section 56 of the machine 50 from rising above an acceptable limit, a fan 98 and a suitable exhaust assembly are utilized to remove the heat generated during the operation of the machine 50.

PRINTING ASSEMBLY

The printing or reproduction assembly 54 (FIG. 7) of the machine 50 is essentially the same as that fully disclosed and described in co-pending United States patent applications, both assigned to the same assignee as the assignee of the present invention: application Ser. No. 250,687, filed on May 5, 1972 by William R. Maloney, now U.S. Pat. No. 3,739,671, and Harry Margulis and application Ser. No. 250,615, filed on May 5, 1972 by Richard W. Jackson and John J. Schulze, now U.S. Pat. No. 3,765,758. Further, various portions of the printing or reproduction assembly 54 are fully disclosed in the following six United States patents, all assigned to the same assignee as the assignee of the present invention: U.S. Pat. Nos. 3,626,898; ,653,755; 3,655,282; 3,655,283; 3,663,102; and 3,697,177. The above disclosures are all incorporated herein by reference thereof.

Briefly, the printing assembly 54 includes a reflective surface 102 for directing a projected image from the optics assembly 62 to an exposure station 104. The exposure station 104 receives a projected image from a microimage in response to a short radiant energy burst from the exposure lamp 80 after the reflective surface 86 has been placed in its copying position. Copy material 106 from a supply roll 108 is passed into and through the cutter station 110 by a pair of feed rollers 112 to separate individual sheets of copy material 106 from the supply roll 108.

From the cutter station 110, the copy material 106 is passed into and through a corona charging station 114 which applies a high voltage charge to the copy material 106. From the corona charging station 114, the copy material 106 passes to the exposure station 104 for exposure by the exposure lamp 80 to form a latent image of a micro-image on the copy material 106. From the exposure station 104, an exposed sheet of copy material 106 passes to a developer station 116 and a fuser station 118 which respectively develop the latent image and fuse the developed image to form a visable image or reproduction of the micro-image.

From the fuser station 118, the sheet of copy material 106 passes to an exist station 120 from which the sheet of copy material 106 is deposited in a face-up condition in the receiving tray 60. Alternately, an inverting paper shute may be used to receive a sheet of copy material 106 from the exit station 120 and to deposit the sheet in the receiving tray 60 or in a similar receiving tray disposed at a lower position than the receiving tray 60 in a face-down or image-down condition.

As disclosed in the above-identified co-pending patent applications, the exposure station 104 preferably includes two spaced sensors for detecting the leading edge of a sheet of copy material 106. The first sensor may be utilized to activate the cutter mechanism located at the cutter station 110 to sever a sheet of copy material 106 from the supply roll 108. The second sensor may be used to energize the exposure lamp 80 to provide a very short burst of radiant energy to expose a severed sheet of copy material 106. Preferably, these two sensors are photoelectrical sensors. Obviously, a single sensor in association with a suitable delay circuit could perform the functions of the two sensors discussed above.

The printing or reproduction assembly 54 of the machine 50 may be used to reproduce copies of either positive or negative microfiches. Before the machine 50 can be switched from reproducing copies of negative microfiches to reproducing copies of positive microfiches, the charging station 114 and the toner used in the developer station 116 must be changed from those required for positive imaging to those required for reversal imaging.

A pre-exposure strip 122 comprising an elongated source of radiant energy may be utilized in order to uniformly pre-expose a sheet of copy material 106 to precisely control and limit the amount of the high voltage charge on the sheet of copy material 106 when it arrives at the exposure station 104. Thus, the print density of copies reproduced by the machine 50 may be precisely controlled by the adjustment of the radiant energy outputs of the pre-exposure strip 122 and of the exposure lamp 80.

TRANSPORT ASSEMBLY

Figure 6:
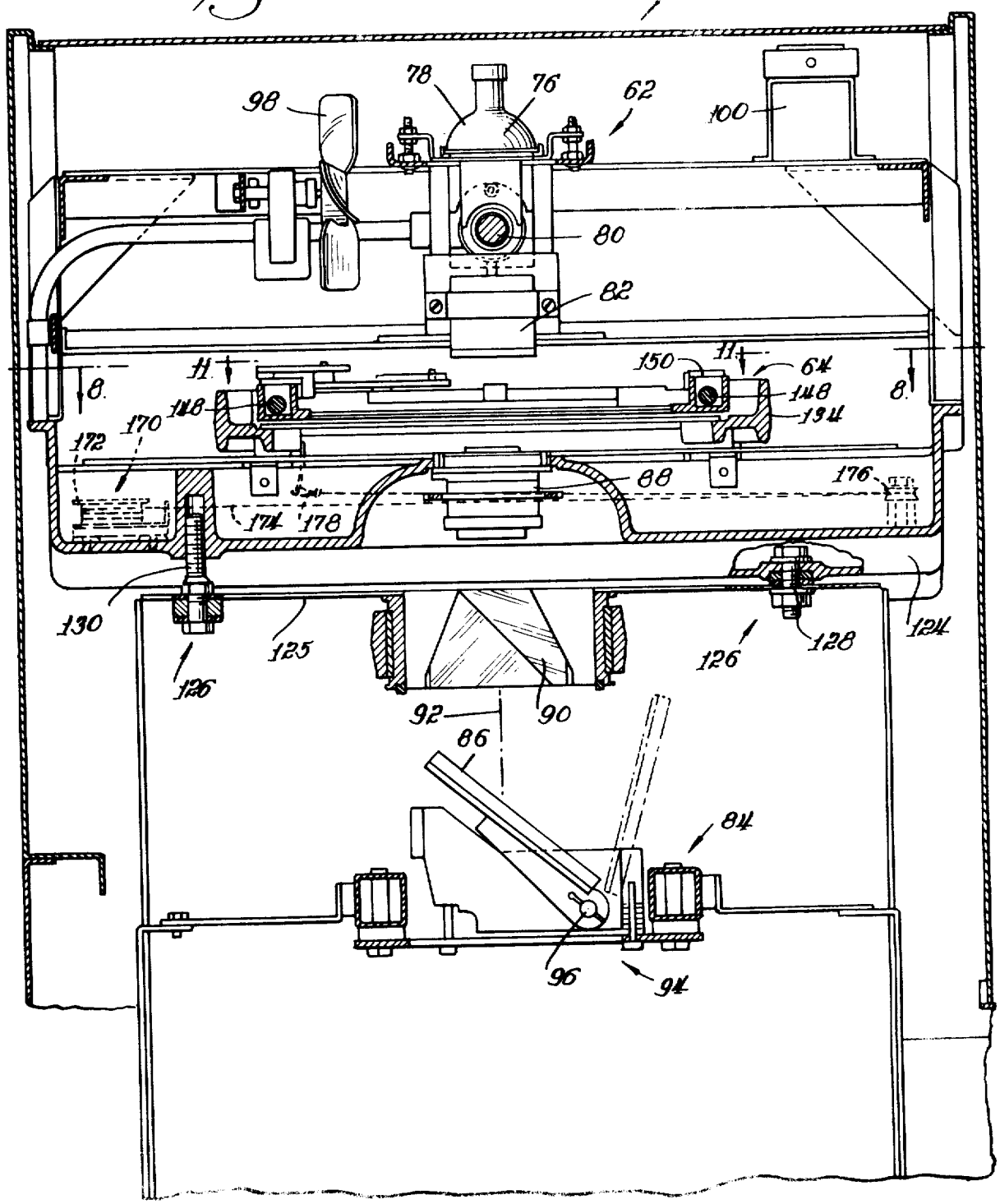
FIG. 6 is an enlarged, detailed, partially-elevational and partially-cross-sectional view of a portion of the device of the present invention taken along line 6—6 of FIG. 1.
Figures 8, 8A:
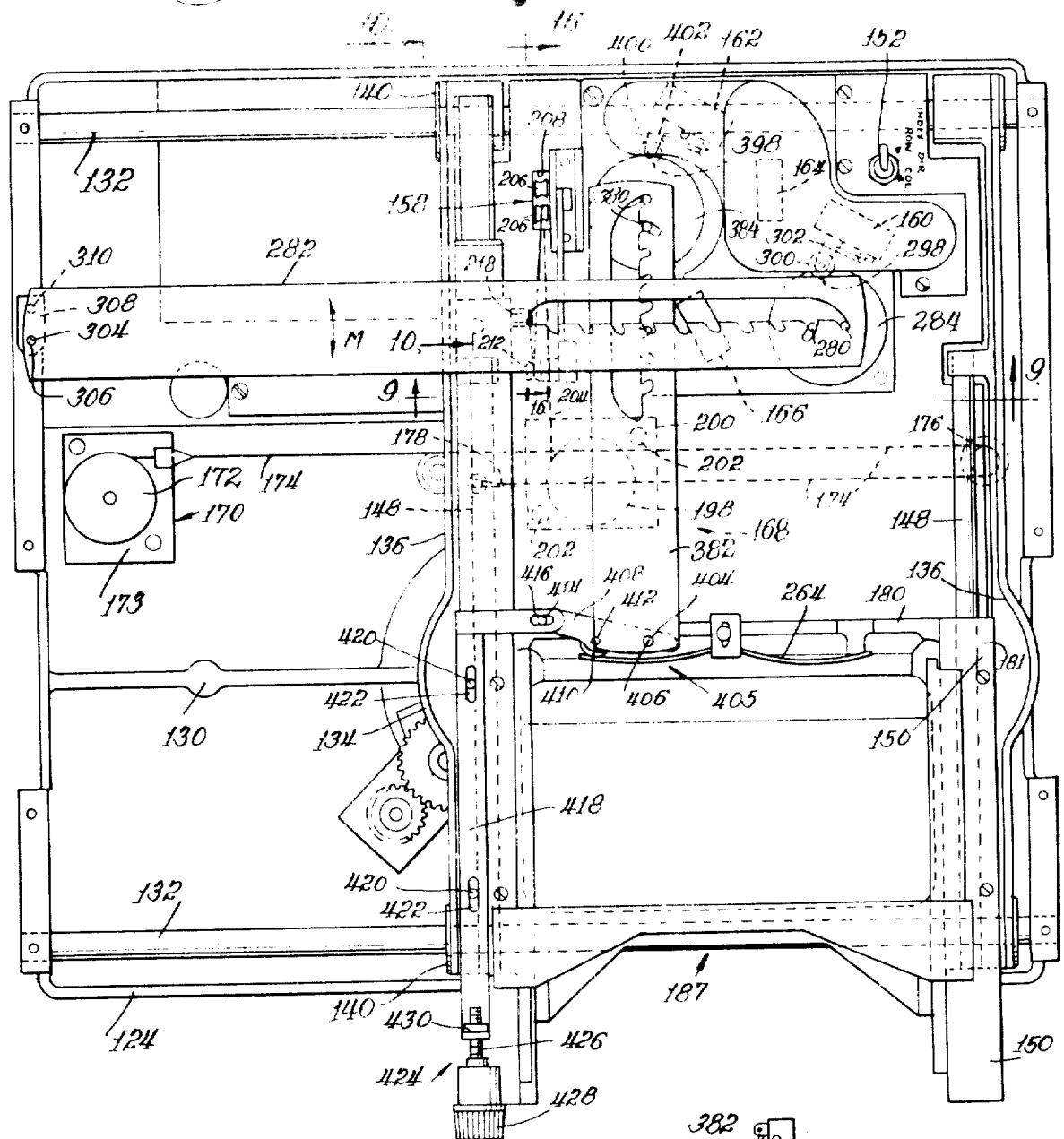
FIG. 8 is an enlarged plan view of a portion of the device of the present invention taken from line 8—8 of FIG. 6.
FIG. 8A is an enlarged, fragmentary, diagramatic view of a portion of the device of the present invention illustrated in FIG. 8.

In accordance with an important feature of the present invention, the novel transport assembly 64 of the machine 50 positions micro-images stored on a microfiche wthtin the optical axis or illumination path 92 of the optics assembly 62. The transport assembly 64 is generally supported within the optics and transport section 56 by a base casting member 124 (FIGS. 6 and 8). The base casting member 124 both provides support for the transport assembly 64 and provides mounting support for various features of the optics assembly 62, such as the viewing lamp 76, the exposure lamp 80, the condenser lens assembly 82, and the projection lens assembly 88. The casting member 124 further provides support for the fan 98 and an interlock switch mounting assembly 100.

The casting member 124 is positioned within the optics and transport section 56 by being mounted to a frame member 125 of the optics and transport section 56. The casting member 124 is preferably mounted to and above the frame member 125 by a three-point mounting system 126. A single, relatively fixed, spherical nut and bolt assembly 128 is used to generally establish the height of the base casting member 124 above the frame member 125. A pair of spaced, adjustable, threaded bolt and groove assemblies 130 enable the proper alignment of the base casting member 124 and the components it supports above the frame member 125.

In accordance with an important feature of the present invention, a plurality of two bearing rods 132 mounted on the casting member 124 physically support and enable the reciprocatory movement of a column slide 134. The column slide 134 (FIGS. 6, 8, 9 and 10) essentially includes two metallic casting members 136 supported by a rigid metallic base plate 138. Each of the members 136 includes a first set of holes 140 (FIG. 10) in which a first set of linear motion bearings 142 are disposed to slidably engage the bearing rods 132 and thereby permit reciprocatory movement of the column slide 134 along the bearing rods 132. The bearings 142 may be held in place within the castings 136 by screw or pin heads 144. Each of the members 136 further includes a second set of holes 146 (FIG. 9) for receiving and securely retaining a set of bearing rods 148 within suitable bearings 149. The bearing rods 148 are used as a support for and as a guide for the reciprocatory motion of a row slide 150.

The base plate 138 is further used to support a two-position manually operable mode switch 152 (FIG. 8) that enables an operator to preset or reset the machine 50 to display or reproduce microfiches having either the COM (ROW) or a COSATI (COL.) pagination. The base plate 138 also supports a column motor 154 for moving the column slide 134 and a row motor 156 for moving the row slide 150. The motors 154 and 156 are essentially identical and may be permanent split-phase capacitive reversible rotation motors, preferably having an output drive shaft speed in the range of forty to fifty revolutions per minute.

The base plate 138 further serves as a mounting means for a two-position, manually operable, force inverter assembly 158 (FIGS. 8, 9 and 16). The force inverter assembly 158 enables an operator to manually preset or reset the machine 50 for the display or reproduction of microfiches having either the COSATI ALT. pagination or the COSATI PREF. pagination. The base plate 138 further serves as a mounting means for a column cam switch 160 and a row cam switch 162 for controlling the operation of the motors 154 and 156, respectively. The base plate 138 further serves as a mounting means for a column slide limit switch 164 (FIG. 8A) and a row slide limit switch 166. The switches 164 and 166 are activated when the column slide 134 and the row slide 150, respectively, reach their limit positions. The base plate 138 also serves as a mounting means for a row slide return bias assembly 168 for providing the force to return the row slide 150 to its initial or home position.

In accordance with an important feature of the present invention, the column slide 134 is advanced from its initial or home position to its limit position by the column motor 154 against the force of a column slide return bias assembly 170 (FIGS. 6 and 8). The bias assembly 170 includes a spring bias return reel 172 disposed in a housing 173 that provides a force to continuously urge an elongated flexible cord 174 into a rewind position on the reel 172. The cord 174 is passed around a rotatable pulley 176 suitably mounted for rotation on the base casting member 124. The end 178 of the cord 174 is attached in any convenient manner to the movable column slide 134 to provide a force to continuously urge the column slide 134 to its home position above the pulley 176 as illustrated in FIG. 8. When the column slide 134 is in its home position (FIG. 8), one of the micro-images in the first row of one of the microfiches 66, 70 or 72 is positioned in the illumination path 92 of the machine 50.

In accordance with further important features of the present invention, the row slide 150 (FIGS. 8 and 11–15) is used to step micro-images located in consecutive rows of a microfiche into the illumination path 92 of the machine 50. The row slide 150 essentially includes a casting member 180 and a framing assembly 181 either partially or wholly surrounding the member 180 for supporting the various components that form the row slide 150. The row slide 150 further includes four linear motion bearings 149 mounted in the member 180 for supporting the row slide 150 and for guiding the movement of the row slide 150 along the set of bearing rods 148.

In accordance with an important feature of the present invention, the casting 180 further includes ledges 184 milled into the casting 180 for receiving, positioning and supporting an upper glass flat 186 of a novel microfiche loading assembly 187.

The upper glass flat 186 of the assembly 187 includes a lower planar surface 188 that serves to form an image plane for the machine 50 for receiving and securely retaining a microfiche 190 in a flat planar configuration. The microfiche 190 is pressed against the surface 188 by a lower glass flat 192 when the assembly 187 is in its printing position (FIGS. 13 and 15). Preferably, the upper glass flat 186 is maintained securely in position in the ledges 184 by resilient members 194 which also absorb the shock resulting from the contact between the upper glass flat 186 and the microfiche 190 or the lower glass flat 192. The resilient members 194 are maintained in position in abutment with the upper glass flat 186 by a pair of channel-shaped retaining members 196 fastened to the framing assembly 181 by means of the threaded bolts 198.

In accordance with an important feature of the present invention, reciprocatory motion of the row slide 150 along the bearing rod 148 is caused by the interaction of the row motor 156 and the row slide return bias assembly 168 (FIG. 8). The bias assembly 168 functions essentially the same as the bias assembly 170, discussed above. The bias assembly 168 includes a spring biased return reel 198 disposed within a housing 200 that is suitably mounted by means of the bolts 202 to the under surface of the base plate 138 of the column slide 134. The return reel 198 provides a constant force to continuously urge an elongated flexible cord 204 to return into the housing 200 for rewinding on the reel 198.

From the reel 198 and the housing 200, the cord 204 passes to a pair of rotatable pulleys 206 (FIGS. 8, 9 and 16) rotatably mounted in an elongated slot 208. The pair of pulleys 206 enable the flexible cord 204 to be directed in either one of two directions above the base plate 138 as determined by the position of the force inverter assembly 158. From the pair of pulleys 206, the flexible cord 204 is directed around a rotatable pulley 210 attached to the free or outermost end 212 of a movable arm 214 of the inverter assembly 158. From the pulley 210, the flexible cord 204 is directed to and securely attached to a slotted or reduced diameter portion 216 of a fixed post 218 securely attached to the row slide 150.

Figure 4:
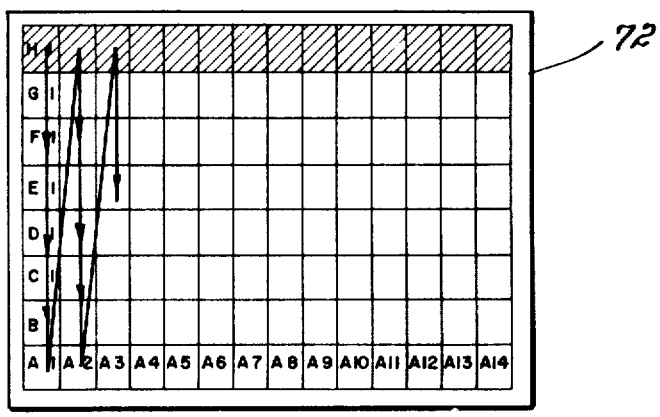

In accordance with an important feature of the present invention, the movable arm 214 of the force inverter assembly 158 is pivotable about a pivot pin 220 to either one of two, over-center limit positions 222 and 224. Since the central axis or axis of rotation of the pulley 210 in either one of the limit positions 222 and 224 is below the axis of rotation of the movable arm 214, the arm 214 is locked into position in either one of the positions 222 or 224. The movable arm 214 of the force inverter assembly 158 is placed in the position 222 (illustrated in solid lines in FIGS. 9 and 16) when an operator of the machine 50 desires to view or reproduce micro-images stored on the microfiche 66 (FIG. 2) in accordance with the COSATI PREF. pagination. The movable arm 214 is placed into the position 224 (illustrated in dotted line form in FIG. 16 and in solid line form in FIG. 8) when the operator of the machine 50 desires to view or reproduce micro-images stored on the microfiche 70 (FIG. 3) in accordance with the COSATI ALT. pagination or on the microfiche 72 (FIG. 4) in accordance with the COM pagination.

In accordance with a further important feature of the present invention, the row slide 150 provides support for the pair of glass flats 186 and 192 (FIGS. 11 through 15) which retain the microfiche 190 in a secure, planar condition against the lower flat surface 188 of the upper glass flat 186 for display or reproduction by the machine 50. The lower glass flat 192 is mounted on a movable carriage 226 by any convenient means, such as a retaining plate and screw assembly 227. The carriage 226 is placed in either a loading position (FIGS. 12 and 14) or in a printing position (FIGS. 13 and 15) by being manually moved along and through a pair of slots 228 formed by a pair of U-shaped channel members 230 attached to the casting member 180 or the framing assembly 181.

The carriage 226 includes a U-shaped channel member 232 and a double channel member 234. The U-shaped channel member 232 is used to enclose and engage an elongated leaf spring 236 for biasing the carriage 226 in the direction of the upper glass flat 186. The channel member 234 encloses and engages an elongated leaf spring 238 that is structurally and functionally identical to the leaf spring 236. The channel member 234 further encloses and engages an elongated leaf spring 240 that is used to bias the carriage 226 against the base portion of one of the channel members 230. The leaf spring 240 serves to continuously position the lower glass flat 192 in the same relative position with respect to the upper glass flat 186 in the printing position (FIGS. 13 and 15). The microfiche 190 is controllably directed into engagement and disengagement with the upper glass flat 186 by means of a pair of pin followers 242 that contact and are guided by a pair of guide members 244 positioned on opposite longitudinal sides of the carriage 226. The pin followers 242 are biased against the guide members 244 by the elongated leaf springs 236 and 238.

Microfiches 190 are loaded into the machine 50 by being positioned on the lower glass flat 192. Microfiches 190 are securely retained in a proper uniform registration for subsequent display or reproduction by positioning one edge portion of each microfiche 190 either under a set of film clips 250 and against a plurality of upwardly extending registration edge portions or surfaces 250A, 250B and 250C of the assembly 227 or under an alternate set of film clips 252 and against a plurality of upwardly extending registration edge portions or surfaces 252A, 252B and 252C of the assembly 227, depending upon the size of the particular microfiche 190 being loaded into the machine 50. For example, a microfiche 190 generally having the shape and format of the microfiches 66, 70 or 72 is positioned on the lower glass flat 192 under the clips 250 and against the registration edge portions 250A, B and C. However, a microfiche 190 generally of the size and format of the microfiche 74 is positioned on the lower glass flat 182 under the clips 252 and against the registration edge portions 252A, B and C. The distance between the edge portion 250A and a similar, upwardly extending edge portion 251 and the corresponding distance between the edge portion 252A and the member 230 are preferably greater than the standard widths of the microfiches 66, 70 and 72 and the microfiche 74, respectively, to provide clearances for slight deviations in the widths of these microfiches.

If the machine 50 is of the type that reproduces and delivers copies in an image-down or face-down condition into a receiving tray, the microfiche 190 is positioned on the lower glass flat 192 by placing the title column, for example, the column 68 (FIG. 2) of the microfiche 66, under the film clips 250 and against the edge portions 250A, B and C to enable the microfiche 66 to be stepped through the machine 50 in a normal forward sequence. Alternatively, if the machine 50 is of the type that reproduces and delivers copies of microimages into the receiving tray 60 in an image or face-up condition, the microfiche 190 is rotated 180° in the plane of the microfiche before placing the lowermost edge of the microfiche 190 under the film clips 250. Thus, for example, the column containing microimages A1 through A14 of the microfiche 66 (FIG. 2) would be placed under the film clips 250 to cause the microfiche 66 to be stepped through the machine 50 in a reverse sequence. That is the machine 50 reproduces the last micro-image in a desired set of micro-images first and proceeds to step the micro-images through the illumination path 92 in a reverse order until the first micro-image of the desired set of micro-images is reproduced. Thus, the machine 50 reproduces the desired number of consecutive micro-images and delivers these sets into the receiving tray 60 in a proper or positive collated form rather than in a reverse collated form.

After placing a microfiche 190 in engagement with the lower glass flat 192, a front portion 253 of the carriage 226 is gripped by the operator and moved from the film-loading position (FIGS. 12 and 14) through the slots 228 under the direction of the guide members 244 into the printing position (FIGS. 13 and 15).

Each of the guide members 244 includes a leading edge portion 256 inclined at a slight angle to a relatively horizontal middle portion 258. The leading edge portion 256 serves along with other conventional limit structural elements suitably disposed along the slots 228 to serve as a forward stop for the carriage 226 for securely maintaining the carriage 226 in its loading position (FIGS. 12 and 14). Preferably, the angle of inclination of the leading edge portion 256 is sufficiently slight to provide clearance for loading a microfiche 190 beneath a latching portion 260 of the microfiche loading assembly 187.

Each of the guide members 244 further includes a trailing edge portion 262 inclined at a greater angle than the angle of inclination of the leading edge portion 256 to enable the movable carriage 226 to be raised by the bias forces of the leaf springs 236 and 238 to place the microfiche 190 in engagement with the lower planar surface 188 of the upper glass flat 186. The trailing edge portion 262 further serves in conjunction with an elongated leaf spring 264 (FIG. 8) as a stop for the movable carriage 226 to securely retain the movable carriage 226 in its printing position (FIGS. 13 and 15). The leaf spring 264 engages a rear portion 266 of a carriage 266 to provide a generally outward bias force to maintain the front portion 253 in a secure locking engagement with the latching portion 260.

The latching portion 260 includes an inclined locking edge portion 268 to securely engage the front portion 253 of the carriage 226 and to securely maintain the carriage 226 in its printing position (FIGS. 14 and 15) against the bias force of the leaf spring 264. A centrally disposed cut-away portion 270 of the latching portion 260 is provided to enable an operator to grip the front portion 253 of the carriage 226 to move the carriage 226 from its printing position (FIGS. 13 and 15) to its loading position (FIGS. 12 and 14). By gripping the front portion 253 generally in the area of the cut-away portion 270, the carriage 226 may be moved downwardly generally in a direction away from the upper glass flat 186 and slightly rearwardly against the bias force of the leaf spring 264 to disengage the front portion 253 from the locking edge portion 268 of the latching portion 260. After the front portion 253 is disengaged from the latching portion 260, the carriage 226 may be manually moved forward, generally in a direction away from the leaf spring 264, until the carriage 226 reaches its loading position (FIGS. 12 and 14). In this position, the microfiche 190 may be removed from either the film clips 250 or the film clips 252.

In accordance with a further important feature of the present invention, the column slide 134 is caused to move in incremental steps against the bias force of the column slide return bias assembly 170 by the novel engagement and relative movement of a pair of column slide drive pins 280 (FIGS. 8, 9 and 17) and a novel, relatively fixed, slotted column rack 282 (FIGS. 8, 9 and 18). The drive pins 280 are attached to a column pin disc 284 which is rotatably driven by a column drive disc 286. The drive disc 286 is connected to an output shaft 288 of the column motor 154. The column pin disc 284 includes a central aperture 290 and a drive aperture 292 for receiving a central locating pin 294 and a drive pin 296, respectively, both securely attached to the drive disc 286. The aperture 292 is generally collinearly disposed with respect to the pair of drive pins 280 to provide a readily discernible visual and tactile indication that the disc 284 is a column pin disc 284 and not a row pin disc discussed hereinafter.

The drive disc 286 further includes a pair of slots 298 disposed 180 degrees apart above the circular periphery of the disc 286 to alternatively receive a rotatable portion 300 (FIG. 8) of a cam follower biased switch arm 302 of the column cam switch 160. During the normal stepping operation of the column slide 134, receipt of the rotatable portion 300 within one of the cam slots 298 activates the cam switch 160 to stop the column motor 154 to prevent further rotation of the discs 284 and 286. Thus, during the normal advancement of the column slide 134, the discs 284 and 286 rotate in 180 degree steps. For each 180 degree rotation of the discs 284 and 286, one of the drive pins 280 is rotated or pivoted about the other of the drive pins 280 to move the drive pins 280 into alternating slots of the column rack 282. Since the column rack 282 is generally fixed to the base casting member 124 and since the column motor 154 is securely mounted to the base plate 138 of the column slide 134, the column slide 134 is moved in a generally forward direction against the force of the return bias assembly 170 by the 180 degree stepwise rotational movement of the drive pins 280 into alternating slots of the column rack 282.

Generally, the distance between the central longitudinal axes of the drive pins 180 corresponds to the distance between the center lines of two adjacent microimages disposed along a column of a microfiche 190. Since each rotation of the discs 284 and 286 causes the column slide 134 to advance a distance equal to the spacing between the central longitudinal axes of the drive pins 280, each step-wise rotation of the discs 284 and 286, provided there is no relative movement between the column slide 134 and the row slide 150, causes the next consecutively stored micro-image in a column of the microfiche 190 to be brought into the illumination path 92 of the optics assembly 62 for display or reproduction by the machine 50.

Since the spacing between the center lines of micro-images consecutively disposed along a column of the microfiche 190 normally varies with the different sizes and rotation of the discs 284 and 286, one of the drive pins 280 is rotated or pivoted about the other of the drive pins 280 to move the drive pins 280 into alternating slots of the column rack 282. Since the column rack 282 is generally fixed to the base casting member 124 and since the column motor 154 is securely mounted to the base plate 138 of the column slide 134, the column slide 134 is moved in a generally forward direction against the force of the return bias assembly 170 by the 180 degree stepwise rotational movement of the drive pins 280 into alternating slots of the column rack 282.

Generally, the distance between the central longitudinal axes of the drive pins 180 corresponds to and, preferably, slightly exceeds the distance between the center lines of two adjacent micro-images disposed along a column of a microfiche 190. Since each rotation of the discs 284 and 286 causes the column slide 134 to advance a distance equal to the spacing between two adjacent micro-images disposed along a column of the microfiche 190, each stepwise rotation of the discs 284 and 286, provided there is no relative movement between the column slide 134 and the row slide 150, causes the next consecutively stored micro-image in a column of the microfiche 190 to be brought into the illumination path 92 of the optics assembly 62 for display or reproduction by the machine 50.

Since the spacing between the center lines of micro-images consecutively disposed along a column of the microfiche 190 normally varies with the different sizes and formats of different microfiches 190, a plurality of interchangeable pin discs 284 are provided, each having a different spacing between the central longitudinal axis of the drive pins 280 that corresponds to the spacing between the center lines of micro-images consecutively stored along the columns of the different types of microfiches 190 discussed above. Similarly, in order to accommodate the different pin discs 284, a plurality of interchangeable column racks 282 is provided.

In accordance with an important feature of the present invention, the column rack 282 is relatively fixed in place with respect to the base casting member 124 (FIG. 8). The column rack 282 includes a mounting aperture 304 (FIGS. 8 and 18) for engagement with a column slide adjustment assembly 305. The column slide adjustment assembly 305 includes a mounting pin 306 for receipt within the aperture 304 and affixed to the free end portion of a movable adjustment arm 308 that is rotatably movable about the axis of rotation of an integral adjustment pivot pin 310. Rotation of the pin 310 causes the rotational displacement of the pin 306 and a corresponding lateral displacement of the column rack 282. Since, in the normal operating condition, the drive pins 280 are in a secure engagement in alternate slots of the column rack 282, lateral displacement of the column rack 282 causes a corresponding lateral displacement of the column slide 134. The lateral displacement of the column slide 134 causes the corresponding lateral displacement of a micro-image in the illumination path 92 of the optics assembly 62 of the machine 50. Thus, the column slide adjustment assembly 305 enables a micro-image disposed in the illumination path 92 and its image as projected to either the viewing screen 52 or the exposure station 104 to be adjusted along a first longitudinal axis in the viewing or exposure plane. Preferably, the pivot pin 310 is controllably rotatable by a gear assembly or a flexible cable assembly (not illustrated) under the control of a conveniently disposed control knob to enable an operator of the machine 50 to adjust the position of the projected image of a micro-image on the viewing screen 52 in a rapid, simple manner.

In accordance with a preferred embodiment of the present invention, the column rack 282 (FIG. 18) includes a plurality of similarly shaped slots 312 and a first and a second, distinct, relatively irregularly shaped slots 314 and 316, respectively, enclosed within an elongated slotted portion 318 that provides a return path for drive pins 280 in returning to their initial or home position in engagement with the slots 314 and 316, corresponding to the initial or home position of the column slide 134, as discussed above. Obviously, the slotted portion 318 must be of a sufficient width to accommodate the stepwise rotational movements of the drive pins 280 along the column rack 282. The column rack 282 further includes a novel column rack return cam edge 320 both for returning the relatively freely pivotable column rack 282 to its initial or home position with the drive pins 280 positioned in the slots 314 and 316 and for braking or decelerating the moving column slide 134 in view of the frictional engagement of one of the drive pins 280 with the cam edge 320 and in view of the force required to return the column rack 282 to its initial or home position.

The column rack 282 further includes an aperture 322 and an elongated slot 324 for receiving and adjustably positioning a limit switch engagement pin for engaging and deflecting a movable arm 326 (FIG. 8A) of the column slide limit switch 164 when one of the drive pins 280 is positioned in the last of the slots 312, corresponding to the placement of the last micro-image in a column of the microfiche 190 in the illumination path 92 of the machine 50 by the column slide 134. As indicated above, the column slide limit switch 164 is suitably securely disposed on the base plate 138 to cause activation of the limit switch 164 by the limit swtich pin disposed in the elongated slot 324 of the column rack 282 at the appropriate time as indicated above. The precise position of the column slide limit switch activation pin may be adjusted along the slot 324 of the column rack 282 in order to accommodate minor variations in the disposition of micro-images along columns of microfiche having generally the same size and format.

In accordance with an important feature of the present invention, an edge portion 328 (FIGS. 19 through 22) is inclined at an angle B to enable the temporary locking engagement of one of the drive pins 280 with the edge portion 328 during the movement or rotation of the other drive pin 280 out of the preceding slot 312. Each of the slots 312 and 316 includes the edge portion 328 inclined at an angle B. Preferably, the angle B is in the range of from 5° to 15°. In a specific embodiment, the angle B is 10°.

Figure 19:
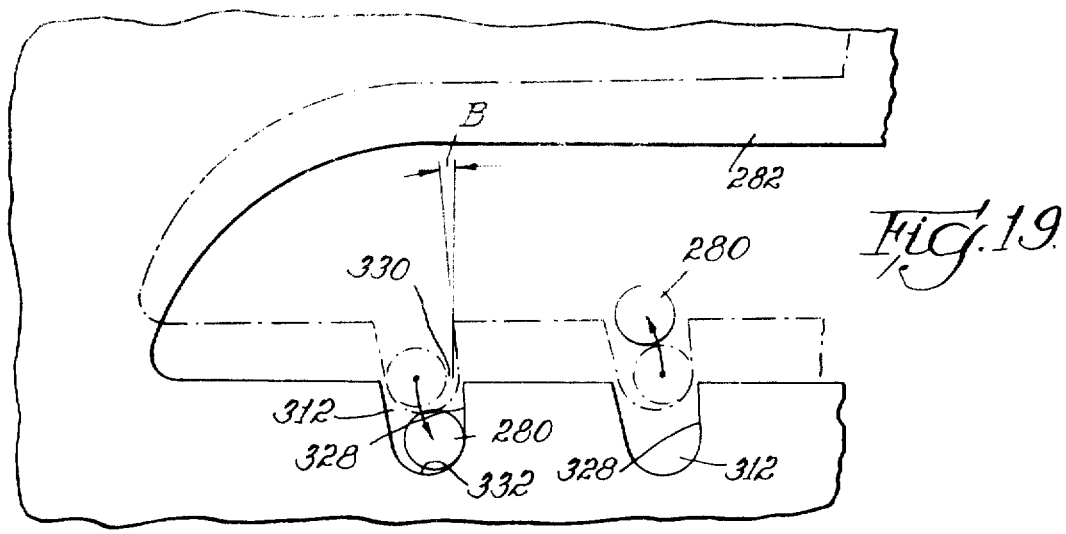

In accordance with an important feature of the present invention and as illustrated in the dotted line portion of FIG. 19, the slots 312 and 316 are suitably dimensioned to provide a small clearance 330 between one of the drive pins 280 and the edge portion 328 of the particular slot 312 or 316 in which that drive pin 280 resides when the pair of drive pins 280 are in a normal at-rest condition within two adjacent slots 312 or 316. The relatively small clearance 330 enables one of the drive pins 280 to be received within the next slot 312 or 316 during the stepwise engagement of the drive pins 280 along the column rack 282. The relatively small clearance 230 further enables the drive pins 280 to become disengaged from the column rack 282 during the reset operation of the drive pins 280 by which the drive pins 280 are returned to their initial or home position within the slots 314 and 316.

The normal stepwise advancement of the drive pins 280 through the slots 312 of the column rack 282 is illustrated in FIG. 22. The dotted line portion of FIG. 22 shows the normal at-rest position of the drive pins 280A and 280B. The outer periphery of the drive pin 280B is illustrated in engagement with the inclined edge portion 328 of its slot 312 to thereby provide the clearance 330 between the outer periphery of the drive pin 280A and the edge portion 328.

The drive pin 280A is illustrated in solid line form as the drive pin 280C during the forward advancement of the drive pin 280B along the column rack 282. The drive pin 280B is illustrated during various portions of its path of travel in advancing along the column rack 282 as drive pin 280D through drive pin 280H. It should be noted that due to the attachment of the column rack 282 to the column adjustment assembly 305 (FIG. 8) by means of the receipt of the mounting pin 306 within the mounting aperture 304, the column rack 282 is relatively freely rotatably movable in the direction of the arrow M in response to the rotational movement of the drive pins by the column motor 154.

The solid line portion of FIG. 22 illustrates the column rack 282 during the beginning portion of the 180 degree rotational movement of the drive pins 280. Initially, the column rack 282 is displaced from the dotted line portion to the solid line portion by the engagement of the periphery of the drive pin 280C with a lower-curved edge portion 332 of the slot 312. During the displacement of the column rack 282 and the engagement of the drive pin 280C with the edge portions 332 and 328, the drive pin 280D disengages from its slot 312 and generally travels through the positions 280D through 280H until the drive pin 280B reenters the next alternate slot 312 as the drive pin 280H. When the drive pins 280A and 280B have completed their 180° rotational movement, the column rack 282 is moved back to the position generally indicated by the dotted line portion of FIG. 22 by the camming interaction of the periphery of the drive pin 280C against the inclined edge portion 328 of its slot 312. The 180° rotational advancement of the drive pins 280, as illustrated in FIG. 22, causes the last micro-image disposed in one of the columns of a microfiche 190 to be positioned in the illumination path 92 for display or reproduction by the machine 50.

Figure 20:
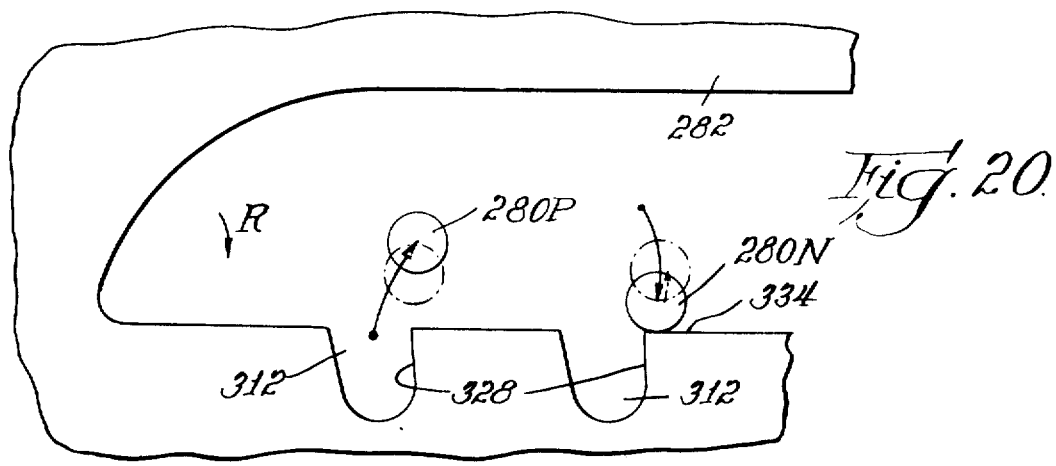
Figure 21:
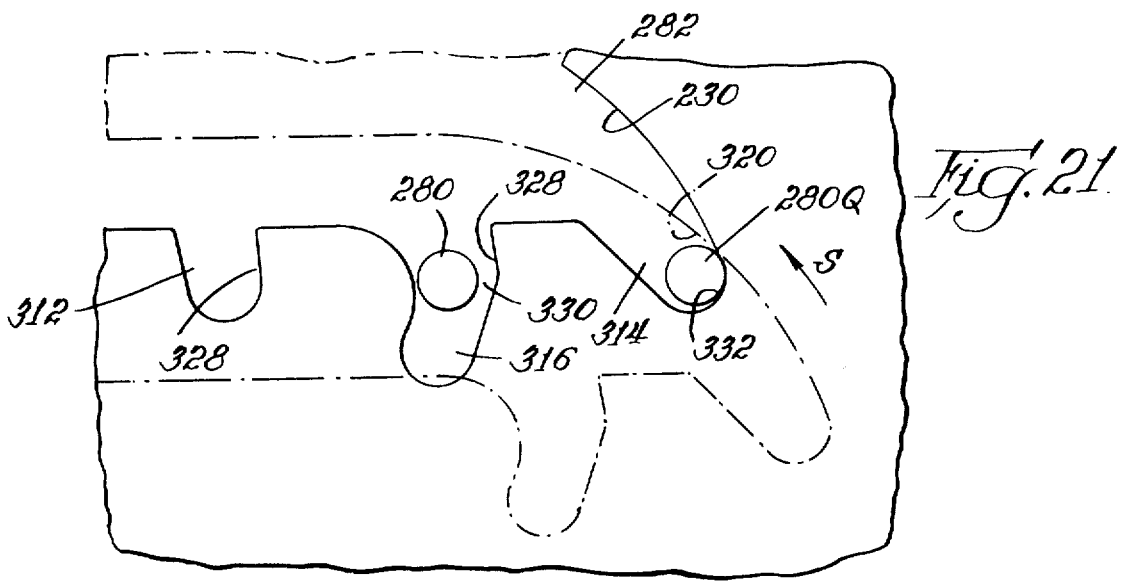

In accordance with an important feature of the present invention, the drive pins 280 are returned to their initial or home position in the slots 314 and 316 of the column rack 282 by means of a novel reset operation diagrammatically illustrated in the solid and dotted line portions of FIGS. 19 through 21. Since the drive pins 280 are securely affixed to the column slide 134, returning the drive pins 280 to their initial or home position also returns the column slide 134 to its initial or home position.

The novel reset operation of the column slide 134 begins in much the same manner as the normal 180° rotational movement of the drive pins 280 discussed above and illustrated in FIG. 22. As illustrated in the dotted line portion of FIG. 19, the drive pins 280 prior to the reset operation are located in their normal at-rest position within the slots 312. The reset operation of the column slide 134 begins with a forward advancement of the drive pins 280 by the column motor 154 in a counterclockwise direction (as viewed in FIGS. 19 through 21) of a sufficiently large angular magnitude to disengage the previously trailing drive pin 280 from its slot 312. A forward rotational movement of from 30° to 60° is normally sufficient to disengage the previously trailing drive pin 280 from its slot 312. In disengaging the previously trailing drive pin 280 from its slot 312, the previously leading drive pin 280 cams against the lower curved edge portion 332 (FIG. 19) of its slot 312 to cause the displacement of the column rack 282 from its illustrated dotted line position to the illustrated solid line position. The complete disengagement of the previously trailing drive pin 280 from its slot 312 causes the camming engagement of the previously leading drive pin 280 with the inclined edge portion 328 of its slot 312.

For the specific embodiment set forth above wherein a forward rotational advancement of 30° is sufficient to disengage the formerly trailing drive pin 280 from its slot 312, the forward rotational advancement of the drive pins 280 is terminated after this initial movement and is immediately followed by a reverse rotational movement of the drive pins 280. During this reverse movement, the column motor 154 rotates the drive pins 280 in a reverse or clockwise rotational direction (as viewed in FIGS. 19 through 21) of a sufficiently large angular magnitude to cause the drive pin 280N (FIG. 20) to abut against an outer edge portion 334 of the slot 312 to thereby displace the column rack 282 in the direction of the arrow R to cause the complete disengagement of the drive pin 280P from its former position within its slot 312. For the specific embodiment set forth above, a reverse rotational movement of from 45 to 60 degrees is normally sufficient to disengage the drive pin 280P from its slot 312. During the reverse rotational movement of the drive pins 280 by the column motor 154, the column cam switch 160 is bypassed to prevent the inactivation of the column motor 154. Immediately upon the termination of the reverse rotational movement of the drive pins 280, the drive pins 280 are rotated in a forward direction by the column motor 154 to return the drive pins 280 to their initial position as illustrated in the dotted line portions of FIGS. 19 and 20. At the inception of the final forward movement of the drive pins 280 by the column motor 154, the column cam switch 160 is activated to stop the column motor 154 when the drive pins 280 have been returned to their initial position.

Immediately upon the disengagement of both of the drive pins 280 from their slots 312 as illustrated in the solid line portion of FIG. 20, the drive pins 280 and the column slide 134 are returned to their initial or home position (FIG. 21) by means of the return force provided by the column slide return bias assembly 170. Upon reaching the end of the column rack 282, the drive pin 280Q engages the cam edge 320 of the column rack 282 which has been normally generally displaced to the position illustrated in the dotted line portion of FIG. 21. After the engagement of the cam edge 320 by the drive pin 280Q, the column rack 282 is moved or rotatably displaced generally in the direction of the arrow S by the return force of the column slide return bias assembly 170 until the drive pin 280Q engages the lower curved edge portion 332 of its slot 314 at which time the column rack 282 has been moved to the position illustrated in the solid line portion of FIG. 21. The drive pins 280 are now in a position for a subsequent forward rotational advancement along the column rack 282 by the column motor 154.

As most clearly illustrated in FIG. 21, the slot 316 of the column rack 282 is generally irregularly shaped and of a greater bite or depth than the slots 312 and 314 to provide sufficient clearance between the periphery of the drive pin 280Q and the cam edge 320 during the initial forward 180 degree rotational advancement of the drive pins 280 along the column rack 282 to thereby prevent the physical engagement or binding of the drive pin 280Q with the cam edge 320 of the column rack 282.

In accordance with a further important feature of the present invention, the row slide 150 is also caused to move in incremental steps against the bias force of the row slide return bias assembly 168 by the novel engagement and relative movement of a pair of row slide drive pins 380 (FIGS. 8, 9, and 23) and a novel slotted row rack 382 (FIGS. 8, 9, and 18), relatively fixed with respect to the row slide 150. The drive pins 380 are attached to a row pin disc 384 which is rotatably driven by a row drive disc 386. The drive disc 386 is fixedly attached to an output shaft 388 of the row motor 156. The row pin disc 384 includes a central aperture 390 and a drive aperture 392 for respectively receiving a centrally located pin 394 and a drive pin 396, respectively, both securely attached to the drive disc 386. The aperture 392 is generally non-colinearly disposed with respect to the pair of drive pins 380 to thereby provide a readily discernible visual and tactile distinction between the column pin disc 284 and the row pin disc 384 and to prevent the inadvertent placement of the column pin disc 284 on the row drive disc 386 or similarly the inadvertent placement of the row pin disc 384 on the column drive disc 286.

The drive disc 386 further includes a pair of slots 398 disposed 180° apart about the circular periphery of the disc 386 to alternately receive a rotatable portion 400 (FIG. 8) of a cam follower biased switch arm 402 of the row cam switch 162. During the normal forward stepping operation of the row slide 150, receipt of the rotatable portion 400 within one of the cam slots 398 activates the cam switch 162 to stop the row motor 156 to prevent further rotation of the discs 384 and 386. Thus, during the normal forward advancement of the row slide 150, the discs 384 and 386 rotate in 180° steps. For 180° rotation of the discs 184 and 186, one of the drive pins 380 is rotated or pivoted about the other to move the drive pins 380 into alternating slots of the row rack 382. Since the row rack 382 is generally fixed with respect to the row slide 150 and since the row motor 156 is securely mounted to the base plate 138 of the column slide 134, the row slide 150 is moved in a generally forward direction transverse to the direction of movement of the column slide 134 against the force of the row slide return bias assembly 168 by the 180° stepwise rotational relative movement of the drive pins 380 along the row rack 382.

Generally, the distance between the central longitudinal axes of the drive pins 380 corresponds to the distance between the center lines of two adjacent micro-images disposed along a row of a microfiche 190. Thus, each 180° forward rotation of the discs 384 and 386, provided there is no relative movement between the column slide 134 and the base casting member 124, causes the next consecutively stored micro-image in a row of a microfiche 190 to be brought into the illumination path 92 of the optics assembly 62 for display or reproduction by the machine 50.

Since the spacing between the center lines of micro-images consecutively disposed along a row of the microfiche 190 can vary with microfiches 190 of different sizes and formats, a plurality of interchangeable pin discs 384 is provided, each disc 384 having a different spacing between the central longitudinal axes of the drive pins 380 that correspond to the spacing between the center lines of micro-images consecutively disposed along the rows of the microfiches discussed above. Similarly, in order to accommodate the different pin discs 384, a plurality of interchangeable row racks 382 is provided.

In accordance with an important feature of the present invention, the row rack 382 is relatively fixed in place with respect to the row slide 150 (FIG. 8). The row rack 382 includes a mounting aperture 404 (FIGS. 8 and 18) for engagement with a row slide adjustment assembly 405. The row slide adjustment assembly 405 includes a mounting pin 406 for receipt within the aperture 404 and affixed to a first free end portion of a movable adjustment arm 408. The arm 408 includes an aperture 412 for receiving a pin 410 (FIGS. 8 and 11) that is preferably fixedly attached to the casting member 180 of the row slide 150. The adjustment arm 408 includes an adjustment control pin 414 securely affixed to a second free end portion of the adjustment arm 408. The pin 414 is received in a elongated slot 416 of an L-shaped row slide adjustment control member 418. The control member 418 is movably secured to the framing assembly 181 of the row slide 150 in any convenient manner. The movement of the control member 418 along the row slide 150 is guided by two guide pins 420 affixed to the framing assembly 181. The guide pins 420 are received within two elongated slots 422 and permit the longitudinal displacement of the control member 418 along the length of the slots 422.

A rotatable row slide adjustment control knob 424 securely mounted in place at one end of the roll slide 150 is preferably disposed at a highly accessible location to enable an operator to adjust the position of the control member 418 and, thus, of the row slide 150 by adjustably rotating the knob 424. The control knob 424 includes an elongated threaded portion 426 attached to an end portion 428 of the control knob 424 and threadably engageable with an upstanding threaded end portion 430 securely affixed to the control member 418.

The rotation of the control knob 424 results in the corresponding longitudinal displacement of the control member 418 to cause an arcuate displacement of the control pin 414. Since the row rack 382 is securely fixed in place by the receipt of the drive pins 380 within the slotted portion of the row rack 382, the mounting pin 406 is correspondingly relatively fixed in place with respect to the column slide 134. Thus, the arcuate displacement or movement of the control pin 414 results in a corresponding rotational or pivotal movement of the adjustment arm 408 about the longitudinal axis of the mounting pin 406. The movement of the adjustment arm 408 causes a corresponding movement of the pin 410 resulting in the longitudinal displacement of the row slide 150 with respect to the column slide 134. The longitudinal displacement of the row slide 150 causes the corresponding longitudinal displacement of a micro-image in the illumination path 92 of the optics assembly 62 of the machine 50.

Thus, the row slide adjustment assembly 405 enables a micro-image disposed in the illumination path 92 of the optics assembly 62 of the machine 50 and its image projected to either the viewing screen 52 or the exposure station 104 to be easily and rapidly adjusted along a second longitudinal axis in the viewing or exposure plane, transverse or perpendicular to the first longitudinal axis discussed above with respect to the column slide adjustment assembly 305.

In accordance with a preferred embodiment of the present invention, the design and the function of the row rack 382 (FIG. 18) is essentially identical to the design and the function of the column rack 282. Thus, the row rack 382 includes a plurality of similarly shaped slots 442 that corresponds to the slots 312 of the column rack 282 and a first and a second, distinct, relatively irregularly shaped slots 444 and 446, respectively, enclosed within an elongated slotted portion 448. The slots 444 and 446 correspond to the slots 314 and 316, respectively.

The elongated slotted portion 448 provides a return path for accommodating the drive pins 380 during the return movement of the row rack 382 to its initial or home position in which the drive pins 380 are received within the slots 444 and 446, corresponding to the initial or home position of the row slide 150.

The row rack 382 further includes a row rack return cam edge 450 both for returning the relatively freely pivotable row rack 382 to its initial or home position in which the drive pins 380 are positioned in the slots 444 and 446 and for braking or decelerating the row slide 15. The principles governing the design of the slots 442, 444 and 446, the design of the slotted portion 448 and the design of the cam edge 450 are the same as the principles governing the design of the corresponding features of the column rack 282, discussed above.

The row rack 382 further includes an aperture 452 and an elongated slot 454 for receiving and adjustably positioning a limit switch engagement pin for engaging and deflecting a movable arm 456 (FIG. 8A) of the row slide limit switch 166. This engagement and deflection occurs when one of the drive pins 380 is positioned in the last slot 442 (FIG. 18) corresponding to the movement of the last micro-image in a row of micro-images disposed on the microfiche 190 into the illumination path 92 by the row slide 150. As indicated above, the row slide limit switch 166 is suitably securely disposed on the base plate 138 to cause activation of the limit switch 166 by the limit switch pin disposed in the elongated slot 454 of the row rack 382 at the above-indicated appropriate time. The precise position of the row limit switch activation pin may be adjusted along the slot 454 of the row rack 382 in order to accommodate minor variations in the disposition of micro-images along rows of microfiche having generally the same size and format.

The 180 degree forward rotation of the row pin disc 386 and of the row slide drive pins 380 causes the stepwise forward advancement of the row rack 382 resulting in the longitudinal displacement of the row slide 150 along the bearing rods 148 secured to the column slide 134. The relative movement and interaction between the row slide drive pins 380 and the row rack 382 is essentially the same as the relative movement and interaction between the column slide drive pins 280 and the column rack 282, as fully discussed above. As opposed to the relatively fixed relationship between the column rack 282 and the base casting member 124 and the relatively movable relationship between the drive pins 280 and the base casting member 124, the row rack 382 is relatively movable with respect to the column slide 134; and the row slide drive pins 380, while rotatable about the central axis of the row pin disc 384, are relatively fixed with respect to the column slide 134. Thus, the row rack 382 is longitudinally displaced along the column slide 134 to cause the corresponding longitudinal displacement of the row slide 150 above the column slide 134. The relative movement between and reset operation of the row slide drive pins 380 and the row rack 382 is essentially the same as the corresponding operations of the column slide drive pins 280 and the column rack 282.

Figure 5:
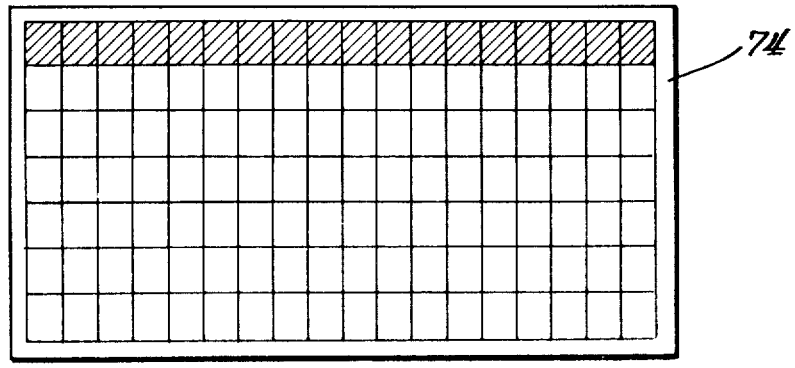

The column rack 282 and the row rack 382 (FIG. 18) may be used to advance micro-images stored on the microfiche 74 (FIG. 5) in accordance with either the COM pagination or the COSATI ALT. pagination into and through the illumination path of the optics assembly 62 of the machine 50. It should be noted that the microfiche 74 would include a trailer portion when micro-images stored thereon are moved through the machine 50 by the racks 282 and 382.

A row rack 460 (FIG. 24) and a column rack 462, designed generally in accordance with the principles governing the design of the row rack 382 and of the column rack 282, may be used to advance micro-images stored on the microfiche 66, including the trailer portion 68, into and through the illumination path 92 of the optics assembly 62. The micro-images stored on the microfiche 66 are stored in accordance with the COSATI PREF. pagination. Thus, while the column rack 462 is generally similar to the column rack 282 except for a different number of slots, the row rack 460 differs from the row rack 382 by having an elongated slotted portion 464, a plurality of similarly shaped slots 466, and a first and a second distinct, relatively irregularly shaped slots 468 and 470 generally oppositely disposed on the surface of the row rack 460 from the corresponding elements of the row rack 382. A mounting aperture 472 for receiving the mounting pin 406 (FIG. 8) is disposed on a different portion of the surface of the row rack 460 than the corresponding aperture 404 of the row rack 382 in order to achieve the proper alignment of the row rack 460 upon the receipt of the row slide drive pins 380 within the apertures 466, 466 and 470, or 468 and 470.

In order to advance the micro-images disposed on the microfiche 66 through the machine 50 under the control of the row rack 460 and the column rack 462, the force inverter assembly 158 (FIGS. 8, 9 and 16) must be manually switched from its position illustrated in FIGS. 8 and 9 to its position illustrated in solid line form in FIG. 16. Thus, the initial or home position of the row slide 150 in advancing micro-images disposed on the microfiche 66 through the machine 50 is at the opposite longitudinal end portions of the bearing rods 148 (FIG. 8) than the longitudinal end portions of the bearing rods 148 illustrated in FIG. 8 as accommodating the row slide 150 in its initial or home position.

In accordance with a further important feature of the present invention, the movement of the column slide 134 (FIG. 8) along the bearing rods 132 to its initial or home position and the movement of the row slide 150 along the bearing rods 148 to its initial or home position is controlled by both the braking forces provided by the cam edges 320 and 450 and by a novel magnetic drag or brake assembly 480 (FIGS. 10 and 25) in order to prevent damage to the column slide 134, the row slide 150 or to the components mounted thereon. Without such an assembly 480, the column slide 134 and the row slide 150 would be acclerated to continuously increase their velocities under the forces provided by the column slide return bias assembly 170 and the row slide return bias assembly 168 until their initial or home positions were reached. Upon reaching their home positions, the column slide 134 and the row slide 150 would be brought to an abrupt halt, possibly resulting in the damage discussed above.

In a preferred embodiment, the magnetic drag or brake assembly 480, illustrated in FIG. 10 for use in controlling the movement of the row slide 150, includes a U-shaped elongated channel 482 suitably disposed on the base plate 138 of the column slide 134 such that its longitudinal axis lies in the direction of the longitudinal movement of the row slide 150. The channel 482 is preferably formed of a ferromagnetic or magnetically attracted material to enable the magnetic interaction between the channel 482 and a movable permanent magnet 484 disposed within the channel 482. Alternately, the channel 482 may be L-shaped. In that case, the upstanding elongated leg portion of the channel 482 serves as a guide to control the longitudinal movement of the magnet 484. The magnet 484 includes a centrally disposed elongated recess 486 for receiving a pin 488 suitably mounted to the row slide 150. Obviously, the channel 482 could be suitably mounted on the row slide 150 and the pin 488 fixedly mounted on a portion of the relatively fixed column slide 134. The pin 488 is engageable with a pair of upstanding shoulder portions 490 for moving the magnet 484 along the elongated channel 482. A predetermined, elongated clearance 492 is provided between the outer periphery of the pin 488 and the abutting surfaces of the shoulder portions 490 to enable the pin 488 to travel a predetermined distance before engaging one of the shoulder portions 490.

Thus, for example, in returning to its initial or home position after moving the last micro-image disposed in a row of the microfiche 190 into the illumination path 92 of the optics assembly 62 of the machine 50, the row slide 150 is initially accelerated by the force provided by the row slide return bias assembly 168. The row slide 150 thus begins to move at an increasing velocity under the influence of this acceleration force. When the row slide 150 reaches a predetermined, desired terminal velocity, the pin 488, securely fixed to the row slide 150, engages one of the shoulder portions 490 to cause the movement of the magnet 484 along the elongated channel 482. Obviously, the desired terminal velocity of the row slide 150 may be suitably adjusted by varying the clearance 492.

A magnetic brake or drag force is produced by the magnetic interaction of the magnet 484 with the ferromagnetic channel 482 and is imparted to the row slide 150 by the engagement of the pin 488 with one of the shoulder portions 490. Different magnets 484 of varying magnetic strengths may be utilized in order to achieve a desired braking force. Further, the magnetic attraction between the channel 482 and the magnet 484 may be adjusted by adjusting the spacing between the channel 482 and the magnet 484 as by applying a coating or layer 494 of insulation to the abutting surfaces of the channel 482, the magnet 484 or both. The thickness of the layer 494 may be varied in order to further vary the strength of the magnetic interaction of the channel 482 in the magnet 484. Further, the layer or coating 494 may be formed of a Teflon material in order to reduce the friction wear between the contacting surfaces of the channel 482 and of the magnet 484.

Preferably, the magnetic drag or brake force of the assembly 480 approximately equals the acceleration force of the bias assembly 168 to thereby enable the row slide 150 to return to its initial or home position at a constant terminal velocity. Alternately, the magnetic drag or brake force provided by the assembly 480 may be adjusted to be slightly greater than the accelerating force provided by the bias assembly 168 to very gradually decelerate the row slide 150 from its velocity reached upon the engagement of the pin 488 with one of the shoulder portions 490 to a very small final velocity when the row slide 150 returns to its initial or home position.

Similarly, a magnetic drag or brake assembly essentially identical to the identical assembly 480 is utilized to control the movement of the column slide 134 along the bearing rods 132. Such a magnetic drag or brake assembly for the column slide 134 includes an U-shaped elongated channel disposed on the base casting member 124 for engagement by a pin fixedly secured to the undersurface of the column slide 134. Obviously, such a magnetic drag or brake assembly for the column slide 134 could also be suitably disposed in any other convenient manner in accordance with the above discussion.

CONTROL PANEL

The control panel 58 for the machine 50 includes a main power on-off switch 502 for energizing or deenergizing the machine 50. The control panel 58 further includes a print switch 504 which, when depressed, sets an internal print latch to initiate the printing or reproduction portion of the operation of the machine 50. Preferably, the print switch 504 is illuminated by a lamp which is energized when the internal print latch is set. The print switch 504 is inhibited when the mirror assembly 84 is in its viewing or display position in which a micro-image is projected to the viewing screen 52. The print switch 504 is further inhibited when a call key operator lamp 506 is energized indicating a malfunction in the operation of the machine 50, such as a paper shortage, a toner shortage or a paper jam condition.

When no printing program is entered into the machine 50, as described hereinafter, the machine 50 reproduces one copy of the micro-image disposed in the illumination path 92 upon a depression of the print switch. When a printing program is entered into the machine 50, the machine 50 automatically reproduces the programmed number of copies of each of the programed number of consecutive micro-images upon a depression of the print switch.

In accordance with an important feature of the present invention, instead of reproducing the entire programmed number of copies of each micro-image before advancing to the next consecutive micro-image, the machine 50 reproduces one copy of each of the programmed number of consecutively disposed micro-images and then resets the column slide 134 and the row slide 150 to reproduce another single copy of each of the programmed number of consecutively disposed micro-images until the programmed number of copies has been completed. In this manner, the machine 50 automatically delivers to the receiving tray 60 the programmed number of copies of the programmed number of consecutively disposed micro-images in collated form.

The control panel 58 also includes a stop print switch 508 which when depressed interrupts the programmed printing operation of the machine 50 after permitting the completion of any pre-initiated printing operations. Depressing a depression of the stop print switch 508 causes the programmed reproduction operation of the machine 50 to be temporarily interrupted. That programmed reproduction operation of the machine 50 may be reinitiated and completed by a subsequent depression of the print switch 504. Preferably, the stop print switch 508 is also illuminated by a lamp that is energized upon the depression of the switch 508 or upon the energization of the call key operator lamp 506.

A manually adjustable contrast control knob 510 is provided for variably controlling the intensity or radiant energy output of the exposure lamp 80. By varying the radiant energy output of the exposure lamp 80 in conjunction with the radiant energy output of the pre-exposure strip 122, the print density or contrast of the copies reproduced by the machine 50 is adjusted to a desired level.

A keyboard encoder 512 is provided to enable an operator to enter into the machine 50 a desired number of consecutive micro-images of a microfiche 190 to be copied by the machine 50 and a desired number of copies to be made of the micro-images. The keyboard encoder 512 is physically and functionally similar to the keyboard encoder 110 illustrated in FIG. 6 of the two above-mentioned United States patent applications. One significant difference between the keyboard encoder 512 of the present invention and the keyboard encoder 110 of the above-identified disclosures is that the keyboard encoder 512 includes an additional storage register and counter to enable a hundreds digit to be entered into the machine 50 in addition to a units digit and a tens digit for displaying and controlling a desired number of consecutive micro-images to be reproduced by the machine 50.

The desired number of consecutive micro-images on a microfiche 190 to be reproduced by the machine 50 is programmed into the machine 50 by sequentially depressing the one of a plurality of keys 514 that corresponds to the hundreds digit, the tens digit and the units digit of the desired number, in that order. These digits are stored in a register and are entered into a storage or memory register and a control counter by depressing a strobe button 516. Upon depressing the strobe button 516, the desired number of consecutive images programmed into the machine 50 also appears in a three-element, number of consecutive frames indicator 518.

Similarly, the desired number of copies of each of the micro-images to be reproduced is programmed into the machine 50 by sequentially depressing the one of the keys 514 that corresponds to the tens digit and to the units digit of the desired number, in that order. Subsequently, that number is entered into a control counter by depressing a strobe button 520. Upon depressing the strobe button 520, the number of copies is also displayed by a two-element, number of copies or prints per frame indicator 522. Preferably, the keyboard encoder 512 is inhibited during the printing or reproduction portion of the operation of the machine 50.

A first programmed frame, that is, the first desired frame on a microfiche 190 to be displayed or reproduced by the machine 50 may be entered into the machine 50 by means of a momentary contact column switch 524 and by a momentary contact row switch 526. The location or coordinates of the first programmed frame on the microfiche 190 are entered into the machine 50 by depressing the switch 524 until the desired column location is displayed by a two-element column indicator 528 and by depressing the switch 526 until the desired row location is displayed by a two-element row indicator 530.

The function and operation of the column switch 524 and the column indicator 528 are essentially the same as the function and operation of the row switch 526 and the row indicator 530. The column indicator 528 and the row indicator 530 are each preset to display the digit "01" as a base digit, corresponding to the home position of the column slide 134 and the row slide 150. When the column switch 524 is depressed, the column motor 134 causes a 180 degree rotation of the column drive pins 280 to advance the column slide 134 one step to thereby move a micro-image disposed in the first column of a microfiche 190 out of the illumination path 92 and to simultaneously advance an adjacent micro-image into the illumination path 92. The column indicator 528 is also advanced from the numeral 01 to the numeral "02". The switch 524 slews or advances the number stored in the column storage or memory register and the number displayed by the column indicator 528 one units digit approximately each second the switch 524 is maintained in a depressed condition.

The row switch 528, the row storage or memory register and the row indicator 530 function essentially the same as the column switch 524, the column storage or memory register, the column indicator 528 and the column slide 134. Thus, in this manner, a desired first programmed frame is entered into the machine 50 for display or reproduction by the machine 50.

A momentary contact clear switch 532 is also provided to reset both the column indicator 528 and the row indicator 530 to display the numeral 01 and to simultaneously return the column slide 134 and the row slide 150 to their initial or home position.

A momentary contact frame advance switch 534 is provided to advance the column slide 134 or the row slide 150 one step in accordance with the pagination of the microfiche 190. If it is held in a depressed condition, the switch 534 continuously advances either the column slide 134 or the row slide 150 approximately one step per second in accordance with the pagination of the microfiche 190.

A momentary contact carriage reset switch 536 is also provided to initiate the novel reset operations, discussed above, of both the column slide 134 and the row slide 150. Depressing the carriage reset switch 536 causes the column slide 134 and the row slide 150 to return to their home position and thereafter to immediately advance to the first programmed frame as displayed by the column indicator 528 and the row indicator 530. The switches 532, 534 and 536 are inhibited during he automatic printing or reproduction portion of the operation of the machine 50.

AUXILIARY CONTROLS

In accordance with an important feature of the prsent invention, a plurality of manually adjustable auxiliary controls are provided in addition to the components of the control panel 58 for closely controlling and ajusting the operation of the machine 50. The two-position mode switch 152 and the two-position force inverter assembly 158, discussed above, enable the operator to preset or reset the machine 50 for the display or reproduction of a microfiche 190 having a particular pagination. Further, the column slide adjustment assembly 305 and the row slide adjustment assembly 405 enable the operator to adjust the position of the projection of a micro-image on the viewing screen 52 or at the exposure station 104. The row slide adjustment control knob 424 enables the operator to manually control the operation of the row slide adjustment assembly 405. A column slide adjustment control knob 538 (FIG. 26) enables the operator to manually adjust and control the operation of the column slide adjustment assembly 305.

A two-position viewer control knob 540 is used to control the energization of the viewing lamp 76 and the positioning of the reflective surface 86 of the mirror assembly 84. The viewer control knob 540 preferably includes spring loading means to securely maintain the reflective surface 86 in one of its two positions: the viewing or display position illustrated in solid line form in FIG. 7 or the copying position illustrated in dotted line form in FIG. 7. When placed in its "on" position, the viewer control knob 540 completes an electrical ciruit to energize the viewing lamp 76 and to simultaneously inhibit the printing or reproduction portion of the operation of the machine 50. The reflective surface 86 is also placed in its viewing position to reflect the projected image of a micro-image to the viewing screen 52. If the control knob 540 is placed in its "on" position when a copy is being reproduced by the machine 50, the reproduction process is completed before the printing or reproduction operation of the machine 50 is inhibited.

When the viewer control knob 540 is placed in its "off" position, the viewing lamp 76 is decnergized and the inhibit is removed from the printing or reproduction assembly 54. The reflective surface 86 is also placed in its copying position to permit the projected image of a micro-image to be passed to the exposure station 104.

A focus control knob 542 is provided to enable the operator of the machine 50 to adjust the focus of a projected image as observed on the viewing screen 52. Preferably, the focus control knob 542 controls the relative spacing between the projection lens assembly 88 and the plane in which the microfiche 190 is held by the glass flats 186 and 192. The focus control knob 542 in a specific embodiment may be used to adjust the vertical height of the projection lens assembly 88 through a flexible cable or gear assembly.

An image rotation control knob 544 is provided for adjustably controlling the position of the pecham prism 90 to thereby control the angular positioning or displacement of a projected image of a micro-image on the viewing screen 52 or at the exposure station 104.

Figure 7:
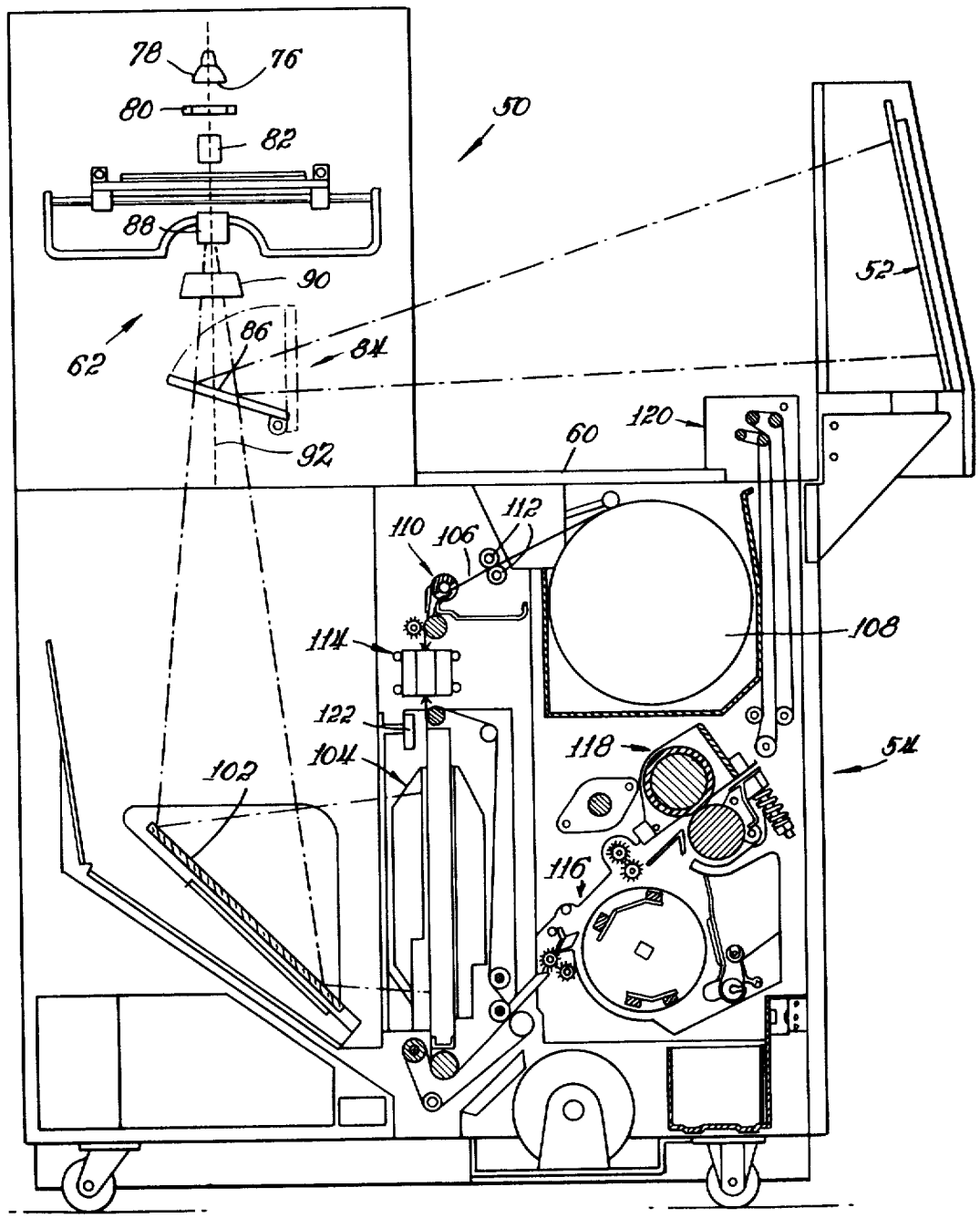
FIG. 7 is a partially-diagrammatic and partially-cross-sectional view of the device of the present invention taken along line 7—7 of FIG. 1.

A further plurality of control components are positioned on a mounting panel 546 for placement in a highly accessible location, for example, behind the pair of access doors 55 (FIG. 1). A viewing lamp intensity control knob 548 (FIG. 27) is provided for varying the radiant energy output or illumination of the viewing lamp 76. A preexposure strip intensity control knob 550 is also provided to enable the operator to adjust the radiant energy output of the pre-exposure strip 122 (FIG. 7).

As described above, the call key operator lamp 506 is illuminated in response to a paper shortage, a toner shortage or a paper jam condition. If the call key operator lamp 506 is illuminated during the operation of the machine 50, the operator should open one or both of the access doors 55 (FIG. 1) and study the mounting panel 546 to determine the specific malfunction of the machine 50. In order to determine the specific malfunction, a paper shortage lamp 552, a toner shortage lamp 554 and a jam condition lamp 556 are provided to indicate the specific malfunction of the machine 50. Further, a "power on" lamp 558 may be provided to indicate that the machine 50 is in an operative condition. A jam reset pushbutton switch 560 is provided for resetting the machine 50 to an operative condition after the occurrence of a jam condition. After the occurrence of a jam condition, the jam reset switch 560 must be depressed to resume operation of the machine 50. A plurality of copy counters 562 and 564 are further provided to visually display the number of copies reproduced by the machine 50. The copy counter 562 may be used to display the number of copies reproduced by the machine 50 in a single copy reproduction mode for billing at a first billing rate. The second copy counter 564 may be used to record and display the number of copies reproduced by the machine 50 in a multiple copy reproduction mode for billing at a second billing rate.

OPERATIONAL PROCEDURE

In accordance with an important feature of the present invention, the machine 50 may be operated in either its display or viewing mode or its printing or reproduction mode in accordance with the following procedures. An initial set-up procedure is required to be performed by the operator when the machine 50 is initially turned on by a depression of the switch 502 or when a change in microfiche size or format is desired. Initially, the operator of the machine 50 must position the proper condensor lens assembly 82 and projection lens assembly 88 in the optics assembly 62 of the machine 50 to obtain a desired magnification for a microfiche 190 having a specific size and format. Also, the proper column rack 282, row rack 382, column pin disc 284 and row pin disc 384 are placed in the transport assembly 64 for the particular microfiche 190 that is to be displayed or reproduced by the machine 50. The mode switch 152 is set in either its COM (ROW) position or in its COSATI (COL.) position. The force inverter assembly 158 is placed in the proper one of its two positions.

All of the access doors of the machine 50 are then closed and the machine 50 is energized by placing the power switch 502 in its on position. When the machine 50 is initially energized, the various control elements and registers of the machine 50 are preset. The indicators or displays 522, 528 and 530 are all preset to display the numeral "01". Similarly, the indicator or display 518 is preset to display the numeral "001". The column slide 134 and the row slide 150 are also preset to their home position. The microfiche 190 to be displayed or reproduced by the machine 50 is placed between the glass flats 186 and 192 in accordance with the procedure described above. The glass flats are placed in their printing position (FIGS. 13 and 15) to enable the microfiche 190 to be displayed or reproduced by the machine 50.

The viewer control knob 540 is placed in its on position to energize the viewing lamp 76 and to reflect the projected image of a micro-image on the microfiche 190 to the viewing screen 52. The operator of the machine 50 may then focus and center the projected micro-image as displayed on the viewing screen 52 by suitably adjusting the control knobs 424, 538 and 542. The angular position of the projected micro-image in the plane of the viewing screen 52 may also be adjusted by suitably adjusting the control knob 544. The brilliance of the projected image on the viewing screen may be set at a comfortable level by adjusting the control knob 548 (FIG. 27).

If the operator of the machine 50 knows the location of the first programmed frame, that is, the first micro-image on the microfiche 190 to be displayed or reproduced by the machine 50, this location is entered into the machine 50 by depressing the column switch 524 and the row switch 526 until the numerals corresponding to the position of the first programmed frame are displayed by the indicators 528 and 530.

After insuring that the proper micro-image is in the illumination path 92, the viewer control knob 540 is placed in its off position and the print switch 504 may be depressed to generate a sample copy for checking the print density of the copies reproduced by the machine 50. If the print density is unsatisfactory, the contrast control knob 510 may be adjusted to obtain a satisfactory print density. If a very precise control or setting of the print density is required, the pre-exposure strip intensity control knob 550 (FIG. 27) may be adjusted to achieve the desired print density. Since the copy program has not been entered into the keyboard encoder 512 and since the indicators 518 and 522 display the numerals 001 and 01, respectively, the column slide 134 and the row slide 150 remain at the position of the first programmed frame.

Upon achieving the desired print density, the copy program may be entered into the keyboard encoder 512 by depressing the proper load buttons or keys 514 and strobe buttons 516 and 520. The desired number of prints per frame to be reproduced by the machine 50 is then displayed by the indictor 522. The desired number of consecutive frames or micro-images to be reproduced by the machine 50 is then displayed by the indicator 518. The print switch 504 is then depressed, and the machine 50 automatically reproduces one copy of each of the programmed number of consecutive frames. After the programmed number of consecutive frames are reproduced by the machine 50, the column slide 134 and the row slide 150 are reset to their home position and then advanced to the first programmed frame to immediately initiate another copying sequence of the machine 50. This reproduction operation is continued until the programmed number of prints per frame is completed.

Upon completion of the copy program, the column slide 134 and the row slide 150 are reset to their initial or home position and the indictors 522, 530 and 528 are reset to display the numeral 01. Similarly, the indicator 518 is reset to display the numeral 001. The machine 50 is then in a condition to be reprogrammed for a subsequent reproduction operation or to be deenergized by placing the power switch 502 in its off position.

If the operator of the machine 50 does not know the location of the first programmed frame or does not know the precise number of consecutive frames or micro-images to be copied, the column switch 524 and the row switch 526 are depressed by the operator to cause the transport assembly 64 to step the microfiche 190 through the machine 50. With the viewer control knob 540 placed in its on position, the operator may view the micro-images on the viewing screen 52 in order to determine the first programmed frame. The location of the first programmed frame as displayed by the indicators 528 and 530 should be noted. After locating the first programmed frame, the operator may depress the frame advance switch 534 in order to determine the number of consecutive frames or micro-images to be copied by the machine 50. After determining this number, the operator depresses the carriage reset switch 536 to cause the column slide 134 and the row slide 150 to be reset to their home position and to immediately be advanced to the first programmed frame as displayed by the indicators 528 and 530.

The operator then enters his known copy program into the keyboard encoder 512 and thereinafter initiates the printing or reproduction operation of the machine 50 by depressing the print switch 504. The machine 50 immediately automatically performs its reproduction operation in accordance with the copy program. After the completion of the copy program, the machine 50 is reset itself, as described above.

The operator may then enter another copy program into the machine 50 or may deenergize the machine 50 by placing the power switch 502 in its off position. In this manner, the machine 50 automatically reproduces the prorammed number of collated sets of the programmed number of consecutively stored micro-images.

CONTROL CIRCUITRY

Figure 28:
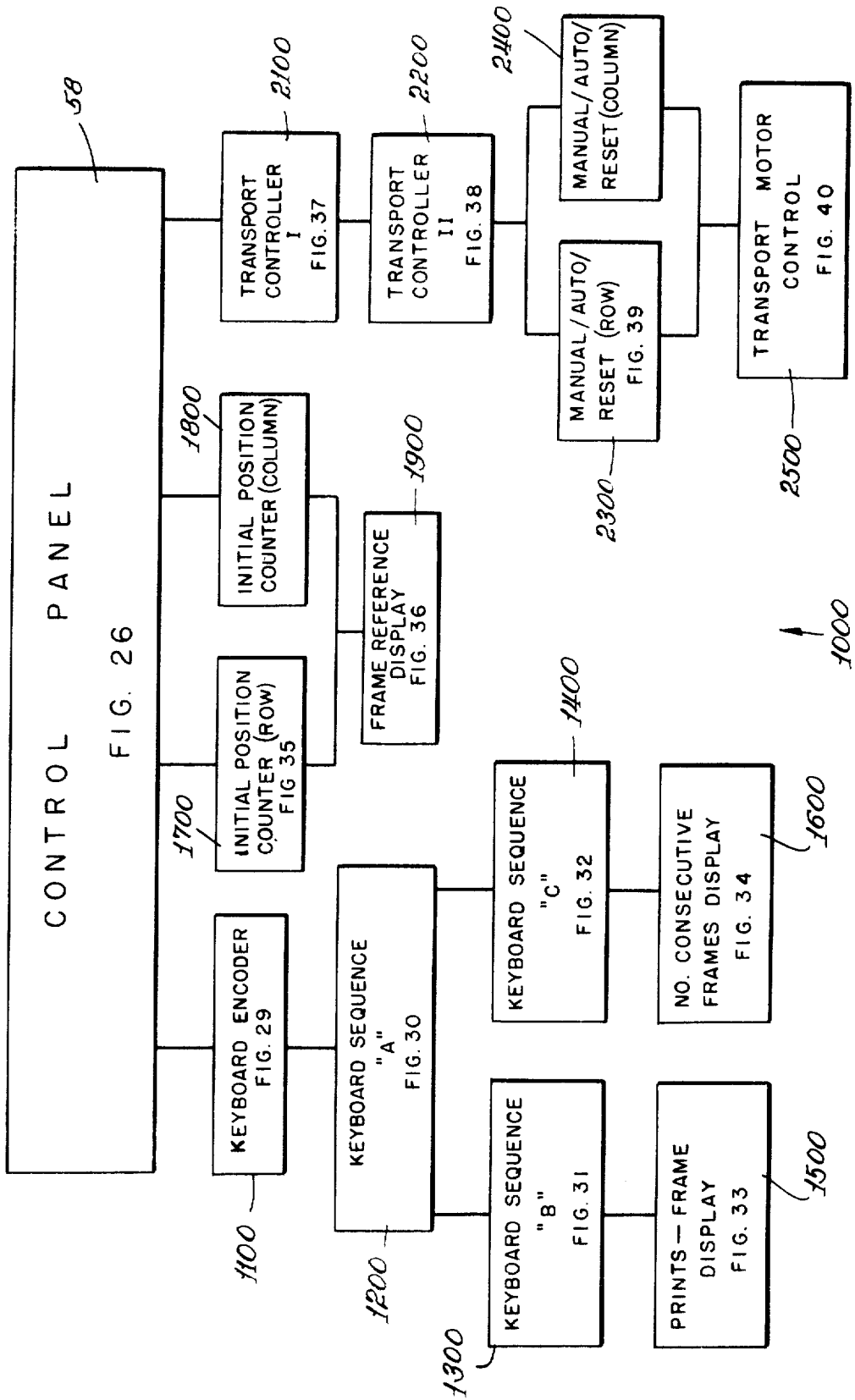
FIGS. 28 through 42 are diagramatic views of a preferred embodiment of a control circuit for controlling the operation of the device of the present invention.

In accordance with an important feature of the present invention, a control circuit 1000 (FIG. 28) is provided for controlling the operation of a machine 50. More specifically, the control circuit 1000 enables the first programmed frame and the copy program to be entered into the machine 50 and controls the operation of the machine 50 to perform in accordance with the entered information.

The operator may enter operational information into the machine 50 through the control panel 58 (FIG. 26).

Figure 32:
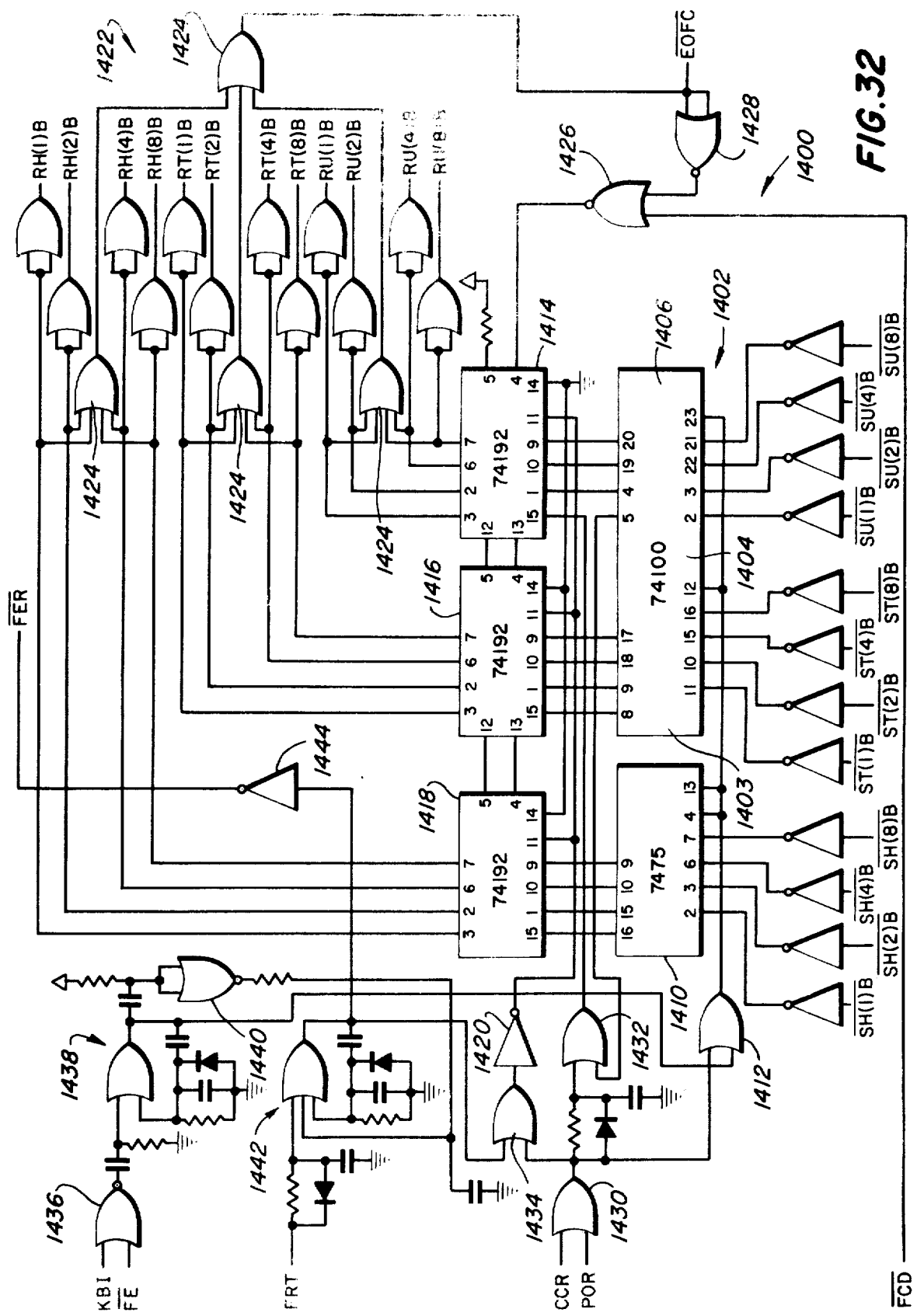
Figure 33:
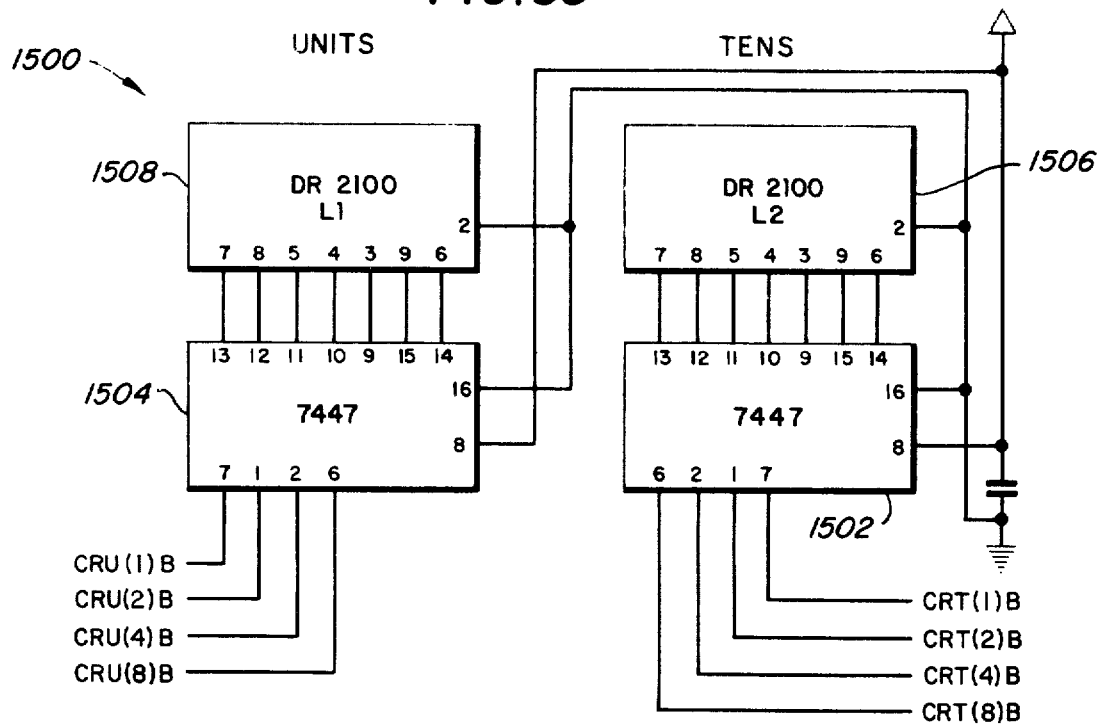
Figure 34:
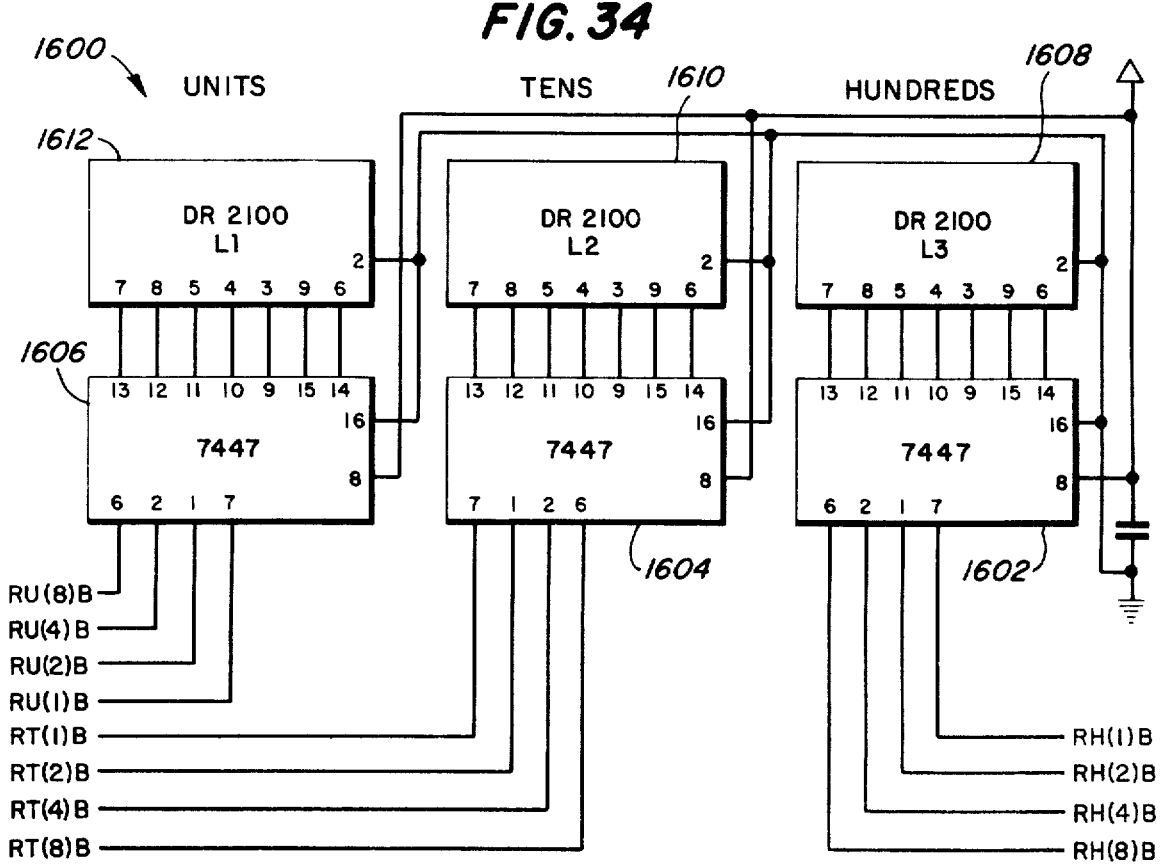

The information entered is distributed to various different circuits for performing the various different functions of the machine 50. For example, the copy program entered into the control panel 58 is directed to a keyboard encoder circuit 1100 (FIG. 29) for converting the printing program into information in digital form. From the keyboard encoder circuit 1100, the information concerning the printing program is transferred to a keyboard sequence A circuit 1200 (FIG. 30) for further distribution to a keyboard sequence B circuit (FIG. 31) and a keyboard sequence C circuit 1400 (FIG. 32) for storing the printing program and disseminating information concerning the copy program to the other portions of the circuit 1000. A printsframe display circuit 1500 (FIG. 33) and a number of consecutive frames dislay circuit 1600 (FIG. 34) are provided for controlling the operation of the indicators 522 and 518, respectively.

An initial position counter (row) circuit 1700 (FIG. 35) and an initial position counter (column) circuit 1800 for receiving and storing the entered information corresponding to the first programmed frame are functionally identical and are, thus, discussed hereinafter in detail only with reference to the circuit 1700. The circuits 1700 and 1800 control the operation of a frame reference display circuit 1900 (FIG. 36) that is used to control the operation of the indicators 528 and 530.

A transport controller I circuit 2100 (FIG. 37) and a transport controller II circuit 2200 (FIG. 38) are provided for supplying various control signals to the other portions of the circuit 1000 in response to the information entered into the control panel 58. A manual-/auto/reset (row) circuit 2300 (FIG. 39) and a manual-/auto/reset (column) circuit 2400 are provided for supplying control signals to a transport motor control circuit 2500 (FIG. 40) for controlling the operation of the column motor 154 and the row motor 156. Since the circuits 2300 and 2400 are functionally identical, only the circuit 2300 is discussed hereinafter in detail.

Figure 40:
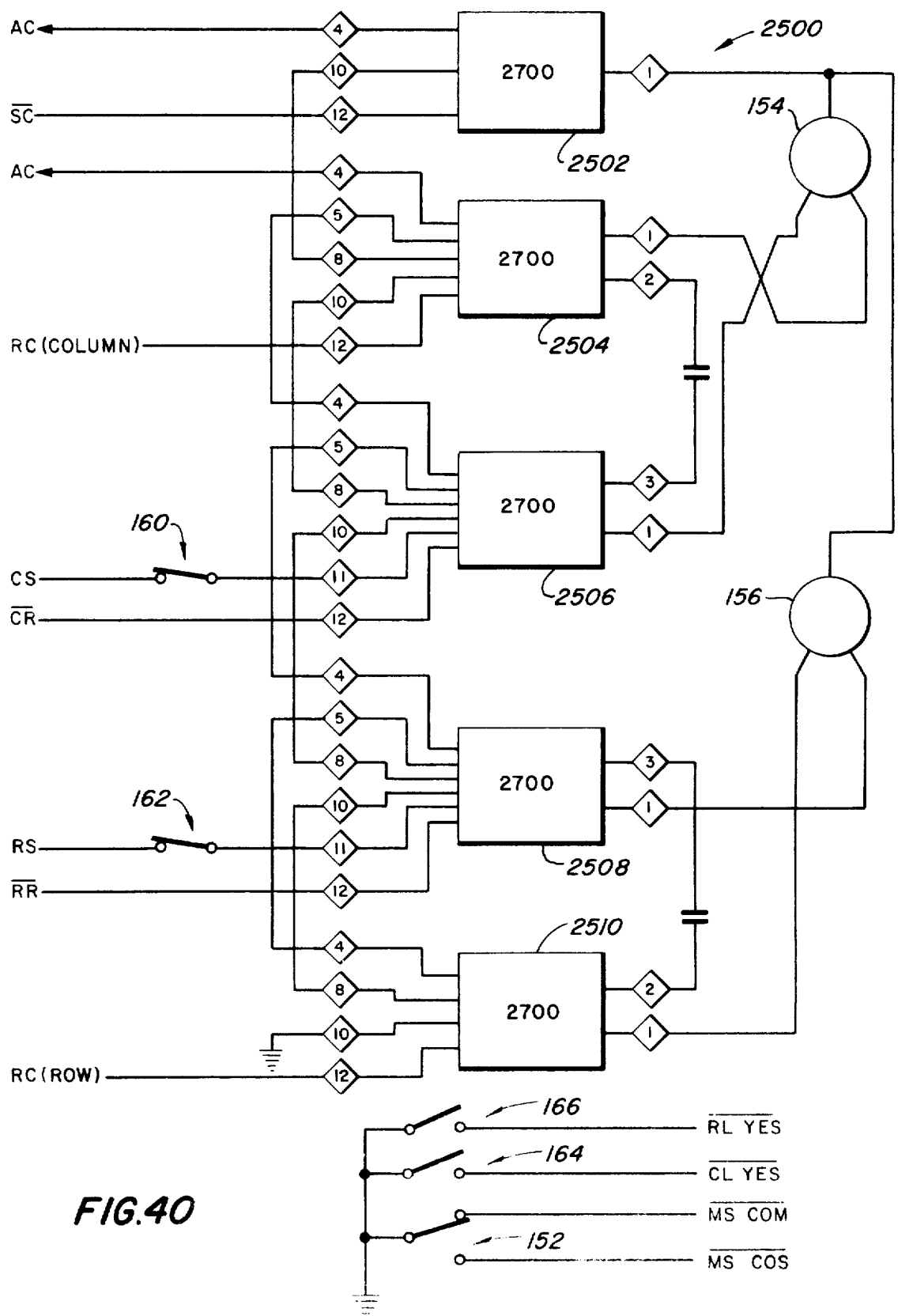
Figure 42:
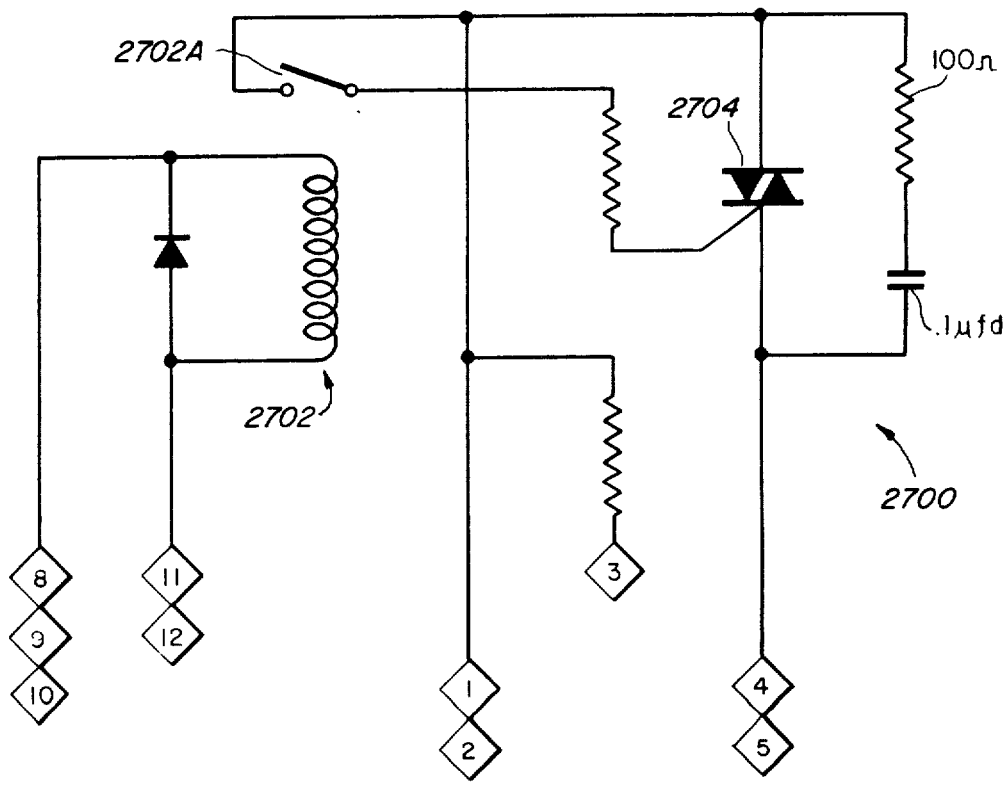

A print switch inhibit circuit 2600 (FIG. 41) is provided for inhibiting the printing portion of the operation of the machine 50 when the viewer control knob 540 is in its on position and for completing an electrical circuit to energize the viewing lamp 76 when the control knob 540 is in its off position. Finally, an alternating current switch circuit 2700 (FIG. 42) is provided for use in the transport motor control circuit 2500 (FIG. 40).

In accordance with the preferred practice of electronic circuit designers, the details of the control circuit 1000 for the device 50 are set forth in logic diagrams rather than in detailed circuit diagrams. In physically constructing an actual operative embodiment of the control circuit 1000, each logic element illustrated in FIGS. 29 through 42 is replaced by an equivalent electrical circuit that performs the logical task defined by that logic element. The use of logic elements emphasizes that any of the many different electrical circuits capable of performing a given logical task may be used interchangeably in the present invention.

The preferred embodiment of the control circuit 1000 utilizes several different types of logical gates: an AND gate, a NAND gate, an OR gate, a NOR gate, a NOT gate and an EXCLUSIVE OR gate. In considering the operation of the above gates and in reviewing the overall operation of the circuit 1000, the digital nature of the circuit 1000 is evident. That is, the above gates operate at one of two potential levels: either a very low or ground potential or a relatively high (approximately +5 volts) potential. when the output of one of the above gates is at a low or ground potential, that gate is referred to as being inhibited. When the output of one of the above gates is at a high potential, that gate is referred to as being enabled. Similarly, when one of the inputs to one of the above gates is at a low or ground potential, that input is referred to as being inhibited. When that input is at a high potential, it is referred to as being enabled.

Figure 37:
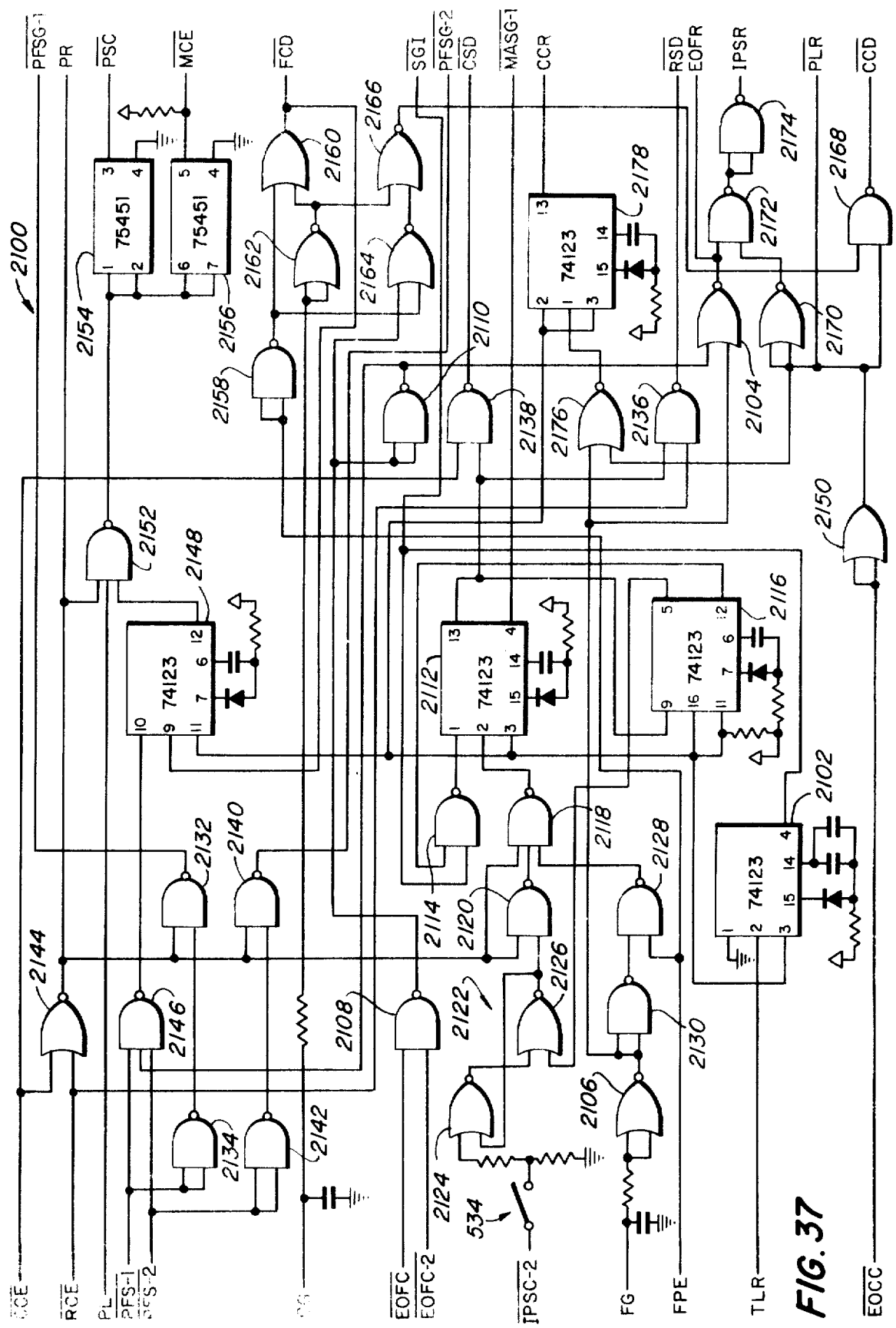

An AND gate is enabled when all of its input leads are enabled. When any one or more of the input leads to the AND gate are inhibited, the AND gate is inhibited. An example of an AND gate is the AND gate 2154 (FIG. 37).

Figure 29:
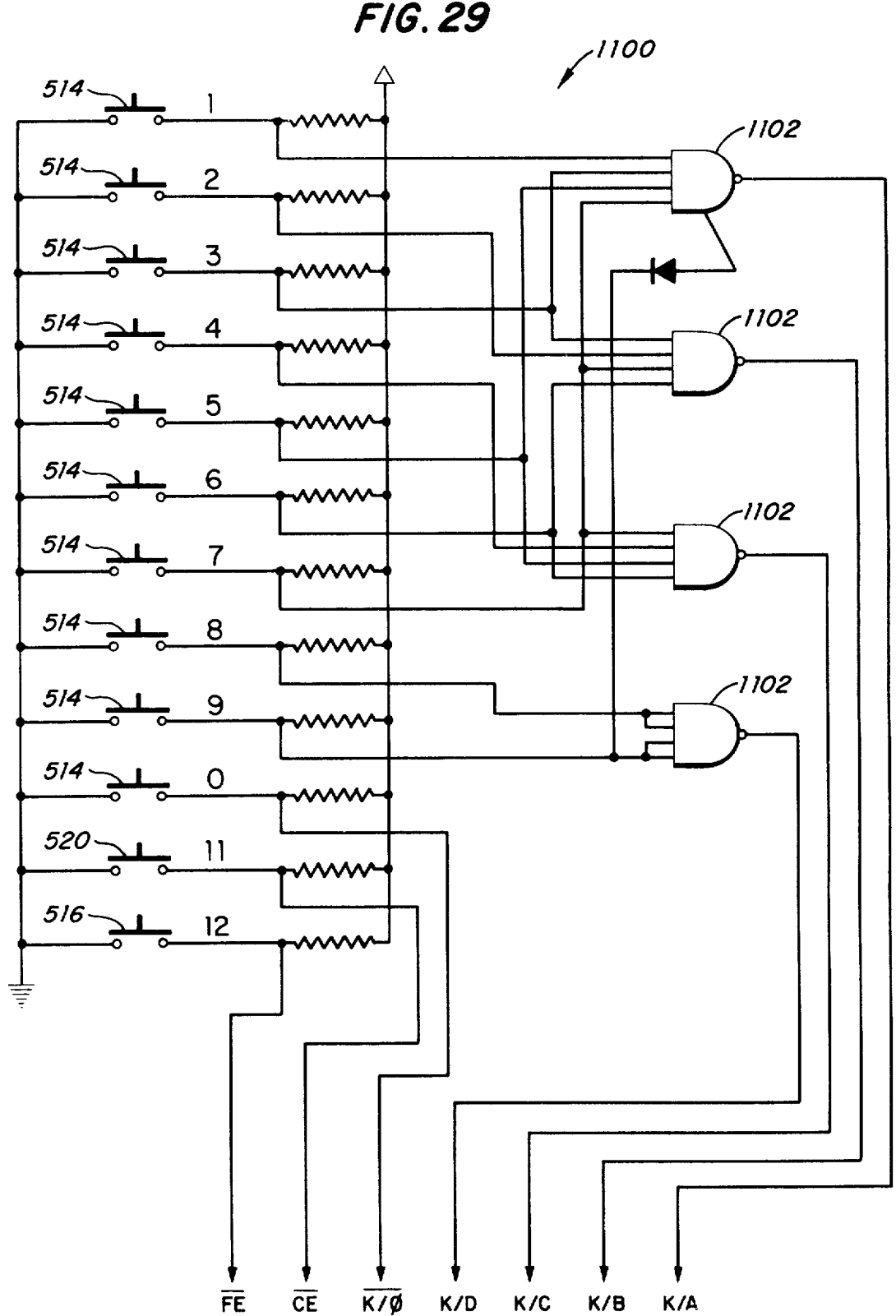
Figure 30:
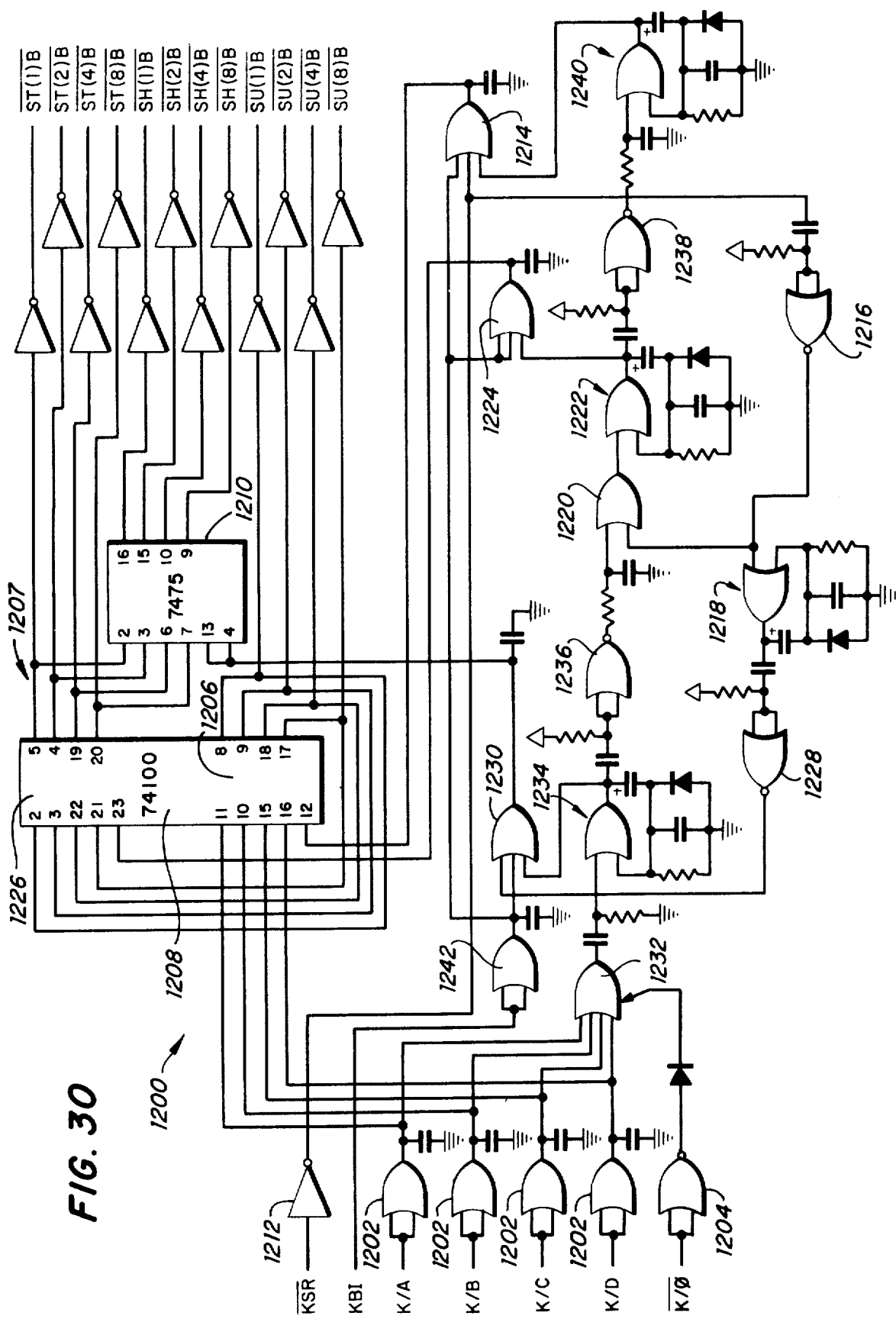

A NAND gate is inhibited only when all of its input leads are enabled. When any one or more of the input leads to the NAND gate are inhibited, the NAND gate is enabled. An example of a NAND gate is the NAND gate 1102 (FIG. 29).

an OR gate is enabled when any one or more of its input leads are enabled. When all of its in,u t leads are inhibited, the OR gate is inhibited. An example of an OR gate is the OR gate 1220 (FIG. 30).

Figure 31:
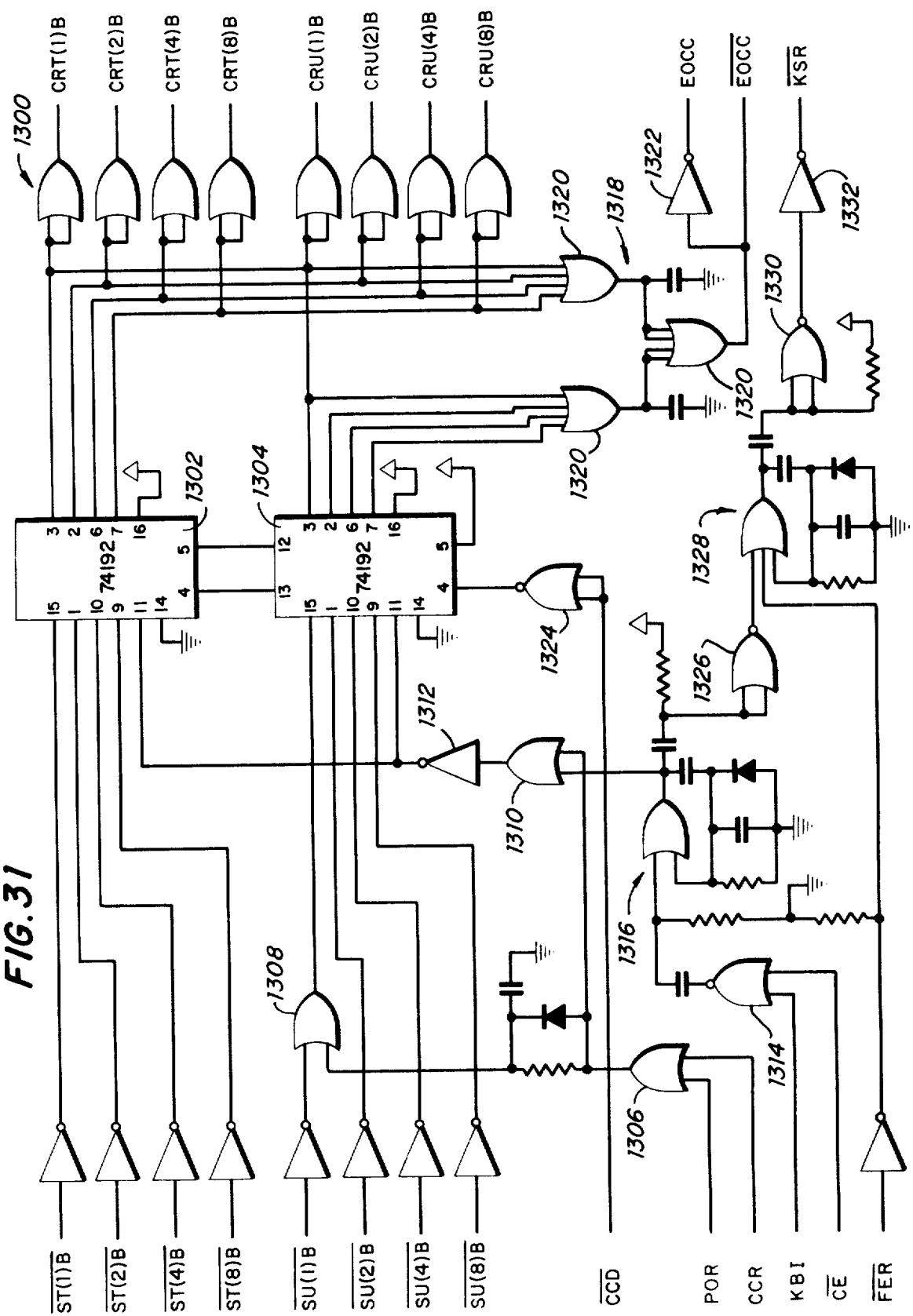

A NOR gate is enabled only when all of its input leads are inhibited. When any one or more of its input leads are enabled, the NOR gate is inhibited. An example of a NOR gate is the NOR gate 1314 (FIG. 31).

A NOT gate is enabled when its single input lead is inhibited. A NOT gate is inhibited when its single input lead is enabled. An example of a NOT gate is the NOT gate 1312 (FIG. 31).

Figure 35:
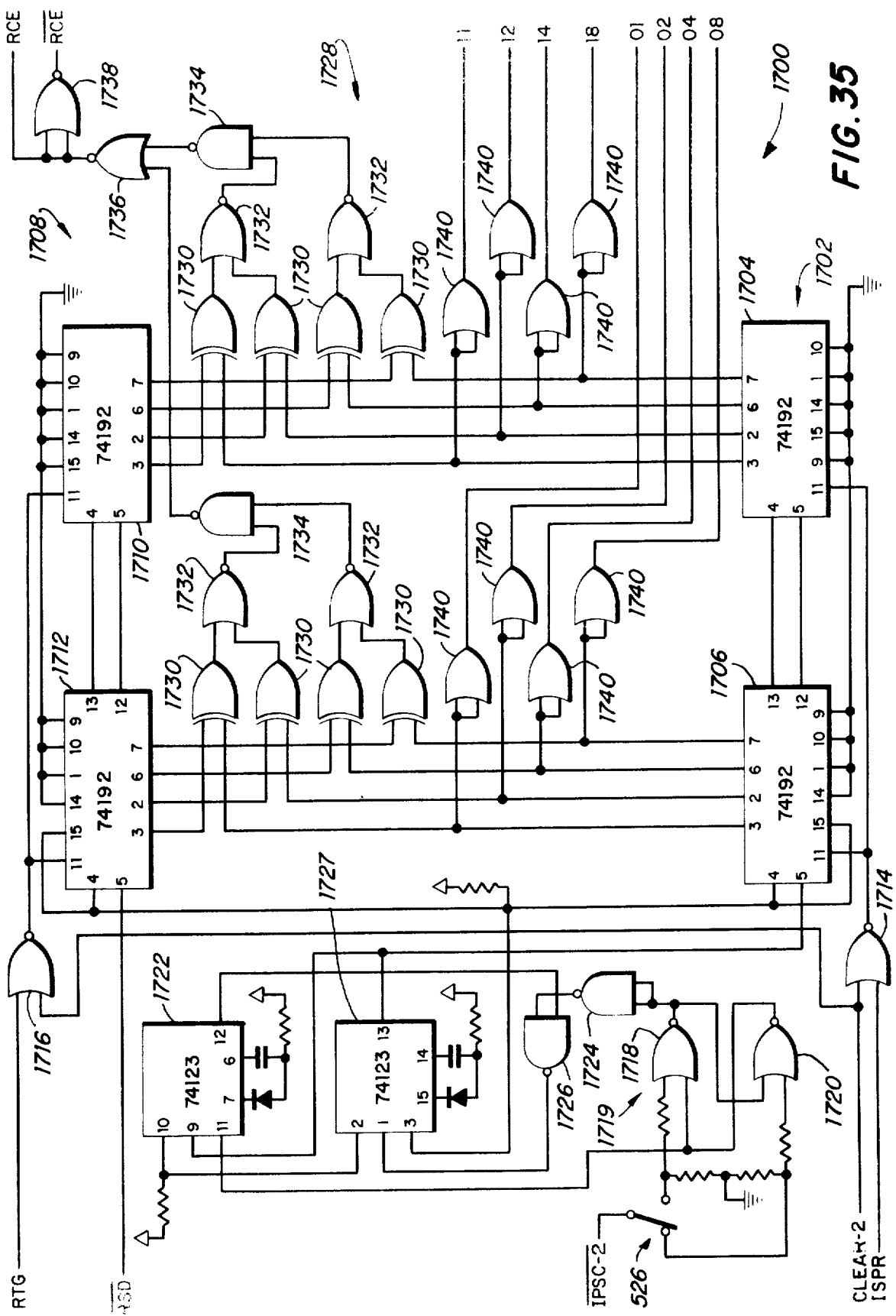
Figure 36:
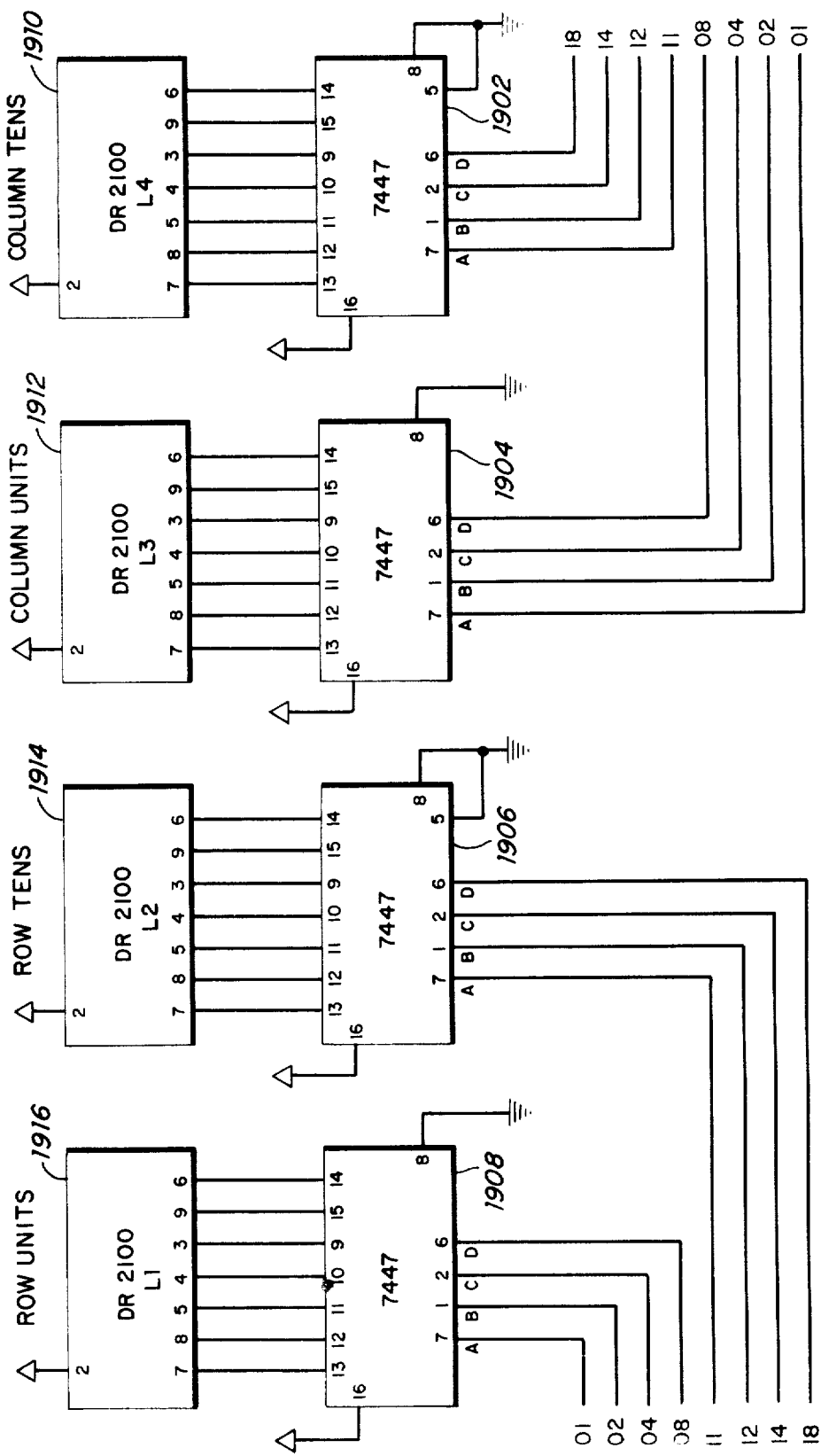

An EXCLUSIVE OR gate is inhibited when both of its two input leads are enabled or when both of its two input leads are inhibited. When one of its input leads is inhibited and the other of its input leads is enabled, the EXCLUSIVE OR gate is enabled. An example of an EXCLUSIVE OR gate is the EXCLUSIVE OR gate 1730 (FIG. 35).

The circuit 1000 further utilizes an OR gate as a monostable multivibrator or ONE-SHOT device for providing an output high potential pulse having a predetermined pulse-width. Such a ONE-SHOT device includes an OR gate with its output coupled across a series capacitor to one of its input leads and a parallel RC circuit connected between the input lead and ground potential. When a high or more positive voltage level, greater than the threshold voltage level of the OR gate, appears at the output of the OR gate, it is instantaneously coupled across the series capacitor back to the input of the OR gate to thereby rapidly increase the rise time of the leading edge of the output pulse from the enabled OR gate.

This positive feedback voltage holds the OR gate in its enabled state until the series capacitor approaches a substantially fully charged state. At this time, the feedback voltage to the input of the OR gate drops below the threshold level of the OR gate; and the OR gate is inhibited. When this occurs, a diode connected in parallel with the parallel RC circuit and having its anode connected to ground potential becomes forwardly biased and rapidly discharges the series capacitor connected between the output and the input of the OR gate. Since the pulse-width of the output pulse from the OR gate depends upon the time constant of the positive feedback circuit and since the time constant of the positive feedback circuit depends primarily upon the product of the capacitance of the series capacitor and the resistance of the resistor of the parallel RC circuit, the pulse-width may be easily preset to the value required. An example of such a ONE-SHOT device is the ONE-SHOT 1234 (FIG. 30).

The logic circuit 1000 further utilizes a bistable multivibrator or flip-flop formed by a pair of cross-coupled NOR gates as a control register. The control register is set in a first one of its two states by enabling one or more of the input leads to one of the NOR gates. The control register is switched to its second state by enabling one or more of the input leads to the other of the two NOR gates. When the control register is set in its first state by enabling one of the input leads to a first one of the two NOR gates, the output lead of that NOR gate is inhibited and the output lead of the second of the two NOR gates is enabled. When the control register is switched to its second state, the output lead of the first one of the two NOR gates is enabled and the output lead of the second one of the two NOR gates is inhibited. An example of such a bistable control register is the control register 2122 (FIG. 37).

The control circuit 1000 further utilizes several well-known integrated circuit components. Since these integrated circuit components are well-known per se, a detailed description of these circuits is not set forth herein. For a more detailed description of the integrated circuit components set forth hereinafter, reference may be had to "The Integrated Circuits Catalog for Design Engineers", First Edition, published by Texas Instruments Incorporated. The integrated circuit components are all available from Texas Instruments Incorporated and several other wellknown manufacturers. These components are the integrated circuit component Nos. 7447, 7475, 74100, 74123, 74192 and 75451. The circuit 1000 further utilizes a DR 2100 seven-segment readout available from The Radio Corporation of America.

Many different electrical control signals are generated by the circuit 1000 for controlling the operation of the machine 50. These control signals are set forth in FIGS. 29 through 42 by the control signal designations set forth in TABLE I below.

TABLE I

| DESIGNATION | NAME | GENER-ATED | RECEIVED |
|---|---|---|---|
| CCD | Copy Count Drive | 2100 | 1300 |
| CCE | Column Count Equal | 1800 | 2100 |
| CCR | Copy Count Reset | 2100 | 1300, 1400 |
| CG | Cutter Gate | 54 | 2100 |
| CL YES | Column Limit Yes | 164 | 2300, 2400 |
| CLEAR-2 | Clear | 532,2300 | 1700, 1800 |
| CR | Column Reset | 2400 | 2500 |
| CRT(1)B | Col. Readout Tens 1 Bit | 1800 | 1900 |
| CRT(2)B | Col. Readout Tens 2 Bit | 1800 | 1900 |
| CRT(4)B | Col. Readout Tens 4 Bit | 1800 | 1900 |
| CRT(8)B | Col. Readout Tens 8 Bit | 1800 | 1900 |
| CRU(1)B | Col. Readout Units 1 Bit | 1800 | 1900 |
| CRU(2)B | Col. Readout Units 2 Bit | 1800 | 1900 |
| CRU(4)B | Col. Readout Units 4 Bit | 1800 | 1900 |
| CRU(8)B | Col. Readout Units 8 Bit | 1800 | 1900 |
| CS | Column Step | 2400 | 2500 |
| CSD | Column Step Drive | 2100 | 1800,2200,2400 |
| EOCC | End of Copy Count | 1300 | 2100 |
| EOFC | End of Frame Count | 1400 | 2100 |
| EOFC-2 | End of Frame Count-2 | 2200 | 2100 |
| EOFR | End of Frame Count Reset | 2100 | 2200 |
| EOTR-1 | End of Carriage Travel Reset (Column) | 2200 | 2400 |
| EOTR-2 | End of Carriage Travel Reset (Row) | 2200 | 2300 |
| FCD | Frame Count Drive | 2100 | 1400 |
| FER | Frame Enter Reset | 1400 | 1300 |
| FG | Flash Gate | 54 | 2100 |
| FPE | Frame Program Entered | 2200 | 2300 |
| FRT | Frame Register Transfer | 2200 | 1400 |
| IPSC | Initial Program Switch Common | 2300,2400 | 532,536 |
| IPSC-2 | Initial Program Switch Common-2 | 2200 | 524,526,534 |
| IPSR | Initial Position Storage Reset | 2100 | 1700,1800,2200 |
| K/A | Keyboard Encoder A Bit | 1100 | 1200 |
| K/B | Keyboard Encoder B Bit | 1100 | 1200 |
| K/C | Keyboard Encoder C Bit | 1100 | 1200 |
| K/D | Keyboard Encoder D Bit | 1100 | 1200 |
| K/φ | Keyboard Encoder φ line | 1100 | 1200 |
| KBI | Keyboard Inhibit | 2200 | 1200,1300,1400 |
| KSR | Keyboard Storage Reset | 1300 | 1200 |
| MASG-1 | Manual/Auto Step Generator | 2100 | 2200,2300,2400 |
| MCE | Multiple Copy Enable | 2100 | 54 |
| MS COM | Mode Switch COM Position | 152,2500 | 2300,2400 |
| MS COS | Mode Switch COSATI Position | 152,2500 | 2300,2400 |
| PE | Print Enable | 2600 | 2200 |
| PFS-1 | Paper Feed Stop COM | 2300 | 2100 |
| PFS-2 | Paper Feed Stop COSATI | 2400 | 2100 |
| PFSG-1 | Paper Feed Stop Gated COM | 2100 | 2200 |
| PFSG-2 | Paper Feed Stop Gated COSATI | 2100 | 2200 |
| POR | Power On Reset | 2200 | 1300,1400 2300,2400 |
| PR | Positioner Ready | 2100 | 2300,2400 |
| PL | Print Latch | 2200 | 2100,2300,2400 |
| PLR | Print Latch Reset | 2100 | 2200 |
| PSC | Print Start Command | 2100 | 54 |
| PSL | Print Stop Light | 2200 | 508 Lamp |
| RC | Reset Common | 2300,2400 | 2500 |

TABLE I —Continued

| DESIGNATION | NAME | GENERATED | RECEIVED |
|---|---|---|---|
| RCE | Row Count Equal | 1700 | 2100 |
| RL YES | Row Limit Yes | 166 | 2300,2400 |
| RR | Row Reset | 2300 | 2500 |
| RS | Row Step | 2300 | 2500 |
| RSD | Row Step Drive | 2100 | 1700,2200,2300 |
| RT-1 | Reset Time for Column Slide | 2400 | 2200 |
| RT-2 | Reset Time for Row Slide | 2300 | 2200 |
| RTG | Reset Time Gated | 2200 | 1700,1800 |
| RH(1)B | Readout Hundreds 1 Bit | 1400 | 1600 |
| RH(2)B | Readout Hundreds 2 Bit | 1400 | 1600 |
| RH(4)B | Readout Hundreds 4 Bit | 1400 | 1600 |
| RH(8)B | Readout Hundreds 8 Bit | 1400 | 1600 |
| RT(1)B | Readout Tens 1 Bit | 1400 | 1600 |
| RT(2)B | Readout Tens 2 Bit | 1400 | 1600 |
| RT(4)B | Readout Tens 4 Bit | 1400 | 1600 |
| RT(8)B | Readout Tens 8 Bit | 1400 | 1600 |
| RU(1)B | Readout Units 1 Bit | 1400 | 1600 |
| RU(2)B | Readout Units 2 Bit | 1400 | 1600 |
| RU(4)B | Readout Units 4 Bit | 1400 | 1600 |
| RU(8)B | Readout Units 8 Bit | 1400 | 1600 |
| SC | Step Common | 2300,2400 | 2500 |
| SGI | Step Generator Inhibit | 2100 | 2300,2400 |
| SH(1)B | Storage Hundreds 1 Bit | 1200 | 1400 |
| SH(2)B | Storage Hundreds 2 Bit | 1200 | 1400 |
| SH(4)B | Storage Hundreds 4 Bit | 1200 | 1400 |
| SH(8)B | Storage Hundreds 8 Bit | 1200 | 1400 |
| ST(1)B | Storage Tens 1 Bit | 1200 | 1300,1400 |
| ST(2)B | Storage Tens 2 Bit | 1200 | 1300,1400 |
| ST(4)B | Storage Tens 4 Bit | 1200 | 1300,1400 |
| ST(8)B | Storage Tens 8 Bit | 1200 | 1300,1400 |
| SU(1)B | Storage Units 1 Bit | 1200 | 1300,1400 |
| SU(2)B | Storage Units 2 Bit | 1200 | 1300,1400 |
| SU(4)B | Storage Units 4 Bit | 1200 | 1300,1400 |
| SU(8)B | Storage Units 8 Bit | 1200 | 1300,1400 |
| TLR | Travel Limit Reset | 2200 | 2100 |
| 11 | Tens 1 Bit | 1700,1800 | 1900 |
| 12 | Tens 2 Bit | 1700,1800 | 1900 |
| 14 | Tens 4 Bit | 1700,1800 | 1900 |
| 18 | Tens 8 Bit | 1700,1800 | 1900 |
| 01 | Units 1 Bit | 1700,1800 | 1900 |
| 02 | Units 2 Bit | 1700,1800 | 1900 |
| 04 | Units 4 Bit | 1700,1800 | 1900 |
| 08 | Units 8 Bit | 1700,1800 | 1900 |

Many of the above control signals are utilized by the control circuit 1000 and are illustrated in FIGS. 29 through 42 in a low active state. That is, the particular control signal being referred to is present or true when that signal is at a low or ground potential. The absence of that particular control signal is indicated by a high potential. Such a signal is illustrated in FIGS. 29 through 42 by the alpha-numeric designations set forth above and by a heavy line or bar above that designation. For example, not the signal FE in FIG. 29. For convenience, a low active control signal is indicated hereinafter in this specification by underscoring under the particular control signal designation. For example, the above-mentioned control signal in FIG. 29 is referred to hereinafter as FE.

The keyboard encoder circuit 1100 (FIG. 29) is physically and functionally quite similar to the keyboard encoder circuit illustrated in FIG. 8 of the above identified two copending United States patent applications. As described in the above two copending patent applications, the keyboard encoder circuit 1100 (FIG. 29) is used to convert the decimal input from the keys 514 into a binary coded decimal (BCD) form for storage in the circuits 1200, 1300 and 1400. A plurality of NAND gates 1102 are utilized to convert the decimal input information as obtained by the depression of one of the keys 514 to the BCD form for programming either the print-frame display circuit 1500 or the number of consecutive frames display circuit 1600. The NAND gates 1102 convert the units digit and the tens digit of the desired number of prints/frame and the units digit, the tens digit and the hundreds digit of the desired number of consecutive frames into BCD form for storage in the circuits 1300 and 1400 and for display by the circuits 1500 and 1600.

The keyboard sequence A circuit 1200 (FIG. 30) includes a plurality of OR gates 1202 and a NOR gate 1204 for receiving one or more of the signals K/A, K/B, K/C or K/D or K/O generated by the circuit 1100 in response to the depression of one of the keys 514. The OR gates 1202 are enabled in response to the presence of one of the above signals at their inputs and enable the corresponding input leads of a units side 1206 of a common storage or memory register 1207 formed by an 8-BIT bistable latch 1208 and a 4-BIT bistable latch 1210 connected in a cascade arrangement with the latch 1208. The common storage or memory register 1207 stores a units digit, a tens digit and a hundreds digit in BCD form.

The output leads of the latches 1208 and 1210 are initially reset to zero in response to a presence of the signal KSR. The signal KSR enables a NOT gate 1212 to thereby enable on OR gate 1214. The trailing edge of the positive output pulse from the enabled OR gate 1214 causes the output leads of the units side 1206 to display the data presented to the input leads of the units side 1206.

Since, initially, none of the OR gates 1202 are enabled, all of the input leads to the units side 1206 are inhibited. Consequently, none of the output leads of the units side 1206 are enabled.

A NOR gate 1216 is also enabled in response to the trailing edge of the positive pulse from the NOT gate 1212 to enable a ONE-SHOT 1218 and an OR gate 1220. The enabled OR gate 1220 enables a ONE-SHOT 1222 which in turn enables an OR gate 1224 for clocking a tens side 1226 of the register 1207 to cause the output leads of the tens side 1226 to display in BCD form the data present on the input leads of the tens side 1226. Since the input leads to the tens side 1226 are strapped to the output leads of the units side 1206 and since the output leads of the units side 1206 are inhibited, the input leads of the tens side 1226 are also inhibited. The output leads of the tens side 1226 are, thus, all inhibited in response to the detection of the trailing edge of the positive clock pulse from the enabled OR gate 1224.

Subsequent to the clocking of the tens side 1226 of the register 1207, the latch 1210 also receives a clock pulse to transfer the data present on the input leads of the latch 1210 to the output leads of the latch 1210. The enabled or inhibited output leads of the latch 1210 represent the storage of a hundreds digit in BCD form in the register 1207.

The latch 1210 receives a clock pulse when a NOR gate 1228 is enabled in response to the trailing edge of the positive pulse from the enabled ONE-SHOT 1218. The enabled NOR gate 1228 enables an OR gate 1230 which presents a positive clock pulse to the latch 1210 to transfer the data stored on the input leads of the latch 1210 to the output leads of the latch 1210 on the trailing edge of that clock pulse.

Since a clock pulse is presented to the latch 1210 after the tens side 1226 of the latch 1208 is clocked and since the output leads of the tens side 1226 are all inhibited, the input leads to the latch 1210 which are strapped to the output leads of the tens side 1226 of the latch 1208 are also inhibited. Since this information is transferred to the output leads of the latch 1210 on the trailing edge of the positive clock pulse from the OR gate 1230, the output leads of the latch 1210 are also all inhibited. In this manner, the output leads of the register 1207 are initially inhibited.

The units and tens digit of the desired number of prints/frame and the units, tens and hundreds digits of the desired number of consecutive frames are entered into the register 1207 in the following manner. To enter the desired number of prints/frame into the register 1207, the tens digit so that number is entered first by depressing the key 514 corresponding to that digit. Subsequently, the units digit of that number is entered by depressing the key 514 corresponding to that digit.

In order to enter the desired number of consecutive frames into the register 1207, the hundreds digit is entered first by depressing the appropriate key 514. Next, the tens digit is entered; and lastly, the units digit is entered.

Depressing one of the keys 514 results in one or more of the OR gates 1202 or the NOR gate 1204 being enabled to enable an OR gate 1232 that in turn enables a ONE-SHOT 1234. The enabled ONE-SHOT 1234 enables the OR gate 1230 to clock the hundreds digit storage portion of the register 1207, the latch 1210, on the trailing edge of the positive pulse from the enabled OR gate 1230. Thus, the data present on the input leads of the latch 1210 in BCD form is transferred to its output leads. Since the register 1207 is preset to zero, the input leads of the latch 1210, strapped to the output leads of the tens side 1226 of the register 1207 are all inhibited. Thus, the output leads of the latch 1210 are also inhibited after receipt of the clock pulse from the enabled OR gate 1230.

The trailing edge of the positive pulse from the enabled ONE-SHOT 1234 further enables a NOR gate 1236 to enable the OR gate 1220 and the ONE-SHOT 1222. The enabled ONE-SHOT 1222 enables the OR gate 1224 to present a positive clock pulse to the tens side 1226 of the register 1207. As discussed above, the data present on the input leads of the tens side 1226 in BCD form is transferred to the output leads of the tens side 1226 on the trailing edge of the positive clock pulse from the enabled OR gate 1224. Since the input leads to the tens side 1226 are strapped to the output leads of the units side 1206 and since the output leads of the units side 1206 are initially inhibited, the input leads to the tens side 1226 are inhibited. Thus, the output leads of the tens side 1226 are also inhibited subsequent to the receipt of the clock pulse from the enabled OR gate 1224.

A NOR gate 1238 is also enabled in response to the detection of the trailing edge from the ONE-SHOT 1222 to enable a ONE-SHOT 1240. The ONE-SHOT 1240 enables the OR gate 1214 to provide a positive clock pulse to the units side 1206 of the register 1207, as described above. The data present on the input leads to the units side 1206 is transferred to the output leads upon receipt of the trailing edge of the positive clock pulse from the OR gate 1214. Thus, the digit presented in BCD form to the input leads of the units side 1206 from the OR gates 1202, or the absence thereof as indicated by the enabling of the NOR gate 1204, is transferred to the output leads of the units side 1206 upon receipt of the trailing edge of the positive clock pulse from the enabled OR gate 1214.

A subsequent depression of one of the keys 514 transfers the data present in BCD form on the output leads of the units side 1206 of the register 1207 to the tens side 1226 in the manner described above. The data then present on the output leads of the tens side 1226 of the register 1207 is transferred to the latch 1210 by a subsequent depression of one of the keys 514 in the manner set forth above.

Thus, a two or three digit number may be stored in the register 1207 in BCD form. That number may subsequently be transferred to either the circuits 1300 and 1500 by the depression of the strobe button 516 or to the circuits 1400 and 1600 by the depression of the strobe button 520. Depression of either one of the buttons 516 or 520 also generates the signal KSR to reset the register 1207 as described above.

The entering of data into the register 1207 may be inhibited the presence of the signal KBI from the circuit 2200 during an initial power-on reset portion of the operation of the circuit 1000 or during the automatic printing or reproduction portion of the machine 50. The signal KBI enables an OR gate 1242 to enable the OR gates 1214, 1224 and 1230. The enabled OR gates 1214, 1224 and 1230 maintain the clock input leads of the register 1207 at a high positive logic level to prevent the entrance of any data into the register 1207.

The keyboard sequence B circuit 1300 (FIG. 31) is used to receive and store the desired number of prints/frame from the register 1207 (FIG. 30) in BCD form and to control the number of prints/frame printed or reproduced by the machine 50. The control circuit 1300 includes two cascaded presetable down-counters 1302 and 1304. The counter 1302 is used to store in digital form and monitor the tens digit of the desired number of prints/frame. The counter 1304 is used to store in digital form and monitor the units digit of the desired number of prints/frame.

The data present in BCD form on the input leads to the counters 1302 and 1304 is transferred to the output leads of the counters 1302 and 1304 in response to the presence of one of the signals POR or CCR or to the presence of the signal CE and the simultaneous absence of the signal KBI. The counter 1302 is initially preset to zero and the counter 1304 is initially present to store the numeral 1 in digital form in response to the signal POR during the power-on reset portion of the operation of the control circuit 1000. Similarly, the counter 1302 is reset to zero and the counter 1304 is reset to store the numeral 1 in response to the presence of the signal CCR after the exposure of the last copy of the copy program entered into the machine 50.

The presence of either of these two signals enables an OR gate 1306 which in turn enables a pair of OR gates 1308 and 1310. The enabled OR gate 1308 enables the input lead of the counter 1301 corresponding to the 1 BIT for storing the numeral 1 in digital form. The enabled OR gate 1310 inhibits a NOT gate 1312 to present a negativegoing load pulse to the counters 1302 and 1304 to store the digits presented in digital form on their input leads in the counters 1302 and 1304 and to transfer that stored information to the corresponding output leads of the counters 1302 and 1304.

The presence of the signal CE and the absence of the signal KBI enables a NOR gate 1314 to enable a ONE-SHOT 1316. The presence of the signal KBI, generated as described above, prevents the enabling of both the NOR gate 1314 and the OR gate 1316 by the signal CE.

The enabled ONE-SHOT 1316 enables the OR gate 1310 to inhibit the NOT gate 1312 and to thereby cause the counters 1302 and 1304 to store the digits presented in digital form to their input leads, as described above. The output leads of the counters 1302 and 1304 also present the digits or number stored in digital or BCD form both to a coincidence circuit 1318 for determining when the counters 1302 and 1304 have been decremented to a zero count and to a plurality of output leads for controlling the display of the prints/frame display circuit 1500. The display circuit 1500 controls the indicator 522 to display in decimal form the numeral or digits stored in the counters 1302 and 1304. The coincidence circuit 1318 is formed by a plurality of OR gates 1320 which are all inhibited to generate the signal EOCC and through a NOT gate 1322, the signal EOCC when all of the output leads of the two counters 1302 and 1304 are inhibited, indicating that the counters 1302 and 1304 have been decremented to zero.

The presence of the signal EOCC causes the generation of the signal CCR, discussed above, upon the detection of the trailing edge of the signal FG. The signal FG is derived from the printing or reproduction assembly 54. The signal FG is derived from a one-shot or flash gate G23 of FIG. 5 of the above-identified U.S. Pat. No. 3,655,282. The leading edge of the positive output pulse from the flash gate G23 initiates the exposure of a copy by the exposure lamp 80 (FIG. 7 of this disclosure). The trailing edge of the positive output pulse from the flash gate G23 occurs after the completion of the exposure of a copy at the exposure station 104. Thus, the counter 1302 is reset to store the numeral zero and the counter 1304 is reset to store the numeral 1 after the completion of each copy program.

The counters 1302 and 1304 are connected in a cascade arrangement and are decremented in response to the receipt of the leading edge of a positive going clock pulse from an enabled NOR gate 1324. The NOR gate 1324 is enabled in response to the presence of the signal CCD generated by the circuit 2100 in response to the presence of the signal CG. The signal CG is generated by the printing or reproduction assembly 54. More specifically, the signal CG is generated by the enabled AND gate G21 of FIG. 5 of the above-mentioned U.S. Pat. No. 3,655,282.

The control circuit 1300 further generates the signal KSR for resetting the storage register 1207 (FIG. 30) to a zero count. As described, above, the presence of the signal CE enables the ONE-SHOT 1316. A NOR gate 1326 is enabled by the trailing edge of the positive pulse on the enabled ONE-SHOT 1316 to enable a ONE-SHOT 1328. A NOR gate 1330 is subsequently enabled by the trailing edge of the positive pulse from the enabled ONE-SHOT 1328. The enabled NOR gate 1330 inhibits a NOT gate 1332 to generate the signal KSR. The signal FER similarly results in the generation of the signal KSR. The signal FER is generated by the circuit 1400, as described hereinafter.

The keyboard sequence C circuit 1400 (FIG. 32) stores and monitors the desired number of consecutive frames or micro-images to be printed or reproduced by the machine 50. The control circuit 1400 provides an output signal when one set of one copy each of the desired number of frames or micro-images has been reproduced by the machine 50. The circuit 1400 includes a storage or memory register 1402 formed by an 8-BIT bistable latch 1404 having a units side 1406 and a tens side 1408 for storing a units digit and a tens digit, respectively, in digital form. The register 1402 further includes a 4-BIT bistable latch 1410 for storing the hundreds digit of the desired number of consecutive frames in digital form. The latches 1404 and 1410 transfer data presented in BCD form to their input leads to their corresponding output leads upon detecting the trailing edge of a positive clock pulse from an OR gate 1412 on their respective clock input leads.

The data present on the output leads of the latches 1404 and 1410 is directed to a plurality of cascaded, presettable, BCD down-counters 1414, 1416 and 1418 for respectively storing in BCD form and monitoring the units digit, the tens digit and the hundreds digit of the desired number of consecutive frames or micro-images to be printed or reproduced by the machine 50. The digital data present on the output leads of the latches 1404 and 1410 is entered into the counters 1414, 1416 and 1418 and simultaneously displayed by the corresponding output leads of the counters 1414, 1416 and 1418 in response to the presence of the leading edge of a negative going load pulse from an inhibited NOT gate 1420 presented on the load input leads to the counters 1414, 1416 and 1418. The output leads from the counters 1414, 1416 and 1418 provide the digital data for controlling the numer of consecutive frames display circuit 1600 (FIG. 34) and, further, enable the monitoring of the number of consecutive frames or micro-images being printed or reproduced by the machine 50 by means of a coincidence circuit 1422. The coincidence circuit 1422 is formed by a plurality of OR gates 1424 and generates the signal EOFC when all of the OR gates 1424 are inhibited indicating that the counters 1414, 1416 and 1418 have been decremented to zero.

The counters 1414, 1416 and 1418 are decremented in response to the leading edge of a positive clock pulse from an enabled NOR gate 1426 presented to the input clock lead of the counter 1414. The NOR gate 1426 is enabled in response to the presence of the signal FCD and to the simultaneous absence of the signal EOFC. The presence of the signal EOFC, indicating that the counters 1414, 1416 and 1418 have decremented to zero, enables a NOR gate 1428 to prevent the NOR gate 1426 from being enabled by the signal FCD from the circuit 2100 (FIG. 37).

The latches 1404 and 1410 and the counters 1416 and 1418 are initially preset and subsequently reset to zero and the counter 1414 is initially preset and subsequently reset to store the numeral 1 in digital form by the presence either one of the signals POR or CCR, as discussed above. The presence of either one of these two signals enables an OR gate 1430 which in turn enables a plurality of OR gates 1432, 1434 and 1412. The enabled OR gate 1412 presents a positive clock pulse to the latches 1404 and 1410 to cause the data present on all of the input leads of the latches 1404 and 1410 to be transferred to their output leads. Simultaneously, the enabled OR gate 1432 enables the appropriate one of the four digital data input leads to the counter 1414 such that the numeral 1 is presented in digital form for storage in the counter 1414. Simultaneously, the enabled OR gate 1434 inhibits the NOT gate 1420 to present a negative or low active load pulse on the load input leads to the counters 1414, 1416 and 1418 to cause those counters to store and present on their output leads the data presently appearing on the input leads. Thus, the counters 1416 and 1418 store a zero count; and the counter 1414 stores the numeral 1 in digital form. In this manner, the counters 1414, 1416 and 1418 are initially preset and subsequently reset to store the numeral 001 in BCD form.

After the initial power-on reset operation of the machine 50 or subsequent to a reset operation of the circuit 1400, data is transferred from the register 1207 (FIG. 30) to the register 1402 (FIG. 32) for storage in the counters 1414, 1416 and 1418 by the presence of the signal FE, resulting from the depression of the strobe button 516, and the simultaneous absence of the signal KBI, discussed above.

The presence of the signal FE and the simultaneous absence of the signal KBI enables a NOR gate 1436 to enable a ONE-SHOT 1438. The enabled ONE-SHOT 1438 enables the OR gate 1412 to provide a positive clock pulse to the clock input leads of the register 1402 to cause the transfer of data present on the input leads of the register 1402 to its output leads upon receipt of the trailing edge of the positive clock pulse from the enabled OR gate 1412.

In response to the trailing edge of the positive pulse from the enabled ONE-SHOT 1438, the NOR gate 1440 is enabled to enable a ONE-SHOT 1442. The enabled ONE-SHOT 1442 enables the OR gate 1434 to inhibit the NOT gate 1420 to cause the data present on the input leads of the counters 1414, 1416 and 1418 to be stored in those counters and displayed by their output leads. The enabled ONE-SHOT 1442 further inhibits a NOT gate 1444 to generate the signal FER for resetting the register 1207, as discussed above.

Figure 38:
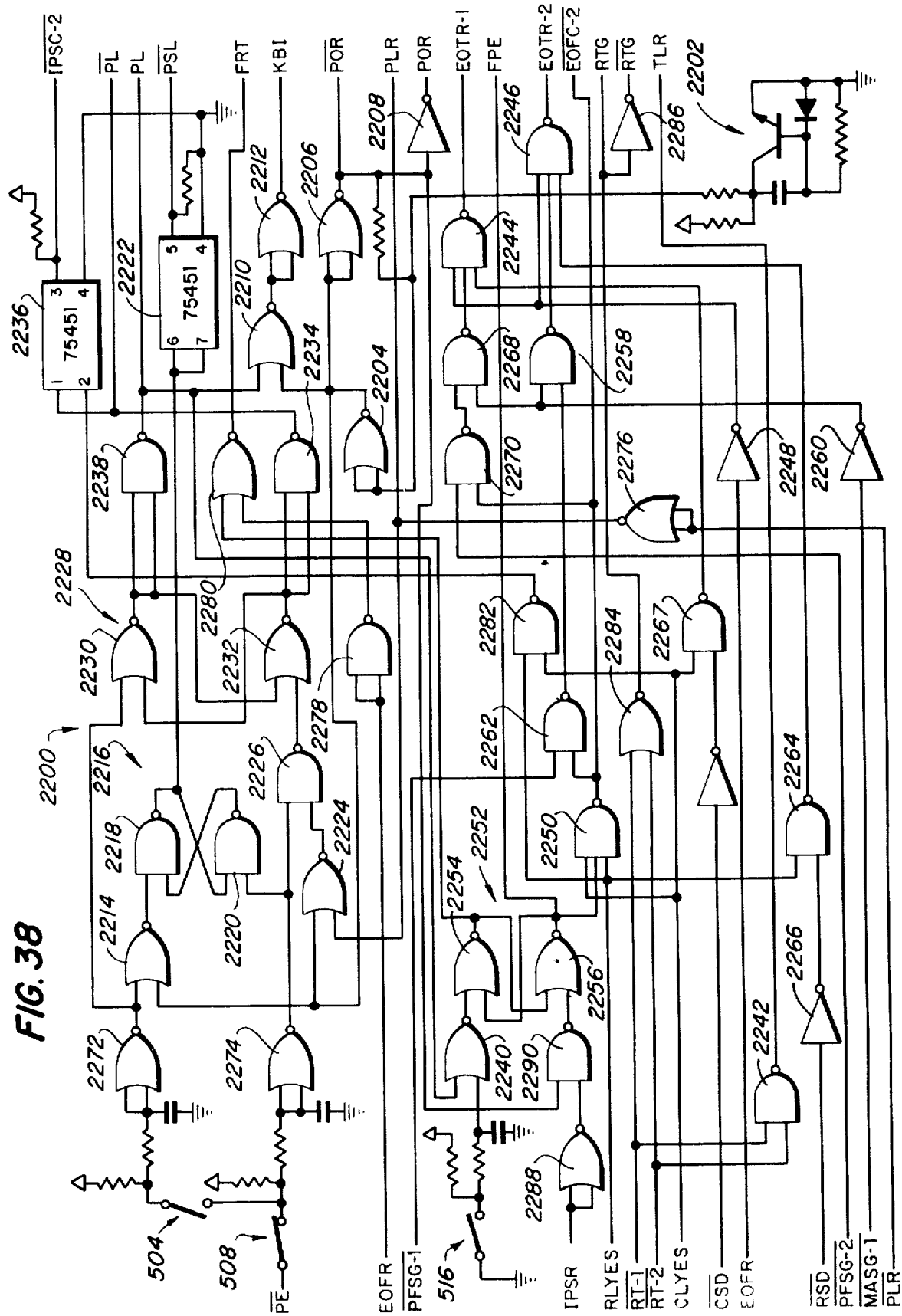

If a desired number of consecutive frames is programmed into the machine 50, after the exposure of a copy of the last frame of the desired number of consecutive frames, the signal FRT is generated by the circuit 2200 (FIG. 38). The signal FRT enables the ONE-SHOT 1442 to reset the counters 1414, 1416 and 1418 through the gates 1434 and 1420, as described above. This reset operation of the circuit 1400 permits the machine 50 to print or reproduce an additional set of one copy each of the number of consecutive frames programmed into the machine 50. The signal FRT further generates the signal FER to reset the register 1207 (FIG. 30), as described above.

The prints/frame display circuit 1500 (FIG. 33) provides a continuous display, in decimal form, via the indicator 522, of the number of prints or copies per frame that remain to be reproduced by the machine 50. This number, as stored in the counters 1302 and 1304 and present on their output leads in BCD form, is provided to the input leads of a pair of seven-segment decoder drivers 1502 and 1504 corresponding to the tens digit and units digit, respectively, of the above number. The decoder drivers 1502 and 1504 controllably energize a pair of seven-segment readouts 1506 and 1508, respectively, for displaying the number of prints per frame that remain to be reproduced by the machine 50.

Similarly, a number of consecutive frames display circuit 1600 (FIG. 34) is provided for displaying in decimal form, via the indicator 518, the number of consecutive frames stored in the counters 1414, 1416 and 1418 (FIG. 32) in BCD form that remain to be printed or reproduced by the machine 50. The circuit 1600 includes a plurality of sevensegment decoder drivers 1602, 1604 and 1606 for controllably energizing a plurality of seven-segment readouts 1608, 1610 and 1612, respectively, for displaying the number of consecutive frames or micro-images that remain to be printed or reproduced by the machine 50.

In this manner, a copy program including a desired number of prints per frame and a desired number of consecutive frames or micro-images to be printed or reproduced by the machine 50 may be entered into the machine 50 through the circuits 1100, 1200, 1300, 1400, 1500 and 1600.

After the machine 50 is turned on by placing the power switch 502 in its on position and after the completion of the power-on reset operation, the indicators 528 and 530 each display the number 01. This number corresponds to the initial or home position of column slide 134 and the row slide 150, as described above. With the column slide 134 and the row slide 150 in their home position, the first micro-image on the microfiche 190 is positioned in the illumination path 92 of the optics assembly 62 of the machine 50. If the desired first programmed frame, as described above, is different than this frame or micro-image, the location of the desired first programmed frame may be entered into the machine 50 by depressing the column switch 524 and the row switch 526, as described above. Depressing one or both of the switches 524 and 526 causes the circuits 1700, 1800 and 1900 to store and display the first programmed frame in the following manner.

Since the initial position counter (row) circuit 1700 (FIG. 35) is essentially identical to the initial position counter (column) circuit 1800, only the circuit 1700 is discussed in detail hereinafter. The circuit 1700 includes a row storage or memory register 1702 formed by a pair of cascaded BCD count-up counters 1704 and 1706. The counter 1704 is used to store and present on its output leads in digital form the tens digit of the row location of the desired first programmed frame. Similarly, the counter 1706 is used to store and present on its output leads in digital form the units digit of the row location of the desired first programmed frame. The data input leads to the counter 1704 are maintained at ground potential so that the counter 1704 is preset and subsequently reset to a zero count. Three of the four data input leads to the counter 1706 are maintained in an inhibited state and the remaining appropriate data input lead is maintained in an enabled state so that the counter 1706 is preset and subsequently reset to store the numeral 1 in digital form. Thus, the register 1702 is initially preset and subsequently reset to store the numeral 01 in BCD form.

The circuit 1700 further includes a row step counter 1708 for monitoring the number of forward steps or advancements of the row slide 150. The counter 1708 is formed by a pair of cascaded BCD count-up counters 1710 and 1712. The counter 1710 is used for accumulating and storing in digital form the tens digit of the number of forward steps or advancements of the row slide 150. The counter 1712 is used for accumulating and storing in digital form the units digit of the number of forward steps or advancements of the row slide 150. Since all of the data input leads to the counter 1710 are inhibited, the counter 1710 is preset and subsequently reset to a zero count. Three of the four data input leads to the counter 1712 are maintained in an inhibited state and the remaining appropriate data input lead is maintained in an enabled state in order to store the number 1 in digital form. Thus, the counter 1708 is initially preset and subsequently reset to store the numeral 01 in BCD form.

The counters 1704 and 1710 are initially preset to zero and the counters 1706 and 1712 are initially preset to store the numeral 1 in digital form by the signal CLEAR-2 as generated by the circuit 2300 during the power-on reset operation. The signal CLEAR-2 enables a pair of NOR gates 1714 and 1716 to provide a negative or low active input load pulse to the load input leads of the counters 1704, 1706, 1710 and 1712 to cause those counters to store the information present on their input leads in the counters and to cause their output leads to also present this information in digital form. The signal CLEAR-2 is also generated by the circuit 2300 in response to a depression of the clear switch 532 (FIG. 26) to effect a subsequent reset of the counters 1704, 1706, 1710 and 1712.

The register 1702 may also be reset to store the numeral 01 in BCD form by the presence of the signal IPSR, generated by the circuit 2100 in response to the exposure of the last copy in the desired copy program entered into the machine 50. The counter 1708 may likewise be reset to store the numeral 01 in BCD form in response to the presence of the signal RTG generated by the circuit 2200 (FIG. 38) when the last micro-image on a microfiche 190 has been positioned in the illumination path 92 by the column slide 134 and the row slide 150.

The register 1702 is advanced to store the row location of the desired first programmed frame by the depression of the row switch 526 in the absence of the signal IPSC-2. The signal IPSC-2 is generated by the circuit 2200 (FIG. 38) when the machine 50 is in its automatic printing or reproduction portion of its operation or when the last micro-image on a microfiche 190 is positioned in the illumination path 92 by the column slide 134 and the row slide 150.

In the absence of the signal IPSC-2, the depressed row switch 526 enables a first one of the input leads of a first NOR gate 1718 of a control register 1719 formed by a pair of cross-coupled NOR gates 1718 and 1720. The enabled input lead inhibits the NOR gate 1718 to enable the NOR gate 1720 to thereby place the control register in one of its two states. The control register is reset or placed in the other of its two states when the row switch 526 is released in the absence of the signal IPSC-2.

The enabled NOR gate 1720 removes the inhibit on the clear function of a 1000 millisecond (ms.) retriggerable monostable multivibrator 1722 to permit the subsequent operation of the multivibrator 1722. The inhibited NOR gate 1718 enables a NAND gate 1724 to inhibit a NAND gate 1726 to thus inhibit the data or clock input lead of a 60 ms. retriggerable monostable multivibrator 1727. The multivibrator 1727 provides a 60 ms. positive output pulse to the clock input lead of the counter 1706 to increment the register 1702 one count. The multivibrator 1722 is triggered on the trailing edge of the positive output pulse from the multivibrator 1727 to generate a low active 1000 ms. output pulse for application to one of the input leads of the NAND gate 1726. The output pulse from the multivibrator 1722 enables the NAND gate 1726 if the row switch 526 is maintained in a depressed condition. The NAND gate 1726 is subsequently inhibited in response to the receipt of the trailing edge of the low active output pulse from the multivibrator 1722 to thereby retrigger the multivibrator 1727 to increment the register 1702 one count. The multivibrator 1722 may once again be retriggered by the trailing edge of the positive output pulse from the multivibrator 1727. Thus, the register 1702 and the indicator 530 (FIG. 26) are continuously incremented or slewed approximately one count per second when the row switch 526 (FIG. 26 and FIG. 35) is maintained in a depressed condition.

If the row switch 526 is released prior to the receipt of the trailing edge of the low active output pulse from the multivibrator 1722 at the input of the NAND gate 1726, the NAND gate 1726 is maintained in an enabled state by the control register 1719 to prevent the retriggering of the multivibrator 1727. When the row switch 526 is released, the NOR gate 1720 is inhibited to inhibit the clear input terminal of the multivibrator 1722 thereby terminating the low active output pulse to enable the associated input lead to the NAND gate 1726. Simultaneously, the NOR gate 1718 is enabled inhibiting the NAND gate 1724 to prevent the NAND gate 1726 from being inhibited. Thus, the multivibrator 1727 is not retriggered. In this manner, the row location of the desired first programmed frame is entered into the register 1702 and displayed by the indicator 530.

The row step counter 1708 is incremented in response to the detection of the trailing edge of a signal RSD as presented to the clock input lead of the counter 1712. The signal RSD is generated by the circuit 2100 (FIG. 37) each time a row slide stepping pulse is directed to the row motor 156 for advancing the row slide 150 one forward step. The signal RSD is not generated by the circuit 2100 when the data stored in the register 1702 equals the data accumulated in the counter 1708.

A coincidence circuit 1728 is used to generate the signals RCE and RCE when the data stored in the register 1702 equals the data accumulated by the counter 1708. The coincidence circuit 1728 is formed by a plurality of EXCLUSIVE OR gates 1730 for comparing the corresponding output leads of the register 1704 and the counter 1708. The output leads of the EXCLUSIVE OR gates 1730 are directed to the inputs of a plurality of NOR gates 1732. The output leads of the NOR gates 1732 are directed to the inputs of a pair of NAND gates 1734. The output leads of the NAND gates 1734 are in turn directed to a NOR gate 1736. In this manner, the NOR gate 1736 is enabled and generates the signal RCE when the data stored in the register 1702 equals the data accumulated by the counter 1708. The enabled NOR gate 1736 inhibits a NOR gate 1738 to generate the signal RCE concurrently with the signal RCE. When the data stored in the register 1702 does not equal the data accumulated by the counter 1708, the NOR gate 1736 is inhibited; and the signals RCE and RCE are not generated.

The data stored in BCD form in the register 1702 is directed to the frame reference display circuit 1900 (FIG. 36) by a plurality of OR gates 1740. The frame reference display circuit 1900 receives in BCD form the row location and the column location of the first programmed frame converts this information into a visual decimal form for display by the indicators 528 and 530.

The circuit 1900 includes a plurality of seven-segment decoder drivers 1902, 1904, 1906 and 1908 for controlling the operation of a plurality of seven-segment readouts 1910, 1912, 1914 and 1916. The driver 1904 and the readout 1912 and the driver 1902 and the readout 1910 respectively enable the indicator 528 to display in a visual decimal form the units digit and the tens digit of the column location of the desired first programmed frame. Similarly, the driver 1908 and the readout 1916 and the driver 1906 and the readout 1914 respectively enable the indicator 530 to display in a visual decimal form the units digit and the tens digit of the row location of the desired first programmed frame.

In accordance with an important feature of the present invention, the circuits 2100, 2200, 2300, 2400 and 2500 control the operation of the transport asembly 64. More specifically, these circuits control the phase relationship of the energized windings of each of the column motor 154 and the row motor 156 to enable the forward stepwise advancement or the novel reset operations of the column slide 134 and of the row slide 150.

The transport motor control circuit 2500 (FIG. 40) includes the switching logic for the control switches 152, 160, 162, 164 and 166. When the two-position, manually operable mode switch 152 is placed in its ROW or COM position, the signal MS COM is generated. When the mode switch 152 is placed in its COL. or COSATI position, the signal MS COS is generated. The presence of the signal MS COM enables the transport assembly 64 to properly advance a microfiche 190 of the COM pagination through the machine 50. The presence of the signal MS COS enables the transport assembly 64 to properly advance a microfiche 190 having a COSATI pagination through the machine 50.

When the last frame or micro-image in a colume of the microfiche 190 is positioned in the illumination path 92 by the column slide 134, the column slide limit switch 164 is actuated to generate the signal CL YES. Similarly, when the last frame or micro-image in a row of the microfiche 190 is positioned in the illumination path 92 by the row slide 150, the row slide limit switch 166 is actuated to generate the signal RL YES. These signals are directed to the circuits 2300 and 2400 for controlling the operation or movements of the column slide 134 and of the row slide 150.

The column cam switch 160 is illustrated in its normally-closed position when the rotatable portion 300 (FIG. 8) of the cam follower biased switch arm 302 of the column cam switch 160 is positioned in one of the pair of slots 298 of the column drive disc 286. Similarly, the row cam switch 162 is illustrated in its normally-closed position when a rotatable portion 400 of a cam follower biased switch arm 402 of the row cam switch 162 is positioned in one of the pair of slots 398 of the row drive disc 386. The cam switches 160 and 162 are opened when the rotatable portions 300 and 400 are moved out of the slots 298 and 398 by the rotation of the drive discs 286 and 386, respectively.

Preferably, each of the motors 154 and 156 includes a pair of windings that may be energized either in phase to dynamically brake the motors 154 and 156 or in either one of two possible out-of-phase relationships. When energized in a first out-of-phase relationship, the windings thereby generate a rotating magnetic field of a first direction to thereby cause the motors 154 and 156 to rotate in a forward direction. When energized in the second out-of-phase relationship, the windings generate a rotating magnetic field of a second or opposite direction to thereby cause the motors 154 and 156 to rotate in the reverse direction. A plurality of alternating current switches 2502, 2504, 2506, 2508 and 2510 are utilized to control the energization of the windings of the motors 154 and 156.

An alternating current switch circuit 2700 (FIG. 42) may be utilized for each of the above-mentioned five alternating current switches. The switch circuit 2700 utilizes a relay 2702 to control the state of a triac 2704. When the relay 2702 is energized, a relay contact 2702A is closed to place the triac 2704 in its conductive state. Thus, alternating current is permitted to pass from an alternating current input lead to an alternating current output lead. When the relay 2702 is deenergized, the relay contact 2702A opens to place the triac 2704 in its nonconductive state, thereby blocking the passage of alternating current from an alternating current input lead to an alternating current output lead.

In accordance with an important feature of the present invention, when all of the switches 2502, 2504, 2506, 2508 and 2510 are in their conductive states the column motor 154 and the row motor 156 are dynamically braked. When the transport assembly is stationary for a significant period of time, switch 2502 is placed in its nonconductive state to prevent the passage of alternating current power to the windings of the motors 154 and 156. In order to affect either the stepwise forward advancement of or the reset operation of either one or both of the motors 154 and 156, the switch 2502 is switched to its conductive state to cause the alternating current power present at its input to be applied to the windings of the motors 154 and 156.

The switch 2502 is placed in its conductive state by the presence of the signal SC from one of the circuits 2300 (FIG. 39) or 2400. If all of the switches 2504, 2506, 2508 and 2510 are also in their conductive states, the output drive shafts 288 and 388 of the motors 154 and 156, respectively, are held in a dynamically braked or stationary condition by the windings of the motors 154 and 156 energized in phase.

The operation of the column motor 154 under the control of the switches 2502, 2504 and 2506 and in response to the column cam switch 160 and the signals CS, CR, SC and RC (column) is essentially the same as the following description of the operation of the row motor 156.

To cause a forward step or advancement of the output shaft 388 of the motor 156, the signal RS is generated by the circuit 2300. The signal RS, through the cam switch 162 places the switch 2508 in its nonconductive state to cause the windings of the motor 156 to be energized in a first one of two possible out-of-phase conditions to cause the motor 156 to advance the output shaft 388 in a forward direction.

The rotatable portion 400 of the switch arm 402 of the cam switch 162 disengages from one of the slots 398 to open the switch 162 and to thereby prevent the switch 2508 from being returned to its conductive state until the rotatable portion 400 is received in the oppositely disposed one of the pair of slots 398 after a 180 degree rotation of the row drive disc 386. When this occurs, the cam switch 162 is returned to its normally-closed condition to switch the switch 2508 to its conductive state to thereby cause the windings of the row motor 156 to be energized in phase. Thus, the motor 156 is returned to a dynamically braked condition in which the output shaft 388 is maintained stationary. The switch 2502 is subsequently returned to its nonconductive state by the absence or termination of the signal SC to deenergize the windings of the motor 156.

Figure 39:
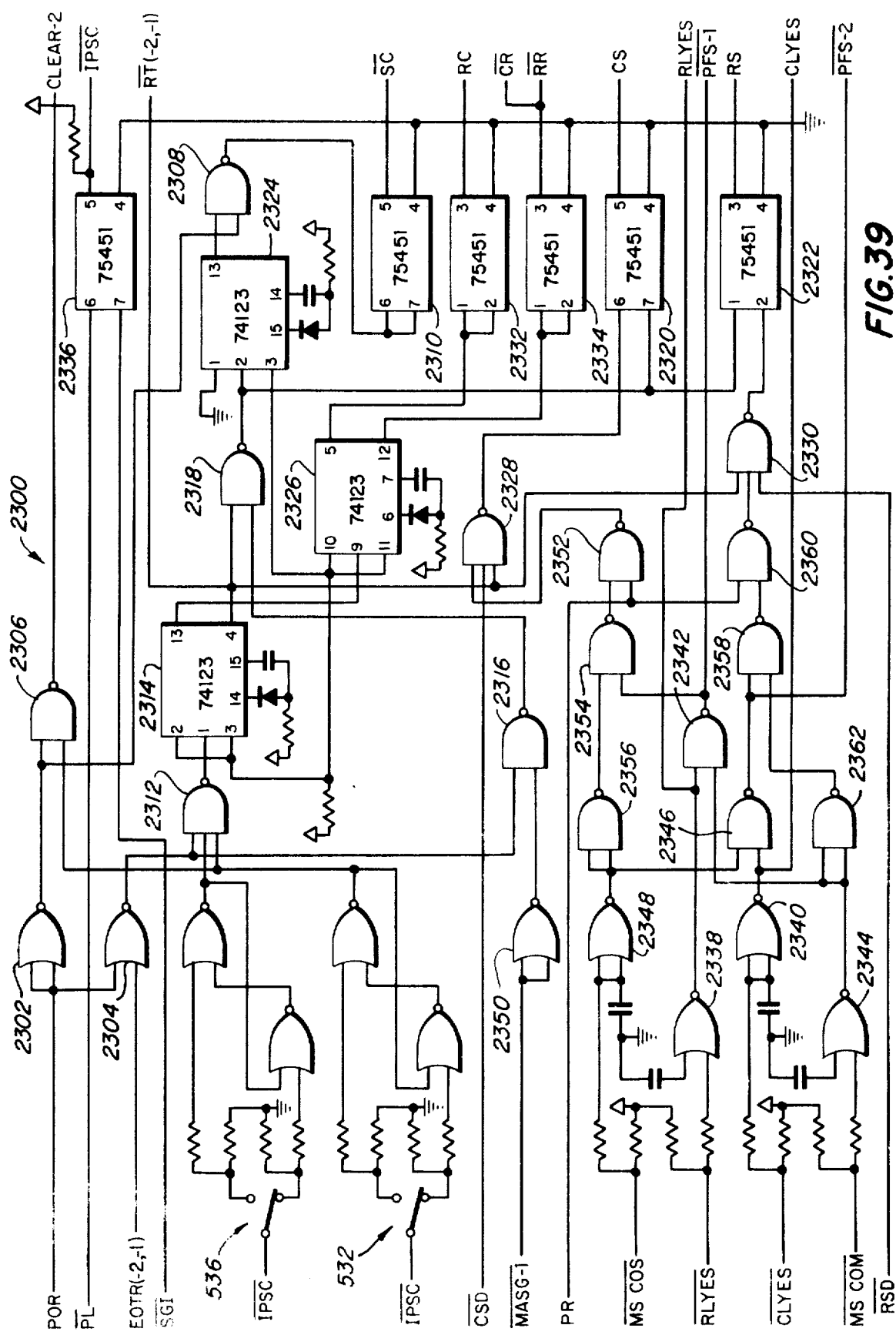

In accordance with an important feature of the present invention, the column slide 134 and the row slide 150 are positioned in their initial or home position by the novel reset operation described above. With reference to the circuit 2500 and, more specifically, to the novel reset operation of the row slide 150 by both the row motor 156 and the row slide return bias assembly 168, the reset operation is initiated by the simultaneous presence of the signals RS and SC from the circuit 2300 (FIG. 39). The signals RS and SC through the row cam switch 162 place the switch 2508 in its nonconductive state. As described above, the output shaft 388 of the row motor 156 is thereby rotated in a forward direction for approximately 150 ms. or 30 degrees.

After this initial forward movement of the output shaft 388, the signal RR from the circuit 2300 is generated and presented to the input of the switch 2508 to return the switch 2508 to its conductive state. Simultaneously, the signal RC (ROW) is presented to the switch 2510 to place the switch 2510 in its nonconductive state. In this manner, the windings of the row motor 156 are energized in a second, opposite, out-of-phase relationship to cause the output shaft 388 of the row motor 156 to rotate in a reverse direction for approximately 200 ms. or 40 degrees. As fully described above, this reverse rotation of the output shaft 388 causes the complete disengagement of the row drive pins 380 from the row rack 382 to enable the row slide 150 to be returned to its initial or home position by the return force of the row slide return bias assembly 168.

After the above reverse rotation, the signals RR and RC (ROW) are terminated causing the switch 2510 to return to its conductive state and the switch 2508 to be switches to its nonconductive state since the row cam switch 162 is in its open condition. Thus, once again the windings of the motor 156 are energized in a first out-of-phase relationship to cause the motor 156 to rotate the output shaft 388 in a forward direction.

This final forward movement of the output shaft 388 terminates when the cam switch 162 is returned to its normally-closed condition by the receipt of the rotatable portion 400 of the switch arm 402 of the cam switch 162 in one of the slots 398. The return of the cam switch 162 to its normally-closed condition places the switch 2508 in its conductive state to return the row motor 156 to its dynamically braked condition in which the output shaft 388 is maintained in a stationary condition. Subsequently, the signal SC is terminated to deenergize the windings of the row motor 156.

The initiation and control of the printing or reproduction portion of the operation of the machine 50 are achieved by the control signals presented to the transport motor control circuit 2500 (FIG. 40) are generated by the transport controller I circuit 2100 (FIG. 37), the transport controller II circuit 2200 (FIG. 38), the manual/auto/reset (row) circuit 2300 (FIG. 39) and the manual/auto/reset (column) circuit 2400.

Since the above circuits are very closely interrelated in controlling the operation of the printing or reproduction assembly 54 and of the transport assembly 64, they are discussed together hereinafter. Further, since the circuit 2400 is equivalent to the circuit 2300, only the circuit 2300 is discussed hereinafter in detail.

Placing the main power switch 502 (FIG. 36) in its "on" position energizes the machine 50 and initiates the operation of a power-on reset circuit 2202. The signal POR is generated through a positive feedback circuit composed of a pair of NOR gates 2204 and 2206; and the signal POR is generated through a NOT gate 2208. The signals POR and POR are used to preset the various counters and control registers of the circuit 1000 and the various control registers of the printing or reproduction assembly 54, (for example, the control registers set forth in FIG. 5 of the above-mentioned U.S. Pat. No. 3,655,282) in an initial condition.

The signal KBI is also generated by the circuit 2200 through a pair of NOR gates 2210 and 2212 to inhibit the entry of a copy program into the circuits 1200, 1300 and 1400 during the power-on reset operation of the circuit 2202. The signal KBI is also generated when the signals PL and PL are present upon the initiation of the automatic printing or reproduction portion of the operation of the machine 50. The signal KBI prevents the entering of a copy program into the circuits 1200, 1300 and 1400.

The NOR gate 2204, enabled during the power-on reset operation of the circuit 2202, further inhibits a NOR gate 2214 to place a control register 2216 formed by a pair of cross-coupled NAND gates 2218 and 2220 in a first state wherein the NAND gate 2218 is enabled.

The enabled NAND gate 2218 enables an AND gate 2222 which controls the energization of the lamp used to illuminate the stop print switch 508. When the AND gate 2222 is enabled, the signal PSL is absent; and, thus, the lamp is deenergized. When the AND gate 2222 is inhibited, the signal PSL is generated, resulting in the energization of the lamp used to illuminate the stop print switch 508.

The enabled NOR gate 2204 further inhibits a NOR gate 2224 during the power-on reset operation of the circuit 2202 to enable a NAND gate 2226 for placing a control register 2228, formed by a pair of cross-coupled NOR gates 2230 and 2232, in a first or initial state in which the NOR gate 2232 is inhibited and the NOR gate 2230 is enabled. The inhibited NOR gate 2232 enables a NAND gate 2234 to prevent the occurrence of the signal PL and to place one of the two input leads of an AND gate 2236 in an enabled condition. The enabled NOR gate 2230 inhibits a NAND gate 2238 to prevent the occurrence of the signal PL. The inhibited NAND gate 2238 further inhibits one of the input leads to a NOR gate 2240 placing the NOR gate 2240 in a partially enabled state. Thus, a subsequent depression of the strobe button 516 results in the enabling of the NOR gate 2240.

The signal POR further inhibits a pair of NOR gates 2302 and 2304 to enable a NAND gate 2306 for generating the signal CLEAR-2. The signal CLEAR-2 presets the circuits 1700, 1800 and 1900 to cause the indicators 528 and 530 to both display the numeral 01 and to subsequently cause the column slide 134 and the row slide 150 to be preset or initially set in their home position. The inhibited NOR gate 2302 further enables a NAND gate 2308 to enable an AND gate 2310 to prevent the presence or generation of the signal SC during the power-on reset operation of the circuit 2202.

The inhibited NOR gate 2304 further enables a NAND gate 2312 to thereby enable a data or clock input lead to a 150 ms. retriggerable monostable multivibrator 2314. The multivibrator 2314 is triggered when that clock input lead is inhibited upon the expiration of the power-on reset operation of the circuit 2202 to initiate the novel reset operations of the column slide 134 and of the row slide 150, as described above.

The inhibited NOR gate 2304 further enables a NAND gate 2316 to inhibit a NAND gate 2318. The inhibited NAND gate 2318 inhibits a pair of AND gates 2320 and 2322 to prevent the generation of the signals CS and RS, respectively. The inhibited NAND gate 2318 further inhibits the clock or data input lead to a 1000 ms. retriggerable multivibrator 2324. The multivibrator 2324 is triggered when the same clock input lead is enabled subsequent to the expiration of the power-on reset operation of the circuit 2202.

Since the circuit 2202 is essentially a ramp generator, the power-on reset operation of the circuit 2202 is terminated or expires when the input voltage to the NOR gate 2204 exceeds the threshold level of the NOR gate 2204. When its threshold level is exceeded, the NOR gate 2204 is inhibited to enable the NOR gate 2206 and to inhibit the NOT gate 2208 to thereby remove the signals POR and POR. Further, the NOR gate 2210 is enabled to inhibit the NOR gate 2212 to remove the signal KBI. The absence of the signal KBI enables the operator to subsequently enter a copy program into the circuits 1100, 1200, 1300, 1400, 1500 and 1600 for display by the indicators 518 and 522.

The absence of the signal POR enables the NOR gate 2302 to inhibit the NAND gate 2306 and to thereby remove the signal CLEAR-2. Further, the NOR gate 2304 is enabled to inhibit the NAND gate 2312 and to thereby trigger the multivibrator 2314. The novel reset operations of the column slide 134 and of the row slide 150 are thus initiated.

The leading edge of the positive output pulse from the multivibrator 2314 enables the data or clock input lead to a 200 ms. retriggerable monostable multivibrator 2326. The multivibrator 2326 is thus triggered upon the receipt of the trailing edge of the position output pulse from the multivibrator 2314.

The low active output pulse from the multivibrator 2314 enables the NAND gate 2318 to both trigger the multivibrator 2324 and to enable the AND gates 2320 and 2322 to thereby generate the signals CS and RS, respectively. A pair of NAND gates 2328 and 2330 are simultaneously enabled by the low active output pulse from the multivibrator 2314 to partially enable the AND gates 2320 and 2322. The AND gates 2320 and 2322 are enabled by the enabled NAND gate 2318. The positive output pulse from the multivibrator 2324 inhibits the NAND gate 2308 to thereby inhibit the AND gate 2310 to generate the signal SC. In this manner, the initial forward rotations of the column motor 154 and of the row motor 156 during the initial portion of the novel reset operations of the column slide and of the row slide 150 are achieved, as described above.

Upon the receipt of the trailing edge of the positive output pulse from the multivibrator 2314, the multivibrator 2326 is triggered. The leading edge of the positive output pulse from the multivibrator 2326 enables an AND gate 2332 to generate the signal RC (ROW, COL.). The leading edge of the low active output pulse from the multivibrator 2326 inhibits an AND gate 2334 to generate the signals CR and RR. The signals CR, RR, RC (ROW, COL.) together with the signal SC cause and control the reverse rotations of the column motor 154 and of the row motor 156 during the above-mentioned novel reset operations of the column slide 134 and of the row slide 150.

Upon the completion of the output pulses of the multivibrator 2326, the AND gate 2332 is inhibited and the AND gate 2334 is enabled to remove the above-mentioned signals. Since at the completion of this second portion of the novel reset operations of the column slide 134 and of the row slide 150, the row cam switch 162 and column cam switch 160 are in their opened conditions, the switches 2506 and 2508 (FIG. 40) are held in a nonconductive state to enable the third portion of the novel reset operations of the column slide 134 and of the row slide 150, that is, the final forward rotations of the column motor 154 and of the row motor 156.

The reset operations of the column slide 134 and of the row slide 150 are completed when the cam switches 160 and 162 are returned to their normally-closed conditions, as described above. In this manner, the column slide 134 and the row slide 150 are preset or reset in their initial or home position.

In addition to the signal POR, a depression of either the clear switch 532 or the carriage reset switch 536 or the presence of the signal EOTR(-2,-1) also initiate the novel reset operation of either one or both the column slide 134 or the row slide 150. The operation of the switches 532 and 534 is inhibited by the presence of the signal IPSC generated by the presence of either the signal PL or of the signal SGI, either one of which inhibits an AND gate 2336 to generate the signal IPSC. The signal PL is generated by the circuit 2200 subsequent to the depression of the print start switch 504 and, thus, indicates that the machine 50 is operating in its automatic printing or reproduction mode. The signal SGI is generated by the low active output pulse of a 2000 ms. retriggerable monostable multivibrator 2102, triggered in response to the presence of the leading edge of a signal TLR on the data or clock input lead to the multivibrator 2102. The signal TLR is generated when a NAND gate 2242 is enabled in response to the presence of either one or both of the signals RT-1 or RT-2. The signals RT-1 and RT-2 are generated by the low active output pulse of the multivibrator 2314, at the initiation of the novel reset operations of the column slide 134 and of the row slide 150, respectively. Thus, the switches 532 and 536 are inhibited during the automatic printing or reproduction portion of the operation of the machine 50 or during the reset operation of either one or both the column slide 134 or the row slide 150. The depression of the clear switch 532 also enables the NAND gate 2306 to generate the signal CLEAR-2 for resetting both the indicators 528 and 530 to the numeral 01.

The signal EOTR(-2,-1) initiates the novel reset operation of either the row slide 150 or the column slide 134 as indicated above. The signals EOTR-2 and EOTR-1 are generated by the circuit 2200 when a NAND gate 2246 is enabled and when a NAND gate 2244 is enabled, respectively. The NAND gates 2244 and 2246 are both enabled when a NOT gate 2248 is inhibited in response to the presence of the signal EOFR generated by the circuit 2100.

The signal EOFR is generated when a NOR gate 2104 is enabled in response to the simultaneous inhibiting of both a NOR gate 2106 and a NAND gate 2110 are simultaneously both inhibited. The NOR gate 2106 is inhibited during the presence of the signal FG, as described above. The NAND gate 2110 is inhibited if either one or both of the two signals EOFC and EOFC-2 are present. The signal EOFC is generated by the circuit 1400 (FIG. 32) and is present when the counters 1414, 1416 and 1418 have decremented to zero. The signal EOFC-2 is generated by the circuit 2200 when all three of the signals FPE, CL YES, and RL YES are simultaneously present to inhibit a NAND gate 2250. The signal RL YES is present when a NOR gate 2338 is enabled in response to the presence of the signal RL YES. The signal RL YES is generated by the circuit 2500 (FIG. 40) upon the closure of the row slide limit switch 166 indicating that the row slide 150 has positioned the last frame or micro-image in a row of a microfiche 190 in the illumination path 92. Similarly, the signal CL YES is present when a NOR gate 2340 is enabled in response to the presence of the signal CL YES. The signal CL YES is generated by the circuit 2500 (FIG. 40) upon the closure of the column slide limit switch 164 indicating that the column slide 134 has positioned the last frame or micro-image in a column of a microfiche 190 in the illumination path 92.

The signal FPE is generated in response to the depression of the strobe button 516 used to enter the desired number of consecutive frames or micro-images to be printed or reproduced into the machine 50. The depression of the switch 516 prior to the initiation of the printing or reproduction portion of the operation of the machine 50 enables the NOR gate 2240 to set a control register 2252, formed by a pair of cross-coupled NOR gates 2254 and 2256, into a first state in which the NOR gate 2254 is inhibited and the NOR gate 2256 is enabled. The enabled NOR gate 2256 generates the signal FPE and causes the NAND gate 2250 to be inhibited by the simultaneous presence of the signals RL YES and CL YES to generate the signal EOFC-2. The presence of either one or both of the signals EOFC or EOFC-2 thus enables the NAND gate 2108 to inhibit the NAND gate 2110 to thereby enable the NOR gate 2014 to generate the signal EOFR in response to the presence of the signal FG.

Thus, in this manner, the signals EOTR-1 and EOTR-2 are both generated to initiate the novel reset operations of the column slide 134 and of the row slide 150, respectively, when the last frame of the programmed number of consecutive frames or when the last frame or micro-image on a microfiche 190 is exposed by the exposure lamp 80.

Thus, in accordance with an important feature of the present invention, the machine 50 is controlled to reproduce all of the remaining frames or micro-images on a microfiche 190 starting with the first programmed frame without the requirement that the operator know and enter that exact number of the remaining frames or micro-images on the microfiche 190 into the machine 50. The operator is required to merely program into the machine 50, via the keyboard encoder 512 and the strobe button 516, a number greater than the number of remaining frames or micro-images on a microfiche 190. Thus, for example, if a microfiche 190 contains 108 frames or micro-images, the operator is merely required to enter the desired first programmed frame, the number of desired prints/frame and a number greater than 108 into the machine 50 for the desired number of consecutive frames in order to ensure that the desired number of prints per frame of all of the remaining frames or micro-images on the microfiche 190 are automatically reproduced by the machine 50. After the exposure of the last frame or micro-image on the microfiche 190, the column slide 134 and the row slide 150 are automatically reset by the simultaneous presence of all of the signals FPE, CL YES and RL YES, as described above.

The signal EOTR-2 is also generated when a NAND gate 2258 is inhibited in response to the simultaneous presence of the signals MASG-1 and EOFC-2 or to the simultaneous presence of the signals MASG-1 and PFSG-1. The signal MASG-1 is generated by the low active output pulse of a 100 ms. retriggerable monostable multivibrator 2112 to initiate a stepping operation of either the column slide 134 or the row slide 150. As discussed above, a 200 ms. time delay is provided between successive signals MASG-1 by the multivibrator 2102 during the reset operation of the column slide 134 or of the row slide 150. This time delay is achieved by the low active output pulse of the multivibrator 2102 that enables a NAND gate 2114 to prevent the triggering of the multivibrator 2112. The NAND gate 2114 is also enabled by the low active output pulse from a 500 ms. retriggerable monostable multivibrator 2116, that is triggered by the trailing edge of the positive output pulse from the multivibrator 2112 to provide at least a 500 ms. delay between successive forward advancements of the column slide 134 and of the row slide 150.

The multivibrator 2112 is normally triggered to generate the signal MASG-1 each time a NAND gate 2118 changes from an inhibited state to an enabled state. The NAND gate 2118 is partially inhibited when the signal PR is present, indicating that the column slide 134 and the row slide 150 have positioned the first programmed frame in the illumination path 92. An enabled NAND gate 2120, indicating both that the frame advance switch 534 is in a nondepressed condition and that the signal PR is present, also partially inhibits the NAND gate 2118. The NAND gate 2120 is inhibited or enabled by the state of a control register 2122 formed by a pair of cross-coupled NOR gates 2124 and 2126. The control register 2122 is set in a first state in which the NOR gate 2124 is inhibited and the NOR gate 2126 is enabled by a depression of the frame advance switch 534. In its first state, the control register 2122, when the signal PR is present, inhibits the NAND gate 2120 to enable the NAND gate 2118 to trigger the multivibrator 2112, causing a forward step or advancement of the column slide 134 or of the row slide 150 in accordance with the preset pagination of the microfiche 190. The control register 2122 is placed in a second state by the leading edge of the positive output pulse from the multivibrator 2116 which inhibits the NOR gate 2126 and enables the NOR gate 2124. Thus, the NAND gate 2120 is enabled to partially inhibit the NAND gate 2118.

Finally, the NAND gate 2118 is fully inhibited, to cause the multivibrator 2112 to be triggered when the NAND gate 2118 is subsequently enabled, when a NAND gate 2128 is enabled in response to either the absence of the signal FPE or the absence of the signal FG, as described above. In the absence of the signal FG, the NOR gate 2106 is enabled to inhibit a NAND gate 2130 to thereby enable the NAND gate 2128. The signal FPE is generated by the circuit 2200 when the strobe button 516 is depressed to enter a desired number of consecutive frames into the machine 50. The depression of the strobe button 516 prior to the depression of the print switch 504 enables the NOR gate 2240 to place the control register 2252 in its second stage to enable the NOR gate 2256 and to thereby generate the signal FPE. The presence of the signal FPE and the subsequent presence of the signal FG inhibit the NAND gate 2128 to enable the NAND gate 2118 to thereby trigger the multivibrator 2112, generating the signal MASG-1.

The NAND gate 2118 is also changed from an inhibited state to an enabled state to trigger the multivibrator 2112 and to thereby generate the signal MASG-1 in the absence of the signal PR subsequent to the entering of the first programmed frame into the machine 50 by the operator. The trailing edge of the positive output pulse from the multivibrator 2112 triggers the multivibrator 2116. The positive output pulse from the multivibrator 2116 resets the control register 2122 to its second state to enable the advance switch 534 to trigger the multivibrator 2112 upon a subsequent depression of the switch 534. The low active output pulse of the multivibrator 2116 enables the NAND gate 2114 to enable one of the clock input leads of the multivibrator 2112. The trailing edge of the low active output pulse of the multivibrator 2116 inhibits the NAND gate 2114 to retrigger the multivibrator 2112 and to thereby generate another signal MASG-1.

The multivibrator 2112 continues to be retriggered in this manner until the column slide 134 and the row slide 150 have positioned the first programmed frame in the illumination path 92. When this occurs, the signals CCE and RCE are present and thereby generate the signal PR to inhibit the NAND gate 2118 and to thereby prevent the multivibrator 2112 from being retriggered by the trailing edge of the low active output pulse of the multivibrator 2116.

As indicated above, the NAND gate 2118 is also enabled and the multivibrator 2112 thereby triggered by a depression of the frame advance switch 534. Since the control register 2122 is reset by the leading edge of the positive output pulse from the multivibrator 2116, the multivibrator 2112 is not retriggered by the trailing portion of the low active output pulse from the multivibrator 2116.

The presence of the signal MASG-1 partially inhibits the NAND gate 2258 through a NOT gate 2260. The NAND gate 2258 becomes fully inhibited to enable the NAND gate 2246 and to thereby generate the signal EOTR-2 when a NAND gate 2262 is enabled. The NAND gate 2262 is enabled in response to the presence of a signal PFSG-1 generated by the circuit 2100 or in response to the presence of the signal EOFC-2, as described above. The signal PFSG-1 is generated when a NAND gate 2132 is inhibited in response to the simultaneous presence of the signal PR and a high output pulse from an enabled NAND gate 2134, enabled by the presence of the signal PFS-1. The signal PFS-1 is generated by the circuit 2300 when a NAND gate 2342 is inhibited in response to the simultaneous presence of the signals MS COM and RL YES. The presence of the signal MS COM enables a NOR gate 2344 and the presence of this signal RL YES enables the NOR gate 2338 to thereby inhibit the NAND gate 2342 and to thereby generate the signal PFS-1. Thus, the signal PFS-1 is generated when the transport assembly 64 is stepping in the row direction and when the row slide 150 has presented or positioned the last frame or micro-image in a row or a microfiche 190 in the illumination path 92. In this manner, the signal EOTR-2 is generated to initiate the novel reset operation of the row slide 150.

Finally, the signal EOTR-2 may be generated by the inhibiting of a NAND gate 2264 in response to the simultaneous presence of a signal RSD and RL YES. The signal RSD is inverted by the NOT gate 2266 to inhibit the NAND gate 2264 when the last frame or micro-image on a microfiche 190 is positioned in the illumination path 92 by the row slide 150. The signal RSD is generated by the circuit 2100 by the inhibiting of the NAND gate 2136 in response to the absence of the signal RCE and to the simultaneous presence of the positive output pulse of the multivibrator 2112. Thus, as illustrated in the circuit 2300, the presence of the signal RSD enables the NAND gate 2330 to enable the AND gate 2322 to generate the signal RS. The row slide 150 is thus reset by the signal EOTR-2 if the number entered into the machine 50 corresponding to the row location of the desired first programmed frame is greater than the number of frames or micro-images disposed along a row of a microfiche 190.

The signal EOTR-1 is generated to cause the novel reset operation of the column slide 134 is essentially the same manner as described above with reference to the generation of the signal EOTR-2 for resetting the row slide 150. The signal EOTR-1 may be generated by the enabled NAND gate 2244 in response to the presence of the signal EOFR.

Further, the NAND gate 2244 is enabled with a NAND gate 2267 is inhibited in response to the simultaneous presence of the signals CL YES and CSD. The signal CSD is generated when a NAND gate 2138 is inhibited in response to the absence of the signal CCE and to the simultaneous presence of the positive output pulse from the multivibrator 2112. Thus, the column slide 134 is reset when the number entered into the machine 50 corresponding to the column location of the desired first programmed frame exceeds the number of frames of micro-images disposed along a column of a microfiche 190.

Finally, the NAND gate 2244 is enabled in response to the inhibiting of a NAND gate 2268. The NAND gate 2268 is inhibited in response to the presence of the signal MASG-1 and to the enabling of a NAND gate 2270. The NAND gate 2270 is enabled in response to the presence of either one or both of the signals EOFC-2 or PFSG-2. The signal EOFC-2 is generated by the inhibiting of the NAND gate 2250, as fully described above. The signal PFSG-2 is generated by the circuit 2100 when a NAND gate 2140 is inhibited in response to the simultaneous presence of the signals PR and PFS-2. The signal PFS-2 enables a NAND gate 2142 to inhibit to NAND gate 2140 in the presence of the signal PR.

The signal PFS-2 is generated by the circuit 2300 in response to the inhibiting of a NAND gate 2346. The NAND gate 2346 is inhibited in response to the simultaneous presence of the signals CL YES and MS COS. The presence of the signal MS COS enables a NOR gate 2348 which, along with the enabled NOR gate 2340 inhibits the NAND gate 2346 to generate the signal PFS-2. Thus, the signal PSF-2 is generated when the machine 50 is displaying or reproducing a microfiche 190 having micro-images disposed thereon in accordance with a COSATI pagination and when the column slide 134 has positioned the last frame or micro-image in a column of a microfiche 190 in the illumination path 92. Thus, the signal EOTR-1 is generated to reset to the column slide 134 when the last frame or micro-image disposed in a column of a microfiche 190 is exposed by the exposure lamp 80. In this manner, the NAND gate 2244 may be enabled to generate the signal EOTR-1 that initiates the novel reset operation of the column slide 134.

The novel reset operations of the column slide 134 and of the row slide 150 are fully discussed above. The forward stepwise advancement of the column slide 134 is identical to the forward stepwise advancement of the row slide 150; is discussed in detail hereinafter. If a reset operation of the row slide 150 is in progress, the signal RT-2 is generated to generate the signal TLR. The leading edge of the signal TLR triggers the 2000 ms. multivibrator 2102 to thereby inhibit the multivibrator 2112 for a period of time sufficient to enable the row slide 150 to be reset. The low active output pulse from the multivibrator 2102 generates the signal SGI to inhibit the AND gate 2336 and to thereby generate the signal IPSC. The signal IPSC inactivates the clear switch 532 and the reset switch 536. The trailing edge of the output pulse from the multivibrator 2102 removes thge inhibit from the multivibrator 2112. The row slide 150 may then be advanced subsequent to the initial power-on reset operation of the circuit 2202 by a depression of the row switch 526.

A depression of the switch 526 increments the row step storage or memory register 1708 to thereby remove the signals RCE and RCE. The absence of the signal RCE inhibits the NOR gate 2144 to terminate the signal PR. The absence of the signal PR enables the NAND gate 2118 to trigger the multivibrator 2112 generating the signal MASG-1. The positive output pulse from the multivibrator 2112 enables the NAND gate 2136 since the signal RCE is absent to generate the signal RSD. The signal MASG-1 enables a NOR gate 2350 to inhibit the NAND gate 2316 to enable the NAND gate 2318 and to thereby trigger the multivibrator 2324. The triggered multivibrator 2324 inhibits the NAND gate 2308 to inhibit the AND gate 2310 and to thereby generate the signal SC. The signal RSD enables the NAND gate 2330 which together with the enabled NAND gate 2318 enables the AND gate 2322 to generate the signal RS. The signal RS and the signal SC enable one forward step or advancement of the row slide 150, as discussed above with respect to the circuit 2500 (FIG. 40). The signal RSD further increments to the row step counter 1708.

The coincidence circuit 1728 compares the counted steps as stored in the counter 1708 with the desired row location as entered into the register 1702. If these numbers are equal, the signal RCE is generated to enable the NOR gate 2142 and to thereby generate the signal PR. The presence of the signal PR prevents the retriggering of the monostable multivibrator 2112 by the trailing edge of the low active output pulse from the multivibrator 2116. If the signal RCE is not generated, the NOR gate 2114 is inhibited to prevent the generation of the signal PR. In the absence of the signal PR, the NAND gate 2118 is enabled to allow the multivibrator 2112 to be retriggered by the trailing edge of the low active output pulse from the multivibrator 2116. In this manner, the row slide 150 is continuously advanced in a forward stepwise manner until the signals RCE and RCE are generated by the coincidence circuit 1728.

Depending on the pagination of the microfiche 190, either the row slide 150 or the column slide 134 is advanced one forward step by a depression of the frame advance switch 534 in the absence of the signal IPSC-2. The depression of the switch 534 enables the NAND gate 2118, as described above, to trigger the multivibrator 2118. Since the control register 2112 is reset by the leading edge of the positive output pulse from the multivibrator 2116, the multivibrator 2112 is not retriggered by the trailing edge of the low active output pulse of the multivibrator 2116.

Depending on the pagination of the microfiche 190, either the column slide 134 or the row slide 150 is advanced one forward step by the presence of the signals FPE and FG during the automatic printing or reproduction portion of the operation of the machine 50. The particular slide 134 of 150 that is advanced depends on the state of the switches 152, 164 and 166 (FIG. 40).

When the mode switch 152 is placed in the COL. or COSATI position, the signal MS COS is generated by the circuit 2500 and enables the column motor 154 and the row motor 156 to advance the column slide 134 and the row slide 150, respectively, one step in the forward direction under the following conditions. If the signal MS COS is present, the signal CS is generated to cause a forward stepwise advancement of the column slide 134, assuming that the signals RT-1 and CSD are absent, when a NAND gate 2352 is inhibited in response to a NAND gate 2354 being enabled. The signal MS COS enables the NOR gate 2348 to thereby inhibit a NAND gate 2356. The inhibited NAND gate 2356 enables the NAND gate 2354 to inhibit the NAND gate 2352 to enable the NAND gate 2328 to enable the AND gate 2328 to enable the AND gate 2320 to generate the signal CS when the NAND gate 2318 is enabled in response to the presence of the signal MASG-1. Thus, the signals CS and SC are generated and presented to the circuit 2500 (FIG. 40) to cause the column motor 154 to advance the column slide 134 one step in the forward direction.

When the signal MS COS is present, the signal RS is generated to cause the row slide 150 to advance one step in the forward direction, assuming that the signals RT-2 and RSD are absent, when the signal CL YES is also present. The presence of the signal CL YES occurs when the column slide limit switch 164 is activated by the last frame or micro-image in a column of a microfiche 190 being positioned in the illumination path 92 by the column slide 134. When the signal CL YES is present, the NOR gate 2340 is enabled to inhibit the NAND gate 2346 to enable a NAND gate 2358. The enabled NAND gate 2358 inhibits a NAND gate 2360 to thereby enable the NAND gate 2330 to enable the NAND gate 2322 to generate the signal RS when the NAND gate 2318 is enabled in response to the presence of the signal MASG-1. In this manner, the signals SC and RS are generated and presented to the circuit 2500 (FIG. 40) to cause the row motor 156 to advance the row slide 150 one step in the forward direction.

When the mode switch 152 is placed in the ROW or COM position, the signal MS COM is generated by the circuit 2500 and enables the column motor 154 and the row motor 156 to advance the column slide 134 and the row slide 150, respectively, one step in the forward direction under the following conditions. Assuming that the signals RT-2 and RSD are absent, the row slide 150 is advanced one step in the forward direction by the absence of the signal RL YES and by the simultaneous presence of the signal MASG-1. The signal RL YES is absent when the row slide limit switch 166 is in its normally-open condition. The absence of the signal RL YES inhibits the NOR gate 2338 to enable the NAND gate 2342. The absence of the signal RL YES prevents the signal RT-2 from being generated and thus enables the generation of the signal RS as follows.

The presence of the signal MS COM enables the NOR gate 2344 to inhibit a NAND gate 2362 to enable the NAND gate 2358 to inhibit the NAND gate 2360 to thereby enable the NAND gate 2330. The enabled NAND gate 2330 enables the AND gate 2322 when the NAND gate 2318 is enabled in response to the presence of the signal MASG-1. The enabled AND gate 2322 generates the signal RS which is directed to the circuit 2500 along with the signal SC to cause the row motor 156 to advance the row slide 150 one step in the forward direction.

The simultaneous presence of the signals RL YES and MS COM indicates that the row slide 150 has positioned the last frame or micro-image along a row of a microfiche 190 in the illumination path 92. The presence of these two signals inhibits the NAND gate 2342 to generate the signal PFS-1 and to simultaneously enable the NAND gate 2354. The enabled NAND gate 2354 inhibits the NAND gate 2352 to enable the NAND gate 2328 to enable the AND gate 2320 to generate the signal CS when the NAND gate 2318 is enabled in response to the presence of the signal MASG-1. Thus, the column motor 154 is energized to advance the column slide 134 one step in the forward direction.

Simultaneously, the signal PFS-1 enables a NAND gate 2146 to condition a 1000 ms. retriggerable monostable multivibrator 2148 to be triggered by the leading edge of the signal FCD, as discussed hereinafter. The signal PFS-1 further enables the NAND gate 2134 to inhibit the NAND gate 2132 to generate the signal PFSG-1. As described above, the signal PFSG-1 generates the signal EOTR-2 when the signal MASG-1 is present to cause the novel reset operation of the row slide 150.

Similarly, when the signal MS COS is present and the column slide 134 has positioned the last frame or microimage along a column of a microfiche 190 in the illumination path 92, the signal CL YES is generated to enable the NOR gates 2340 and 2348 to inhibit the NAND gate 2346 to simultaneously enable the NAND gate 2358 and generate the signal PFS-2. The enabled NAND gate 2358 inhibits the NAND gate 2360 to enable the NAND gate 2330 to enable the AND gate 2322 to generate the signal RS when the NAND gate 2318 is enabled in response to the signal MASG-1. Thus, the signals RS and SC are generated and presented to the circuit 2500 to cause the row motor 156 to advance the row slide 150 one step in the forward direction.

Simultaneously, the presence of the signal PFS-2 enables the NAND gates 2142 and 2146 to condition the multivibrator 2148 to be triggered by the leading edge of the signal FCD, as described hereinafter, and to inhibit the NAND gate 2140 to generate the signal PFSG-2. The signal PFSG-2 enables the NAND gate 2270 to inhibit the NAND gate 2268 when the signal MASG-1 is present. The inhibited NAND gate 2268 enables the NAND gate 2244 to generate the signal EOTR-1 to initiate the novel reset operation of the column slide 134.

In accordance with an important feature of the present invention, the automatic printing or reproduction portion of the operation of the machine 50 is initiated by the depression of the print switch 504 when the signal PE, generated by the circuit 2600 (FIG. 41), is present.

The circuit 2600 includes a viewer control knob 2601 for selectively, alternately energizing either a print enable relay 2602 or a viewing lamp energization relay 2604. When the control knob 540 and the switch 2601 are placed in their on positions, the relay 2604 is energized to close a normally-open relay contact (not illustrated) for completing an energizing circuit to the viewing lamp 76 to enable an image of a frame or micro-image on a microfiche 190 to be projected to the display or viewing screen 52. When the control knob 540 and the switch 2601 are placed in the off positions, the relay 2604 is deenergized and the relay 2602 is energized to close a normally-open relay contact 2602A to thereby generate the signal PE. Simultaneously, the normally-open relay contact in the viewing lamp energization circuit is returned to its normally-open condition to deenergize the viewing lamp 76.

When the signal PE is present, a depression of the print switch 504 enables a NOR gate 2272 to inhibit the NOR gate 2214 and to inhibit the NOR gate 2230 causing the control register 2228 to change state. If the control register 2216 is in its preset condition, the inhibited NOR gate 2214 has no effect on the control register 2216. Thus, the signal PSL is absent.

The inhibited NOR gate 2230 enables the NAND gate 2238 to generate the signal PL. The enabled NAND gate 2238 further inhibits the NOR gate 2210 to enable the NOR gate 2212 to generate the signal KBI for preventing the entry of an alternate copy program into the circuits 1200, 1300 and 1400, as described above. If the signal PLR is absent and the signal PE is present, a NOR gate 2274 and the NOR gate 2224 are enabled to inhibit the NAND gate 2226 to prevent the change of state of the control register 2228. Thus, the signal PL is generated by the enabled NAND gate 2238 and the signal PL is generated by the inhibited NAND gate 2234.

Preferably, the print switch 504 is illuminated by a lamp (not illustrated) during the automatic printing or reproduction portion of the operation of the machine 50. An energization circuit for illuminating the lamp for the switch 504 may be controlled by the presence or the absence of the signal PL. When the signal PL is present, the energization circuit is completed or closed to energize the lamp and to thereby illuminate the print switch 504. When the signal PL is terminated or absent, the energization circuit is interrupted or opened to de-energize the print switch lamp.

If the print switch 504 and the stop print switch 508 are simultaneously depressed or if the stop print switch 508 is depressed subsequent to the depression of the print switch 504, the NOR gate 2274 is inhibited to cause the control register 2216 to change state to inhibit the NAND gate 2218. The inhibited NAND gate 2218 inhibits the AND gate 2222 to generate the signal PSL to energize a lamp (not illustrated) for illuminating the stop print switch 508.

Further, the inhibited NOR gate 2274 enables the NAND gate 2226 to cause the control register 2228 to change state, thereby inhibiting the NOR gate 2232 and enabling the NOR gate 2230. The enabled NOR gate 2230 inhibits the NAND gate 2238 to remove the signal PL and to simultaneously enable the NOR gate 2210 to inhibit the NOR gate 2212 to remove the signal KBI. The inhibited NOR gate 2232 further enables the NAND gate 2234 to remove the signal PL and to enable the AND gate 2236 to remove the signal IPSC-2. The signal PLR, generated by the circuit 2100 through an OR gate 2150 in response to the presence of the signal EOCC, enables a NOR gate 2276 to generate the signal PLR and to inhibit the NOR gate 2224. The inhibited NOR gate 2224 enables the NAND gate 2226 to cause the control register 2228 to change state to thereby also remove the signals PL and PL.

In accordance with an important feature of the present invention, the simultaneous presence of the signals PR and PL and the simultaneous absence of the signals PFS-1, PFS-2, EOFC and EOFC-2 inhibits a NAND gate 2152 to thereby inhibit a pair of AND gates 2154 and 2156 to generate the signals PSC and MCE for initiating and maintaining the multiple copying mode of operation of the printing or reproduction assembly 54 of the machine 50. For example, the signal PSC may be directed to an input 260 of a NOR gate G5 illustrated in FIG. 5 of the above-identified U.S. Pat. No. 3,655,282. Further, the signal MCE may be directed to the common inputs of a pair of NOR gates G1 and G2 of FIG. 5 of that Patent. When the circuit of FIG. 5 of that Patent is used to control the printing or reproduction assembly 54 of the machine 50 of the present invention, the print switch 84 and the multiple copy enable switch 412 of FIG. 5 of that Patent are disabled; and the above signals PSC and MCE are substituted therefore to control the operation of the circuit of FIG. 5 of that Patent.

The NAND gate 2152 is enabled to enable the AND gates 2154 and 2156 to terminate or interrupt the two signals PSC and MCE when the signal PR is absent, when the signal PL is absent, or in response to the detection of the leading edge of the low active output pulse from the multivibrator 2148, triggered in response to the leading edge of the signal CS subsequent to the presence of any one or more of the signals PFS-1, PFS-2, EOFC, or EOFC-2.

The signal PFS-1, generated when the signals MS COM and RL YES are simultaneously present, triggers the multivibrator 2148 to temporarily remove the signals PSC and MCE to thereby prevent the feeding of copy material 106 along the copy path of the printing or reproduction assembly 54 of the machine 50 for approximately 1000 ms. This temporary interruption enables the novel reset operation of the row slide 150 to be accomplished without deleteriously affecting the automatic printing or reproduction portion of the machine 50.

Similarly, the signal PFS-2, generated when the signals MS COS and CL YES are both simultaneously present, triggers the multivibrator 2148 to temporarily remove the signals PSC and MCE to thereby enable the novel reset operation of the column slide 134 to occur without deleteriously affecting the automatic printing or reproduction portion of the operation of the machine 50.

The signal EOFC is generated by the coincidence circuit 1422 to indicate that the counters 1414, 1416 and 1418 have decremented to zero. The signal EOFC and the leading edge of the signal FG enable the NOR gate 2104 to generate the signal EOFR. The signal EOFR inhibits a NAND gate 2278 to enable a NOR gate 2280 to thereby generate the signal FRT if the signal FPE is present, as described above. The signal FRT causes the data corresponding to the desired number of consecutive frames or micro-images to be printed or reproduced by the machine 50 stored in the register 1402 to be entered into the counters 1413, 1416 and 1418, thereby resetting the counters 1414, 1416 and 1418 to store that data to display that number in BCD form on their output leads.

The signal EOFR also generates the signals EOTR-1 and EOTR-2, as described above, to initiate the novel reset operations of both the column slide 134 and the row slide 150.

As illustrated by the circuit 2200 (FIG. 38), the simultaneous presence of the signals RL YES and CL YES, indicating that the last frame or micro-image, on a microfiche 190 is positioned in the illumination path 92 by the column slide 134 and the row slide 150, inhibits a NAND gate 2282 to inhibit the AND gate 2236 to thereby generate the signal IPSC-2. As described above, the presence of the signal IPSC-2 inhibits the operation of the column switch 524, the row switch 526 and the frame advance switch 534.

The simultaneous presence of both of the signals RT-1 and RT-2 enables a NOR gate 2284 to generate the signal RTG and simultaneously inhibits a NOT gate 2286 to generate the signal RTG. Thus, the row step counter 1708 and the corresponding column step counter of the circuit 1800 are reset to store the data previously entered into the row storage or memory register 1702 and the corresponding column storage or memory register of the circuit 1800 to thereby enable the column motor 154 and the row motor 156 to advance the column slide 134 and the row slide 150, respectively, to the first programmed frame subsequent to the completion of the novel reset operations of both of the column slide 134 and the row slide 150.

The counters 1414, 1416 and 1418 are decremented by the presence of the signal FCD. The signal FCD is generated by the simultaneous presence of the signal FPE and the signal CG. The absence of the signal FPE enables a NAND gate 2158 to enable or OR gate 2160 to prevent the occurrence of the signal FCD. The absence of the signal FPE further enables the NAND gate 2128 to prevent the triggering of the multivibrator 2112 upon the occurrence of the signal FG. If the signal FPE is present, the NAND gate 2158 is inhibited to permit the OR gate 2160 to be inhibited in response to the presence of the signal CG. The presence of the signal CG inhibits a NOR gate 2162 to inhibit the OR gate 2160 when the signal FPE is present to generate the signal FCD. Further, the NAND gate 2128 is partially inhibited by the presence of the signal FPE to enable the multivibrator 2112 to be triggered upon the occurrence of the signal FG.

Similarly, the signal CCD is generated to decrement the counters 1302 and 1304 in response to the simultaneous presence of the signal CG and any one or both of the signals EOFC or EOFC-2. Further, the signal CCD is generated in response to the absence of the signal FPE and to the simultaneous presence of the signal CG. The absence of the signal FPE enables the NAND gate 2158 to inhibit a NOR gate 2164 to partially enable a NOR gate 2166. The leading edge of the signal CG inhibits the NOR gate 2162 to fully enable the NOR gate 2166 to inhibit a NAND gate 2168 to generate the signal CCD, assuming that the signal EOCC is absent. The presence of the signal EOCC enables the NAND gate 2168 to prevent the signal CCD from being generated.

The presence of either one or both of the signals EOFC or EOFC-2 enables the NAND gate 2108 to inhibit the OR gate 2164 to thereby partially enable the NOR gate 2166. The NOR gate 2166 is fully enabled in response to the detection of the leading edge of the signal CG to thereby generate the signal CCD, as described above.

The presence of the signal EOCC further inhibits the OR gate 2150 to generate the signal PLR. The signal PLR enables the NOR gate 2276 to inhibit the NOR gate 2224 to enable the NAND gate 2226 to cause the control register 2228 to change state and to thereby remove or terminate the signals PL and PL. Thus, the machine 50 is removed from the automatic printing or reproduction portion of its operation.

The signal EOCC further enables a NOR gate 2170 to partially inhibit a NAND gate 2171. The NAND gate 2171 is fully inhibited by the simultaneous presence of the signals EOCC and EOFR. The inhibited NAND gate 2172 enables a NAND gate 2174 to generate the signal IPSR. The signal IPSR resets the row storage or memory register 1702 and the corresponding column storage or memory register of the circuit 1800 to store in BCD form the numeral 01, corresponding to the home position of the column slide 134 and the row slide 150. The signal IPSR further inhibits a NAND gate 2288 to enable a NAND gate 2290 to reset the control register 2252 to thereby terminate the signal FPE.

When the signal EOCC is present, a NOR gate 2176 is partially enabled. The NOR gate 2176 is fully enabled by the inhibited NOR gate 2106 in response to the presence of the signal FG. The enabled NOR gate 2176 conditions a 10 ms. retriggerable monostable multivibrator 2178 for triggering by the trailing edge of the signal FG. Upon the occurrence of the trailing edge of the signal FG, the multivibrator 2178 is triggered to generate the signal CCR for resetting the counters 1302 and 1304 to store the numeral 01 in BCD form and for resetting the register 1402 and the counters 1414, 1416 and 1418 to store the numeral 001 in BCD form.

In accordance with an important feature of the present invention, the machine 50 may perform the automatic printing or reproduction portion of its operation in accordance with several different operational modes. After the machine 50 is energized by the placement of the main power switch 502 in its on position, and subsequent to the power-on reset operation of the circuit 2202, the operator may enter the first programmed frame, as described above. The copy program may then be entered into the machine 50 by means of the keyboard encoder 512. A subsequent depression of the print 504 initiates the automatic printing or reproduction portion of the operation of the machine 50.

If a copy program, consisting of both a desired number of consecutive frames and a desired number of prints per frame, is entered into the machine 50, the machine 50 performs the automatic printing or reproduction portion of its operation in the following manner. When the column slide 134 and the row slide 150 have positioned the first programmed frame in the illumination path 92 of the machine 50, the signal PR is generated. Since the multivibrator 2148 is in a nontriggered state, a depression of the print switch 504 of the operator generates the signals PL and PL to further generate the signals PSC and MCE for initiating and maintaining the automatic printing or reproduction mode of operation of the machine 50.

The presence of each signal CG generates a signal FCD to decrement the counters 1414, 1416 and 1418 until the signal EOFC (or EOFC-2) is generated. The simultaneous presence of the signal EOFC (or EOFC-2) and the signal CG or the absence of the signal FPE and the simultaneous presence of the signal CG generates the signal CCD to decrement the counters 1302 and 1304.

The simultaneous presence of the signal EOFC (or EOFC-2) and the signal FG generates the signal EOFR to generate the two signals EOTR-1 and EOTR-2 that initiate the novel reset operation of both the column slide 134 and the row slide 150. The simultaneous presence of the signals EOFR and FPE generates the signal FRT to reset the counters 1414, 1416 and 1418 to store and display on their output leads in BCD form the desired number of consecutive frames or micro-images to be printed or reproduced by the machine 50, as previously entered into the register 1402.

If a desired first programmed frame has been entered into the machine 50, the presence of the column slide 134 and of the row slide 150 in their home position after their novel reset operations removes the signal PR to inhibit the presence of the signals PSC and MCE and to trigger the multivibrator 2112 for causing the column slide 134 and the row slide 150 to advance to the first programmed frame. When the column slide 134 and the row slide 150 have once again positioned the first programmed frame in the illumination path 92, the signal PR is present to inhibit the further triggering of the multivibrator 2112 and to generate or reinitiate the signals PSC and MCE to reinitiate the automatic printing or reproduction portion of the operation of the machine 50.

The machine 50 continues to reproduce copies in this manner until the counters 1302 and 1304 have been decremented to zero to generate the signals EOCC and EOCC. The presence of the signal EOCC generates the signal PLR to remove the signals PL and PL. The absence of the signal PL removes or terminates the signals PSC and MCE to thereby remove the machine 50 from the automatic printing or reproduction portion of its operation.

Further, the simultaneous presence of the signals EOCC and EOFR generate the signal IPSR. The signal IPSR resets the row storage or memory register 1702 and the row step counter 1708 and the corresponding column storage or memory register and column step counter of the circuit 1800 to store and display in BCD form the numeral 01. The simultaneous presence of the signals EOCc and FG triggers the multivibrator 2178 to generate the signal CCR. The signal CCR resets the storage or memory register 1402 to store the numeral 000 in BCD form, resets the counters 1414, 1416 and 1418 to store and display on their output leads in BCD form the numeral 001 and resets the counters 1302 and 1304 to store and display on their output leads in BCD form the numeral 01. The signal EOCC generates the signal PLR to reset the control register 2228 to remove the signals PL and PL.

After the column slide 134 and the row slide 150 complete their novel reset operations, the signal PR is present with the column slide 134 and the row slide 150 in their home positions. Thus, the first frame or micro-image on a microfiche 190 is positioned in the illumination path 92 of the optics assembly 62 and the machine 50 is ready for a subsequent display operation or automatic printing operation.

If the desired number of consecutive frames and the desired number of prints per frame are both not entered into the machine 50, the depression of the print switch 504 by the operator generates the signals PL and PL to generate the signals PSC and MCE to initiate the automatic printing or reproduction portion of the operation of the machine 50. Since the signal FPE is not present, the signal FCD is not generated. The signal CCD is generated by the absence of the signal FPE and by the simultaneous presence of the signal CG to decrement the counters 1302 and 1304 to zero and to thereby generate the signals EOCC and EOCC. The signal COCC generates the signal PLR to terminate the signals PL and PL and to thereby terminate the signals PSC and MCE. The machine 50 is thus removed from its automatic printing or reproduction mode of operation.

The simultaneous presence of the signals EOCC and FG trigger the multivibrator 2178 to generate the signal CCR to reset the counters 1302 and 1304 to store in BCD form the numeral 01. Since the column slide 134 and the row slide 150 have not been advanced, the signal PR is present; and the machine 50 is in a condition for a subsequent viewing operation or an automatic printing operation.

If a desired number of consecutive frames or micro-images to be printed or reproduced by the machine 50 is not entered into the machine 50 and if a desired number of prints per frame is entered into the machine 50, a subsequent depression of the print switch 504 causes the machine 50 to automatically operate in the following manner. The signals PL and PL are generated to generate the signals PSC and MCE as described above. The absence of the signal FPE prevents the triggering of the multivibrator 2112; and, thus, the column slide 134 and the row slide 150 remain at the first programmed frame. The absence of the signal FPE further prevents the generation of the signal FCD but enables the generation of the signal CCD in response to each signal CG to decrement the counters 1302 and 1304, as described above. When the counters 1302 and 1304 reach a zero count, the signal EOCC is generated to generate the signal PLR to terminate or remove the signals PL and PL. The absence of the signal PL terminates the signals PSC and MCE to remove the machine 50 from its automatic printing or reproduction mode of operation as described above. The simultaneous presence of the signal EOCC and FG triggers the multivibrator 2178 to generate the signal CCR to reset the counters 1302 and 1304 to store and display on their output leads in BCD from the numeral 01. Since the column slide 134 and the row slide 150 are not advanced or reset, the signal PR is present; and the first programmed frame is positioned in the illumination path 92. The machine 50 is thus in a condition for a subsequent display operation or an automatic printing operation.

Alternately, if a desired number of consecutive frames or micro-images to be printed or reproduced by the machine 50 is entered into the machine 50 by the operator and if, simultaneously, a desired number of prints per frame is not entered into the machine 50, upon the depression of the print switch 504, the machine 50 automatically reproduces one copy of each of the desired number of consecutive frames and delivers these copies in collated form to the receiving tray 60. The machine 50 performs this automatic printing operation in accordance with the operations set forth above in which both the desired number of conseuctive frames and the desired number of prints per frame are entered into the machine 50 by the operator. The only difference in the mode of operation of the machine 50 is that the first occurrence of the signal EOFC or EOFC-2 and the simultaneous presence of the signal CG generate the signal CCD to decrement the counters 1302 and 1304 to a zero count. The signals EOCC and EOCC are thereby generated to remove the machine 50 from its automatic printing or reproduction mode of operation and to reset the machine 50, as described above. Subsequently, the signal PR is present when the column slide 134 and the row slide 150 are in their home position. The machine 50 is in a condition for a subsequent display operation or an automatic printing operation.

Thus, a new and improved machine for selectively displaying or automatically reproducing micro-images has been provided. Obviously, many modifications and variations of the present invention are possible in light of the above teachings. Thus, it is to be understood that, within the scope of the appended claims, the invention may be practiced otherwise than as specifically described above. The words "original" and "originals" are used hereinafter to denote any informational item, object or thing, irrespective of whether that informational item, object or thing is, in itself, a reproduction or otherwise, that is to be or may be reproduced by a copying process or machine, for example, by the new and improved microfiche viewer printer machine 50 disclosed hereinabove.

What is claimed and desired to be secured by Letters Patent of the United States is:

1. A device for reproducing copies of at least a portion of a plurality of reproducible originals comprising
   a feed path for copy material, said feed path having an input station and an exit station and
   means for automatically reproducing and delivering to said exit station a first, variable, preselectable number of collated sets of copies of a second, variable, preselectable number of said plurality of reproducible originals.

2. A device as defined in claim 1 wherein said reproducing and delivering means includes manually manipulative means for entering said first number into said device.

3. A device as defined in claim 2 wherein said reproducing and delivering means further includes
   means for illuminating said plurality of reproducible images,
   means for forming latent images of said reproducibles originals,
   means for developing said latent images to form visible originals of said reproducible images and
   means for fixing said visible images on copy material to form tangible copies of said reproducible originals.

4. A device for reproducing copies of a plurality of reproducible originals comprising
   means for automatically reproducing a first, variable, preselectable number of collated sets of copies of a second, variable, preselectable number of said plurality of reproducible originals.

5. A device as defined in claim 4 further comprising
   a feed path for copy material, said feed path having an input station and an exit station, and
   means for delivering said first, variable, preselectable number of collated sets of copies of said second, variable, preselectable number of said plurality of reproducible originals to said exit station.

6. A device as defined in claim 5 wherein said reproducing means comprises manually manipulative means for entering said first number and said second number into said device.

7. A device as defined in claim 6 wherein said reproducing means comprises first means for receiving said first number from said entering means and for monitoring the reproduction of said first number of collated sets of copies.

8. A device as defined in claim 7 wherein said reproducing means further comprises second means for receiving said second number from said entering means and for storing said second number and third means responsive to said second means for monitoring the reproduction of copies of said second number of said plurality of reproducible originals.

9. A device as defined in claim 8 wherein said third monitoring means includes means for generating an electrical signal to decrement said first receiving and monitoring means upon the reproduction of a third number of copies by said device equal to said second number.

10. A device as defined in claim 5 further comprising means for automatically conditioning said device to reproduce as the first member of said second number of said plurality of reproducible originals a variable, preselectable, first orignals of said plurality of reproducible originals.

11. A device as defined in claim 10 wherein said conditioning means includes means for entering information into said device corresponding to said first originals and means responsive to said entered information for positioning said first originals within an illumination path of said device to enable a reproduction operation of said device to be initiated by the reproduction of a copy of said first originals.

12. A device as defined in claim 11 wherein said entering means includes manually manipulative means for entering said information.

13. A device as defined in claim 12 wherein said manually manipulative entering means comprises depressible switch means.

14. A device as defined in claim 13 wherein said entering means includes means responsive to the maintenance of said switch means in a depressed condition for a time period greater than a predetermined time period for altering the information being entered into said device.

15. A device for reproducing copies of a plurality of frames disposed on a microfiche comprising
   means for automatically reproducing a first, variable, preselectable number of collated sets of copies of a second, variable, preselectable frames of said plurality of frames.

16. A device as defined in claim 15 wherein said reproducing means includes
   means for mounting and securely retaining said microfiche,
   first means for transporting said mounting means along a first portion of a path of travel and
   second means for transporting said mounting means along a second portion of said path of travel, said second portion of said path of travel being angularly disposed to said first portion of said path of travel,
   said first transporting means being actuable independently of said second transporting means to transport said mounting means along said first portion of said path of travel and said second transporting means being actuable independently of said first transporting means to transport said mounting means along said second portion of said path of travel.

17. A device as defined in claim 16 wherein said first transporting means includes
   a first plurality of serially disposed slots,
   a first plurality of drive pins releasably engageable with said slots and first means for positioning said drive pins in varying ones of said slots to enable the stepwise movement of said mounting means along said first portion of said path of travel.

18. A device as defined in claim 17 wherein said second transporting means includes
a second plurality of serially disposed slots,
a second plurality of drive pins releasably engageable with said second plurality of slots and
second means for positioning said second plurality of drive pins in varying ones of said second plurality of slots to enable the stepwise movement of said mounting means along said second portion of said path of travel.

19. A device as defined in claim 17 wherein said first transporting means further includes an elongated rack housing said slots.

20. A device as defined in claim 19 wherein said slots are serially disposed along said rack and enclosed within an elongated apertured portion of said rack.

21. A device as defined in claim 17 wherein said first positioning means includes rotatable means for fixedly mounting said first plurality of drive pins thereon and motive means for rotating said rotatable mounting means.

22. A device as defined in claim 17 wherein said first plurality of drive pins consists of two drive pins.

23. A device as defined in claim 22 wherein said first positioning means includes a rotatable member upon which said two drive means are fixedly mounted in a 180 degree spaced-apart relationship.

24. A device as defined in claim 23 further comprising an elongated rack housing said first plurality of slots, said first positioning means including means for maintaining said two drive pins and said rack in a stationary relative condition when said two drive pins are positioned in adjacent ones of said first plurality of slots.

25. A device for reproducing copies of a plurality of frames disposed on a microfiche comprising
an illumination path,
means disposed in said illumination path for illuminating said frames disposed on said microfiche,
means for positioning one of said frames at a time in said illumination path and
means for automatically reproducing a first, variable, preselectable number of collected sets of copies of a second, variable, preselectable number of said plurality of frames.

26. A device for displaying or reproducing copies of a plurality of frames disposed on a microfiche comprising
an illumination path,
a viewing screen,
means disposed in said illumination path for illuminating frames disposed on said micorfiche,
means for positioning one of said frames at a time in said illumination path,
means for selectively displaying said frames on said viewing screen and
means for automatically reproducing a first, variable, preselectable number of collated sets of copies of a second, variable, preselectable number of said plurality of said frames.

27. A device for reproducing copies of one or more of a plurality of reproducible originals comprising
an illumination path,
means disposed in said illumination path for illuminating said orignals and
programmable means for automatically positioning a first, variable, preselected original of said plurality of reproducible originals in said illumination path and
means for automatically reproducing a first, variable, preselectable number of collated sets of copies of a second, variable, preselectable number of said plurality of reproducible originals.

28. A device for illuminating frames disposed on microfiches in accordance with one of a plurality of possible paginations comprising
an illumination path,
switch means for variably presetting or resetting said device to automatically sequentially position serially-disposed ones of the frames of a first microfiche of said microfiches in said illumination path of said device in accordance with the particular pagination of said first microfiche for illumination by said device.

29. A device for illuminating a plurality of frames disposed on a microfiche in accordance with a first variable pagination of a plurality of possible paginations comprising
an illumination path,
means for automatically sequentially transporting serially disposed ones of said plurality of frames into and through said illumination path,
means for variably conditioning said transporting means to transport said ones of said plurality of frames into and through said illuminatiuon path in accordance with said first pagination of said microfiche.

30. A device as defined in claim 29 wherein said conditioning means includes multistate means for presetting or resetting said transporting means to transport said ones of said plurality of frames into and through said illumination path in accordance with a COSATI pagination in a first state or in accordance with a COM pagination in a second state.

31. A device as defined in claim 30 wherein said multistate means includes a manually manipulative bistable means.

32. A device as defined in claim 29 wherein said conditioning means includes multistate means for presetting or resetting said transporting means to transport said ones of said plurality of frames into and through said illumination path in accordance with a COSATI PREFERRED pagination in a first state or in accordance with a COSTAI ALTERNATE pagination in a second state.

33. A device as defined in claim 29 wherein said conditioning means includes multistate means for presetting or resetting said transporting means to transport said ones of said plurality of frames into and through said illumination path in accordance with a COSATI PREFERRED pagination in a first state or in accordance with a COSATI ALTERNATE pagination in a second state or in accordance with a COM pagination in a third state.

34. A device as defined in claim 29 wherein said transporting means comprises
means for mounting and securely retaining a micorfiche,
first means for transporting said mounting means along a first portion of a path of travel and second means for transporting said mounting means along a second portion of said path of travel being angularly disposed to said first portion of said path of travel.

35. A device as defined in claim 34 wherein said first transporting means is actuable independently of said second transporting means to transport said mounting means along said first portion of said path of travel and wherein said second transporting means is similarly actuable independently of said first transporting means to transport said mounting means along said second portion of said path of travel.

36. A device as defined in claim 34 wherein said first transporting means includes a first plurality of serially disposed slots, a first plurality of drive pins releasably enggaeable with said slots and first means for positioning said drive pins in varying ones of said slots to enable the stepwise movement of said mounting along said first portion of said path of travel.

37. A device as defined in claim 36 wherein said second transporting means includes s a second plurality of serially disposed slots, a second plurality of drive pins releasably engageable with said second plurality of slots and second means for positioning said second plurality of drive pins in varying ones of said second plurality of slots to enable the stepwise movement of said mounting means along said second portion of said path of travel.

38. A device as defined in claim 36 wherein said first transporting means further includes an elongated rack housing said slots.

39. A device as defined in claim 38 wherein said slots are serially disposed along said rack and enclosed within an elongated apertured portion of said rack.

40. A device as defined in claim 36 wherein said positioning means includes rotatable means for fixedly mounting said first plurality of drive pins thereon and motive means for rotating said rotatable mounting means.

41. A device as defined in claim 35 wherein said first plurality of drive pins consists of two drive pins.

42. A device as defined in claim 41 wherein said first positioning means includes a rotatable member upon which said two drive pins are fixedly mounted in a 180 degree spaced-apart relationship.

43. A device as defined in claim 42 further comprising an elognated rack housing and said first plurality of slots, said first positioning means including means for maintaining said two drive pins and said rack in a stationary relative condition in which said two drive pins are positioned in adjacent ones of said first plurality of slots.

44. A device for reproducing copies of a plurality of serially disposed reproducible originals comprising a feed path for copy material, said feed path having an input station and an exit station and means for automatically reproducing a first, variable, preselectable number of collated sheets of copies of a second, varible, preselectable number of said plurality of reproducible originals said second number including the last serially disposed one of said plurality of reproducible originals.

45. A device as defined in claim 44 wherein said reproducing means comprises manually manipulative means for entering said first number and said second number into said device.

46. A device as defined in claim 45 wherein said reproducing means further comprises means responsive to said manually manipulative entering means for controlling said reproducing means to reproduce first, variable, preselectable number of collated sets of copies of said second, variable, preselectable number of said plurality of reproducible originals upon the entering of either said second number into said device or a number numerically greater than said second number into said device in place of said second number.

47. A device for reproducing copies of a plurality of frames disposed on a microfiche comprising means for automatically reproducing a first, variable, preselectable number of collated sets of copies of a second, variable, preselectable number of said plurality of frames said reproducing means comprising an illumination path, means disposed in said illumination path for illuminating said frames disposed on said microfiche and and means for producing relative movement between said illumination path and said microfiche to thereby position one of said frames at a time in said illumination path, said relative movement producing means comprising first means for producing relative movement along a first portion of a path of travel and second means for producing relative movement along a second portion of path of travel, said second portion of said path of travel being angularly disposed to said first portion of said path of travel, said first relative movement producing means being actuable independently of said second relative movement producing means to produce said relative movement along said first portion of said path of travel an said second relative movement producing means being actuable independently of said first relative movement producing means to produce said relative movement along said second portion of said path of travel.

48. A device as defined in claim 47 wherein said first relative movement producing means includes a first plurality of serially disposed slots, a first plurality of drive pins releasably engageable with said slots and first means for positioning said drive pins in varying ones of said slots to enable stepwise relative movement between said illumination path and said micofiche along said first portion of said path of travel.

49. A device as defined in claim 48 wherein said second relative movement producing means includes a second plurality of serially disposed slots, a second plurality of drive pins releasably engageable with said second plurality of slots and second means for positioning said second plurality of drive pins in varying ones of said second plurality of slots to enable stepwise relative movement between said illumination path and said microfiche along said second portion of said path of travel.

50. A device as defined in claim 48 wherein said first relative movement producing means further includes an elongated rack housing said slots.

51. A device as defined in claim 50 wherein said slots are serially disposed along said rack and enclosed within an elongated apertured portion of said rack.

52. A device as defined in claim 48 wherein said first positioning means includes rotatable means for fixedly mounting said first plurality of drive pins thereon and motive means for rotating said rotatable mounting means.

53. A device as defined in claim 48 wherein said first plurality of drive pins consists of two drive pins.

54. A device as defined in claim 53 wherein said first positioning means includes a rotatable member upon which said two drive means are fixedly mounted in a 180° spaced-apart relationship.

55. A device as defined in claim 54 further comprising an elongated rack housing said first plurality of slots, said first positioning means including means for maintaining said two drive pins and said rack in a stationary relative condition when said two drive pins are positioned in adjacent ones of said first plurality of slots.

56. A device for reproducing copies of a plurality of reproducible images disposed on a unitary member comprising
    means for automatically reproducing a first, variable, preselectable number of collated sets of copies of a second, variable, preselectable number of said plurality of reproducible images disposed on said unitary member.

57. A device as defined in claim 56 wherein said reproducing originals includes
    an illumination path,
    means disposed in said illumination path for illuminating said images and
    originals for positioning one of said images at a time in said illumination path.

58. A device as defined in claim 57 wherein said positioning means includes programmable means for automatically positioning a first, variable, preselected original of said plurality of reproducible originals in said illumination path.

* * * * *

PO-1050
(5/69)

UNITED STATES PATENT OFFICE
CERTIFICATE OF CORRECTION

Patent No. 3,898,003          Dated August 5, 1975

Inventor(s) A. B. Aronson et al        Page 1 of 2

It is certified that error appears in the above-identified patent and that said Letters Patent are hereby corrected as shown below:

Claim 3, column 65, lines 37-38, change "reproducibles" to --reproducible--;
Claim 10, column 66, line 16, change "originals" to --original--;
Claim 11, column 66, lines 20-21, change "originals" to --original--;
Claim 11, column 66, line 22, change "originals" to --original--;
Claim 11, column 66, line 25, change "originals" to --original--;
Claim 15, column 66, line 42, change "frames" to --number--;
Claim 25, column 67, line 47, change "collected" to --collated--;
Claim 26, column 67, line 56, after "nating" insert --said--;
Claim 26, column 67, line 56, change "micorfiche" to --microfiche--;
Claim 27, column 68, line 2, change "orignals" to --originals--;
Claim 29, column 68, line 32, change "illuminatiuon" to --illumination--;
Claim 34, column 68, line 64, change "micor-" to --micro- --;
Claim 34, column 69, line 2, after "travel" insert --, said second portion of said path of travel--;
Claim 36, column 69, line 16, change "enggaeable" to --engageable--;
Claim 37, column 69, line 23, delete "s";
Claim 39, column 69, line 36, change "encolosed" to --enclosed--;
Claim 41, column 69, line 43, change "35" to --36--;
Claim 43, column 69, line 50, change "elognated" to --elongated--;

Signed and Sealed this seventeenth Day of February 1976

[SEAL]

Attest:

RUTH C. MASON
Attesting Officer

C. MARSHALL DANN
Commissioner of Patents and Trademarks

PO-1050
(5/69)

UNITED STATES PATENT OFFICE
CERTIFICATE OF CORRECTION

Patent No. 3,898,003        Dated August 5, 1975

Inventor(s) A. B. Aronson et al        Page 2 of 2

It is certified that error appears in the above-identified patent and that said Letters Patent are hereby corrected as shown below:

Claim 44, column 69, line 61, change "sheets" to --sets--;
    Claim 44, column 69, line 62, change "varible" to --variable--;
    Claim 46, column 70, line 6, after "reproduce" insert --a--;
    Claim 47, column 70, line 24, delete "and";
    Claim 47, column 70, line 39, change "an" to --and--;
    Claim 56, column 72, line 2, change "images" to --originals--;
    Claim 56, column 72, line 7, change "images" to --originals--;
    Claim 57, column 72, line 10, change "originals" to --means--;
    Claim 57, column 72, line 13, change "images" to --originals--;
    Claim 57, column 72, line 14, change "originals" to --means--; and
    Claim 57, column 72, line 14, change "images" to --originals--.

Signed and Sealed this seventeenth Day of February 1976

[SEAL]

Attest:

RUTH C. MASON        C. MARSHALL DANN
*Attesting Officer*        *Commissioner of Patents and Trademarks*